(12) United States Patent
McNeil et al.

(10) Patent No.: US 12,061,405 B2
(45) Date of Patent: *Aug. 13, 2024

(54) AUTOMATED CONTROL OF AN ELECTROCHROMIC DEVICE

(71) Applicant: Halio, Inc., Hayward, CA (US)

(72) Inventors: Andrew McNeil, Oakland, CA (US);
Tanguy Timmermans, Brussels (BE)

(73) Assignee: Halio, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,952

(22) Filed: May 12, 2023

(65) Prior Publication Data

US 2023/0280628 A1    Sep. 7, 2023

Related U.S. Application Data

(62) Division of application No. 16/821,293, filed on Mar. 17, 2020, now Pat. No. 11,686,988.

(60) Provisional application No. 62/890,040, filed on Aug. 21, 2019, provisional application No. 62/819,981, filed on Mar. 18, 2019.

(51) Int. Cl.
  *G02F 1/163*    (2006.01)
  *G02F 1/133*    (2006.01)
  *G06N 20/00*    (2019.01)

(52) U.S. Cl.
  CPC .......... *G02F 1/163* (2013.01); *G02F 1/13318* (2013.01); *G02F 1/13312* (2021.01); *G06N 20/00* (2019.01)

(58) Field of Classification Search
  CPC .. G02F 1/163; G02F 1/13318; G02F 1/13312; G06N 20/00

USPC ........................................................ 359/265
See application file for complete search history.

(56) References Cited

U.S. PATENT DOCUMENTS

| | | | |
|---|---|---|---|
| 7,417,397 | B2 | 8/2008 | Berman |
| 8,705,162 | B2 | 4/2014 | Brown et al. |
| 8,836,263 | B2 | 9/2014 | Berman |
| 9,360,731 | B2 | 6/2016 | Berman et al. |

(Continued)

FOREIGN PATENT DOCUMENTS

WO    2016003555 A2    1/2016

OTHER PUBLICATIONS

Dutta, Ranjoy, "Modeling an Electrochromic Window Using a Multi-Criteria Control Strategy." 2018 Building Performance Analysis Conference and SimBuild co-organized by ASHRAE and IBPSA-US, Chicago, IL. Sep. 26-28, 2018, 8 pages.

(Continued)

*Primary Examiner* — Nathanael R Briggs
*Assistant Examiner* — William D Peterson
(74) *Attorney, Agent, or Firm* — Lowenstein Sandler LLP

(57) ABSTRACT

A method includes receiving first dimensions of an electrochromic device and second dimensions of one or more obstructions of the electrochromic device. The method further includes generating, based on the first dimensions and the second dimensions, an obstruction map that indicates at least one of an obstructed portion or an unobstructed portion of the electrochromic device. The method further includes determining, based the obstruction map, a first desired tinting state of the electrochromic device. The method further includes causing a current tinting state of the electrochromic device to correspond to the first desired tinting state.

20 Claims, 32 Drawing Sheets

(56) References Cited

U.S. PATENT DOCUMENTS

| | | | |
|---|---|---|---|
| 9,454,055 B2 | 9/2016 | Brown et al. | |
| 11,686,988 B2* | 6/2023 | McNeil | G02F 1/13318 359/265 |
| 2012/0133315 A1 | 5/2012 | Berman et al. | |
| 2014/0303788 A1 | 10/2014 | Sanders et al. | |
| 2016/0004795 A1* | 1/2016 | Novak | G06F 30/20 703/1 |
| 2018/0373111 A1* | 12/2018 | Brown | G05B 19/048 |

OTHER PUBLICATIONS

"Intelligence View Dynamic Glass is powered by an initutivew Intelligence engine." Viewglass.com, 4 pages.

Katsifaraki, Angelina, "Development and evaluation of a simulation-based adaptive shading control for complex fenestration systems." Apr. 26, 2018, 105 pages.

PCT Application No. PCT/US2020/023381, International Search Report and Written Opinion dated Jun. 17, 2020, 14 pages.

McNeil A. A photographic method for mapping angular locations of exterior solar obstructions. Journal of Building Engineering. Jan. 8, 2020:101170.

Arasteh D, Selkowilz S, Apte J, LaFrance M. Zero energy windows. Ernest Orlando Lawrence Berkeley National Laboratory, Berkeley, CA (US); May 17, 2006.

Yao J. An investigation into the impact of movable solar shades on energy, indoor thermal and visual comfort mprovements. Building and environment. Jan. 1, 2014;71:24-32.

Lee E, Yazdanian M, Selkowilz S. The energy-savings potential of electrochromic windows in the US commercial buildings sector. Apr. 30, 2004.

Lee ES, Selkowilz SE, Hughes GD, Clear RD, Ward G, Mardaljevic J, Lai J, Inanici MN, Inkarojrit V. Daylighting the new york times headquarters building. Lawrence Berkeley National Laboratory. Final report LBNL-57602. 2005. pp. 117-213.

Mardaljevic J, Rylatt M. Irradiation mapping of complex urban environments: an image-based approach. Energy and buildings. Jan. 1, 2003;35(1):27-35.

Weitlaner R. Advanced Insolation Detection Module in Solar Shading Automation Robert Weitlaner, David Geisler-Moroder, Rainer Pfluger. HELLA Sonnen-und Wetterschulztechnik Gmbh, Abfaltersbach, Austria, Bartenbach GmbH, Aldrans, Austria, pp. 719-725.

Zelnik-Manor L, Peters G, Perona P. Squaring the circle in panoramas. InTenth IEEE International Conference on Computer Vision (ICCV'05) vol. 1 Oct. 17, 2005 (vol. 2, pp. 1292-1299). IEEE.

Porin D, Barr AH. Correction of geometric perceptual distortions in pictures. In Proceedings of the 22nd annual conference on Computer graphics and interactive techniques Sep. 15, 1995 (pp. 257-264).

Chang, Che-Han, Min-Chun Hu, Wen-Huang Cheng, and Yung-Yu Chuang. "Rectangling stereographic projection for wide-angle image visualization." In Proceedings of the IEEE International Conference on Computer Vision, pp. 2824-2831. 2013.

Sacht, Leonardo K., Paulo C. Carvalho, Luiz Velho, and Marcelo Gattass. "Face and straight line detection in equirectangular images." In Workshop de Visao Computacional. Presidente Prudente, SP, Brasil: FTC-UNESP, pp. 101-106. Jul. 2010.

Carroll, Robert, Maneesh Agrawal, and Aseem Agarwala. "Optimizing content-preserving projections for wide-angle images." In ACM Transactions on Graphics (TOG), vol. 28, No. 3, p. 43. ACM, 2009.

Sacht, Leonardo Koller. "Content-based projections for panoramic images and videos." Master's thesis, IMPA (2010).

G. Bradski The Open CV Library Dr. Dobb's Journal of Software Tools (2000) https://www.drdobbs.com/open-source/the-opencv-library/184404319.

B. Stafford Pysolar by pingswept (2007) viewed Nov. 14, 2019, https://pysolar.readthedocs.io/en/latest/.

Reda, Ibrahim, and Afshin Andreas. "Solar position algorithm for solar radiation applications." Solar energy 76, No. 5 (2004): 577-589.

Mardaljevic, John, Birgit Painter, and Marilyne Andersen. "Transmission illuminance proxy HDR imaging: A new technique to quantify luminous flux." Lighting Research & Technology 41, No. 1 (2009): 27-49.

Kheybari, A. G., & Hoffmann, I. S. A Data-driven model for controlling smart electrochromic glazing: Living Lab Smart Office Space. hllps://www.researchgate.net/profile/Abolfazl_Ganji_Kheybari/publication/337562149_A_Data-driven_model_for_controlling_smart_electrochromic_glazing_Living_Lab_Smart_Office_Space/inks/5dde435a299bf10bc329740c/A-Data-driven-model-for-controlling-smart-electrochromic-glazing-Living-Lab-SmartOffice-Space.pdf.

De Michele, Giuseppe, Stefano Avesani, Annamaria Belleri, and Andrea Gasparella. "Advanced Shading Control Strategy for Shopping Malls: A Case Study in Spain."

Li, Danny HW, and Sai Li Wong. "Daylighting and energy implications due to shading effects from nearby buildings." Applied Energy 84.12 (2007): Abstract only.

Lilllefair, P. (2001). Daylight, sunlight and solar gain in the urban environment. Solar Energy, 70(3), Abstract only.

Abravesh, M., Bueno, B., Heidari, S., & Kuhn, T. E. (2019). A method to evaluate glare risk from operable fenestration systems throughout a year. Building and Environment, 160, 106213. Abstract only.

Katsifaraki, A., Bueno, B., & Kuhn, T. E. (2017). A daylight optimized simulation-based shading controller for venetian blinds. Building and Environment, 126, 207-220. Abstract only.

Xiong, J., & Tzempelikos, A. (2016). Model-based shading and lighting controls considering visual comfort and energy use. Solar Energy, 134, 416-428. Abstract only.

Shen, H., & Tzempelikos, A. (2017). Daylight-linked synchronized shading operation using simplified model-based Control. Energy and Buildings, 145, 200-212. Abstract only.

Panao, M. J. O., Carreira, R. F., & Brito, M. C. (2019). Determining the shading correction factor using a smartphone camera with a fisheye lens. Solar Energy, 190, 596-607. Abstract only.

Orioli, Aldo, and Alessandra Di Gangi. "An improved photographic method to estimate the shading effect of obstructions." Solar energy 86, No. 11 (2012): 3470-3488.

* cited by examiner

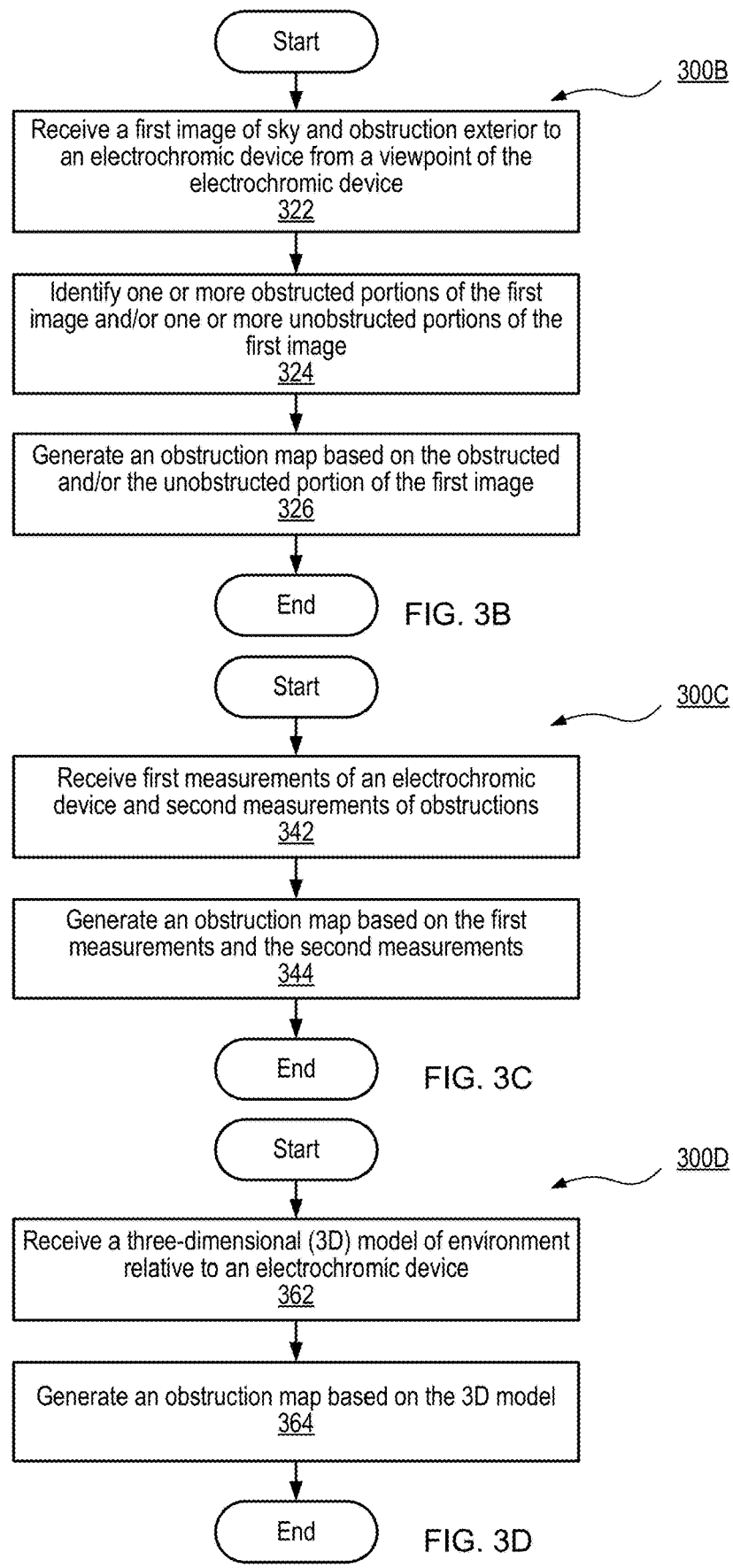

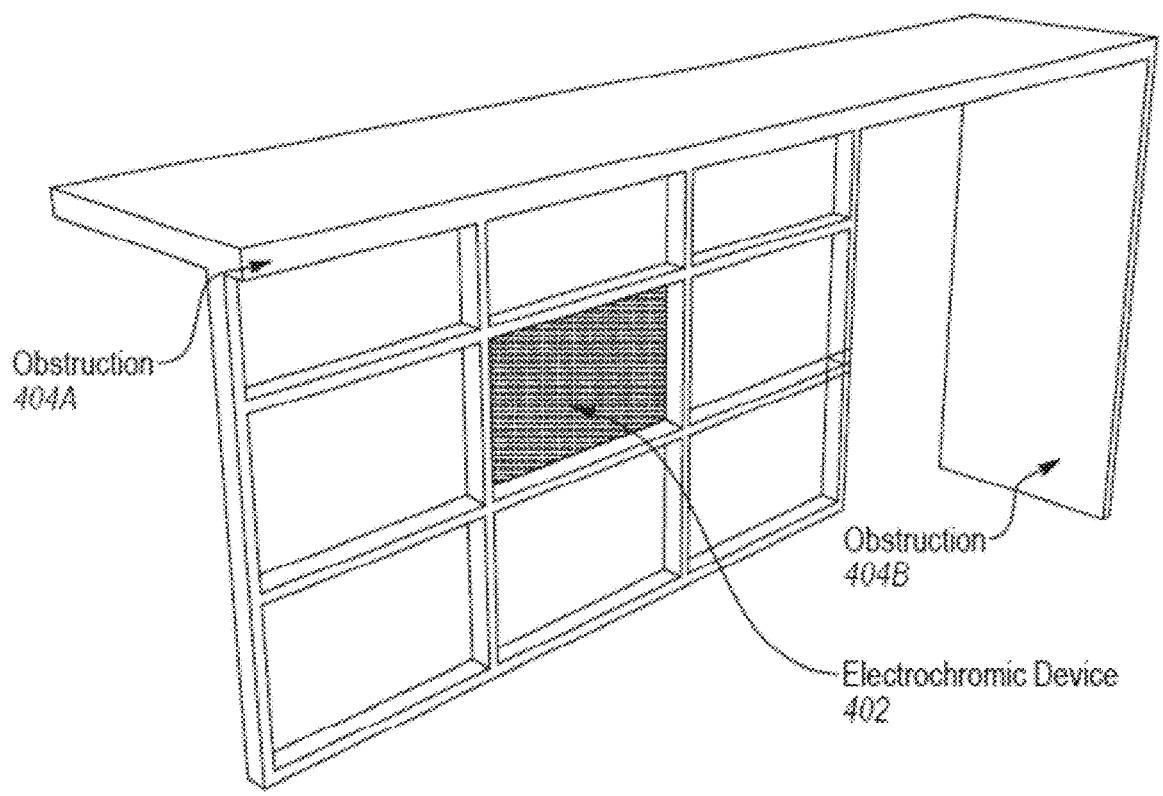
FIG. 4A
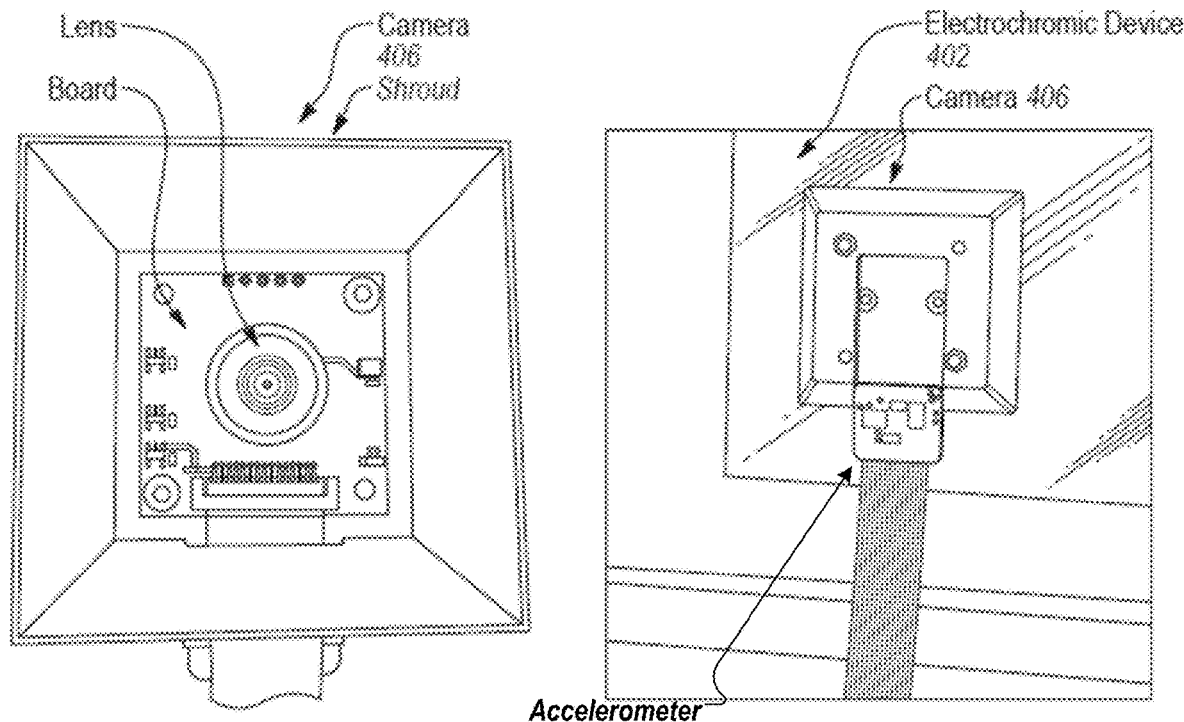
FIG. 4B
FIG. 4C

Raw Fisheye Image

Rotation-Corrected Fisheye Image

Angular Distortion Corrected Fisheye Image

Image From Right Side

Image From Left Side

Equi-Rectangular Image Projection

Pseudo-Cylindrical Image Projection

Image Remapped To Equi-Rectangular Image Projection

Image Remapped To Pseudo-Cylindrical Image Projection

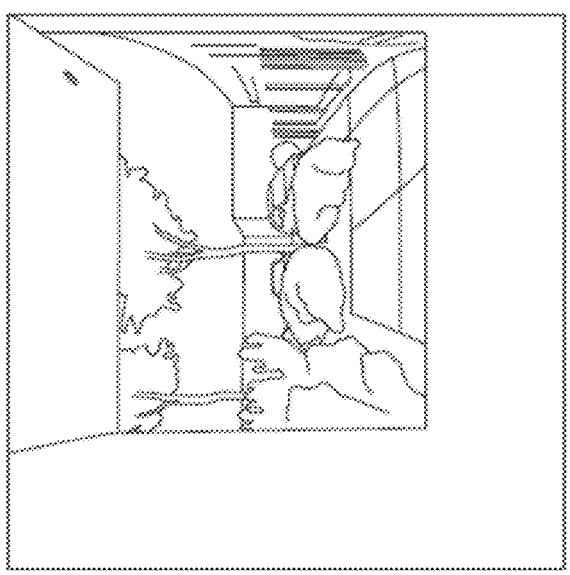
FIG. 4N — Left
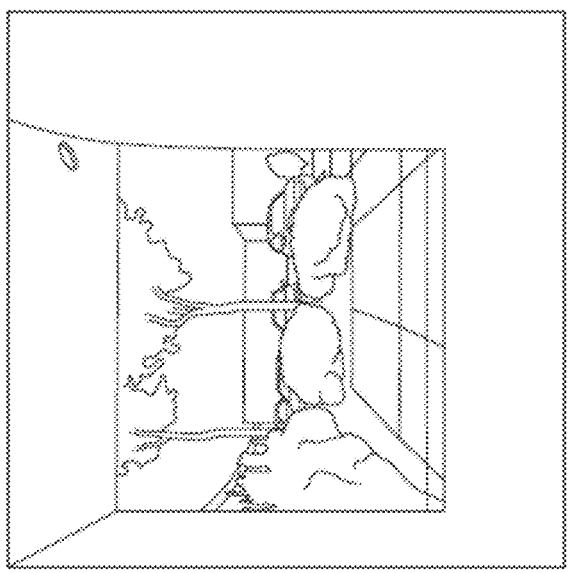
FIG. 4O — Right
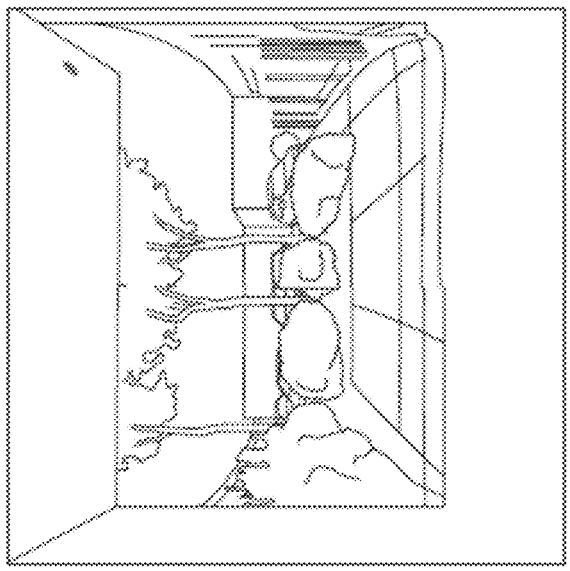
FIG. 4P — Composite
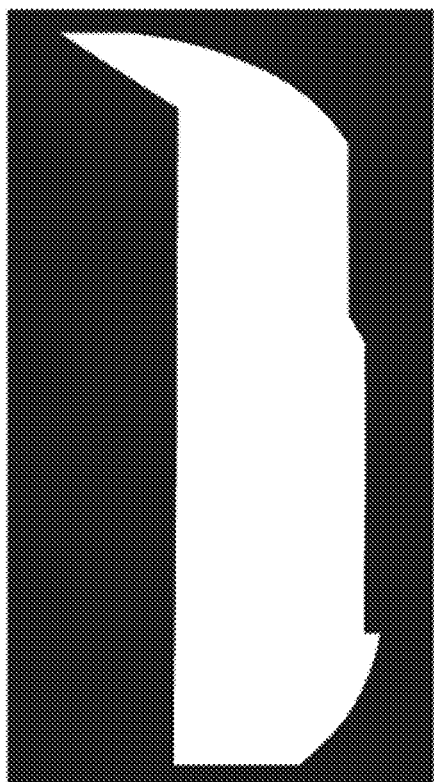
FIG. 4Q — Obstruction Map (e.g., Generated Using Photographic Method)
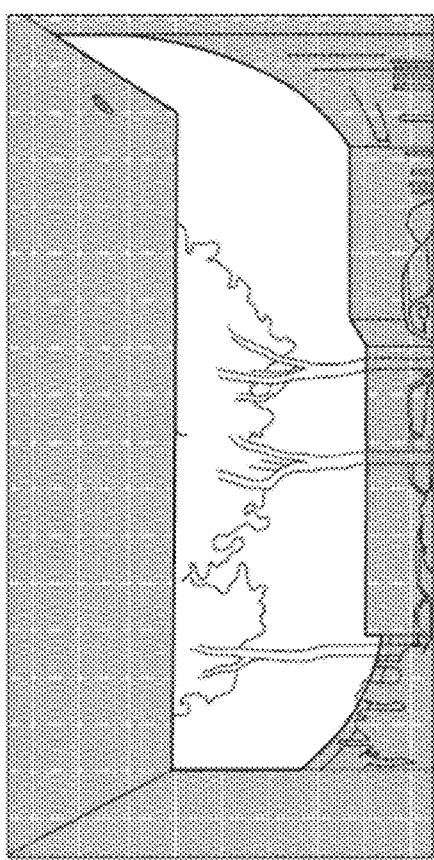
Polygon Traced Over Composite Image Table 2 – Examples of geometrically derived overhang shadow maps.

| Geometry Parameters | Obstruction Map Image | Geometry Parameters | Obstruction Map Image |
|---|---|---|---|
| OD = 1.2 m<br>OH = 0.1 m<br>WH = 2.5 m<br>WW = 1.0 m<br>OEL = 1.5 m<br>OER = 1.5 m<br>JD = 0.1 m | | OD = 1.2 m<br>OH = 0.1 m<br>WH = 1.5 m<br>WW = 1.0 m<br>OEL = 1.5 m<br>OER = 1.5 m<br>JD = 0.1 m | |
| OD = 2.0 m<br>OH = 0.1 m<br>WH = 2.5 m<br>WW = 1.0 m<br>OEL = 1.5 m<br>OER = 1.5 m<br>JD = 0.1 m | | OD = 1.2 m<br>OH = 0.1 m<br>WH = 2.5 m<br>WW = 1.0 m<br>OEL = 0.5 m<br>OER = 12.0 m<br>JD = 0.1 m | |

FIG. 4S

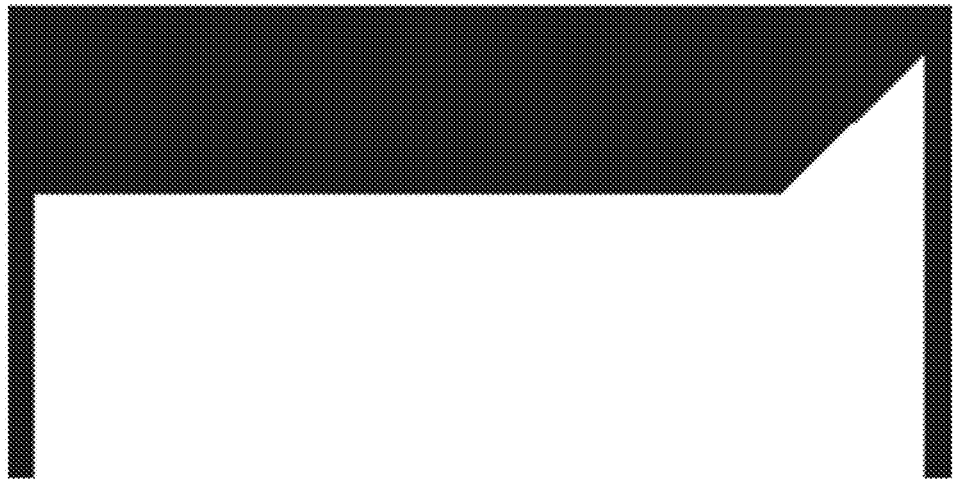
OD = 1.16 m
OH = 0.96 m
WH = 0.80 m
WW = 1.32 m
OEL = 15.0 m
OER = 1.82 m
JD = 0.12 m
Obstruction map (e.g., generated using geometric method)  FIG. 4T
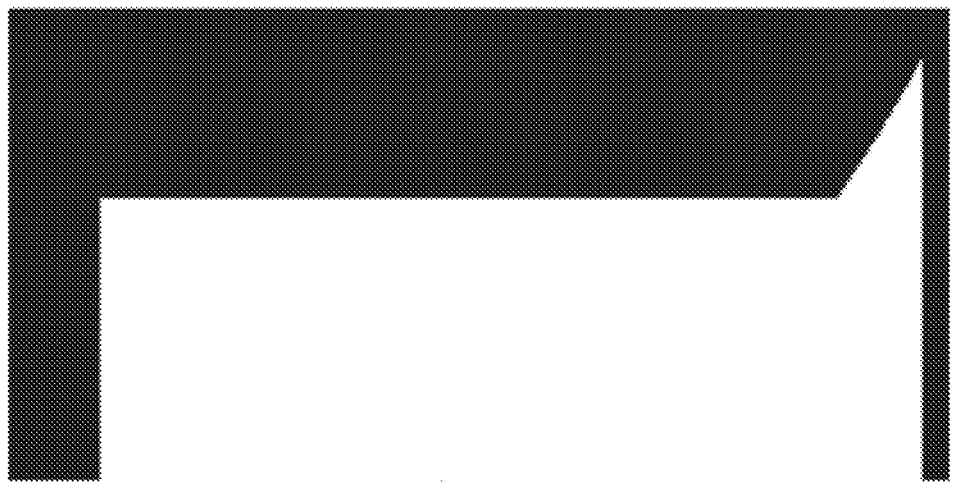
Obstruction map (e.g., generated using ray-tracing method)  FIG. 4U Traced Image Allowable Sun Map

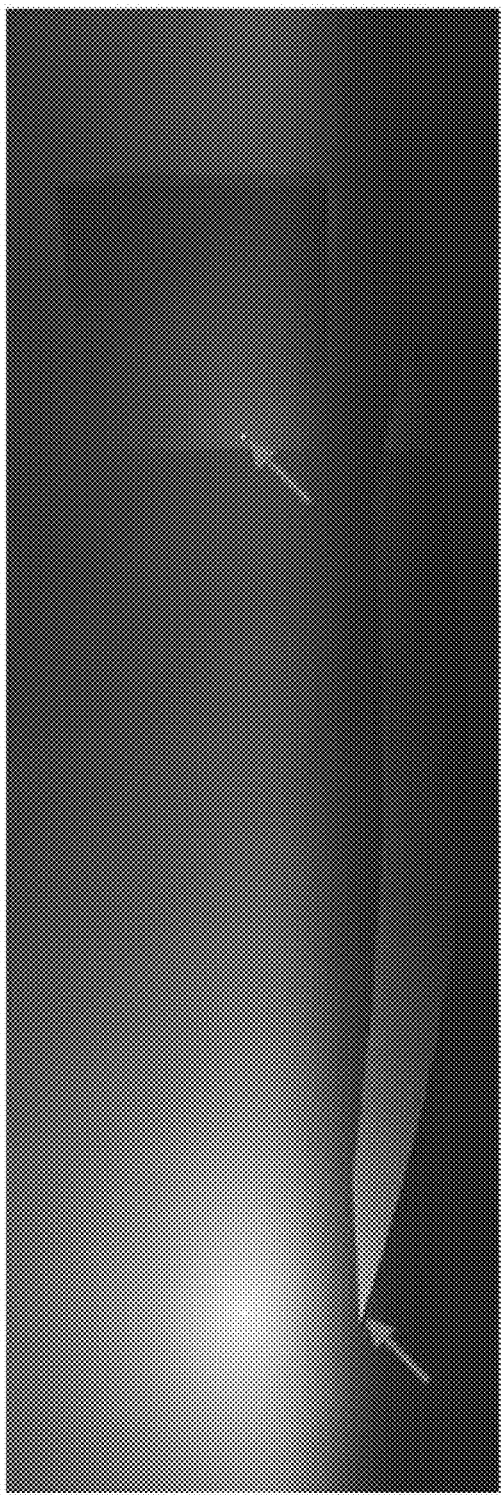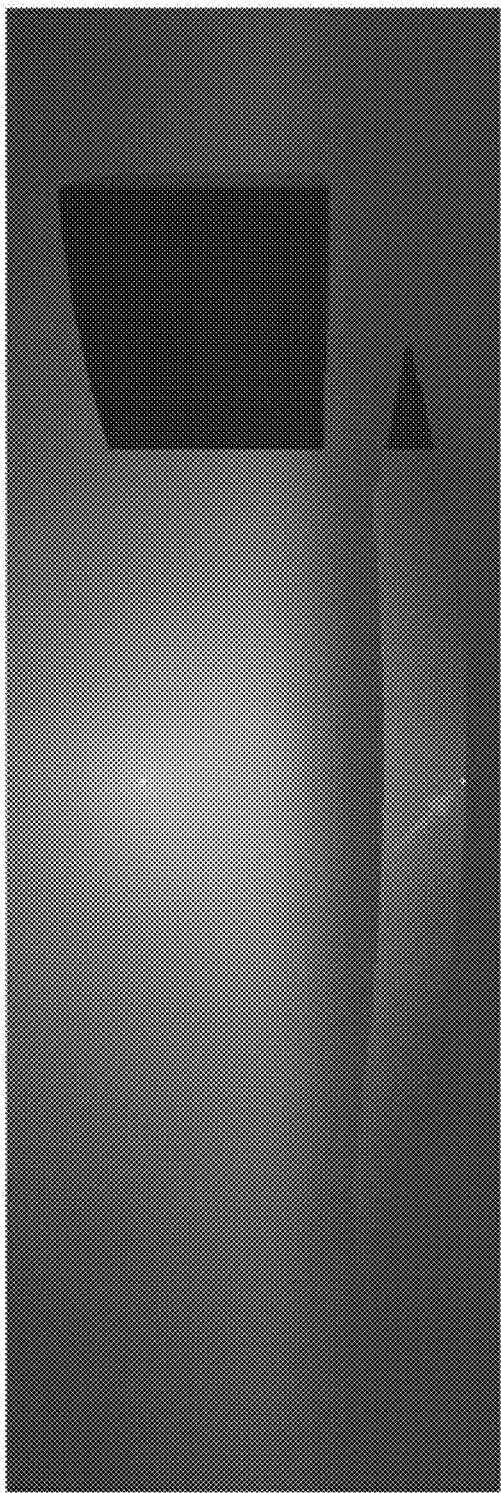
FIG. 11C
FIG. 11D

AUTOMATED CONTROL OF AN ELECTROCHROMIC DEVICE

RELATED APPLICATIONS

This patent application is a divisional of U.S. application Ser. No. 16/821,293, filed Mar. 17, 2020, which claims the benefit of U.S. Provisional No. 62/890,040, filed Aug. 21, 2019, and U.S. Provisional No. 62/819,981, filed Mar. 18, 2019, the entire contents of which are incorporated by reference.

BACKGROUND

An electrochromic glass unit uses electrochromic glass that can change transmittance with the application of electric current and voltage. The change of transmittance typically relies on a reversible oxidation of a material. Electrochromic glass units can darken at the press of a button or other triggering events and are also often used in building windows to reduce glare and solar heat gains.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIGS. 3A-D are flow diagrams of methods for providing control of an electrochromic device using an obstruction map, according to certain embodiments.

FIG. 4A illustrates an electrochromic device that is to be controlled by using an obstruction map, according to certain embodiments.

FIG. 4B-C illustrates a camera that is used to capture one or more images for generating the obstruction map, according to certain embodiments.

FIG. 4N illustrates an image from a left side of a window remapped to an orthonormal pseudo-cylindrical projection, according to certain embodiments.

FIG. 4O illustrates an image from a right side of a window remapped to an orthonormal pseudo-cylindrical projection, according to certain embodiments.

FIG. 4P illustrates the image from the left side (e.g., FIG. 4N) and the image from the right side (e.g., FIG. 4O) combined into a single composite image, according to certain embodiments.

FIG. 4Q illustrates a polygon traced over the orthonormal pseudo-cylindrical image and a resulting black/white Boolean image, according to certain embodiments.

FIG. 4S illustrates geometrically derived obstruction maps, according to certain embodiments.

FIG. 4T is an obstruction map generated using geometric method, according to certain embodiments.

FIG. 4U is an obstruction map generated using a ray-tracing method, according to certain embodiments.

FIGS. 11A-G illustrate rendered models for sets of coordinates, according to certain embodiments.

DETAILED DESCRIPTION

Figure 1:
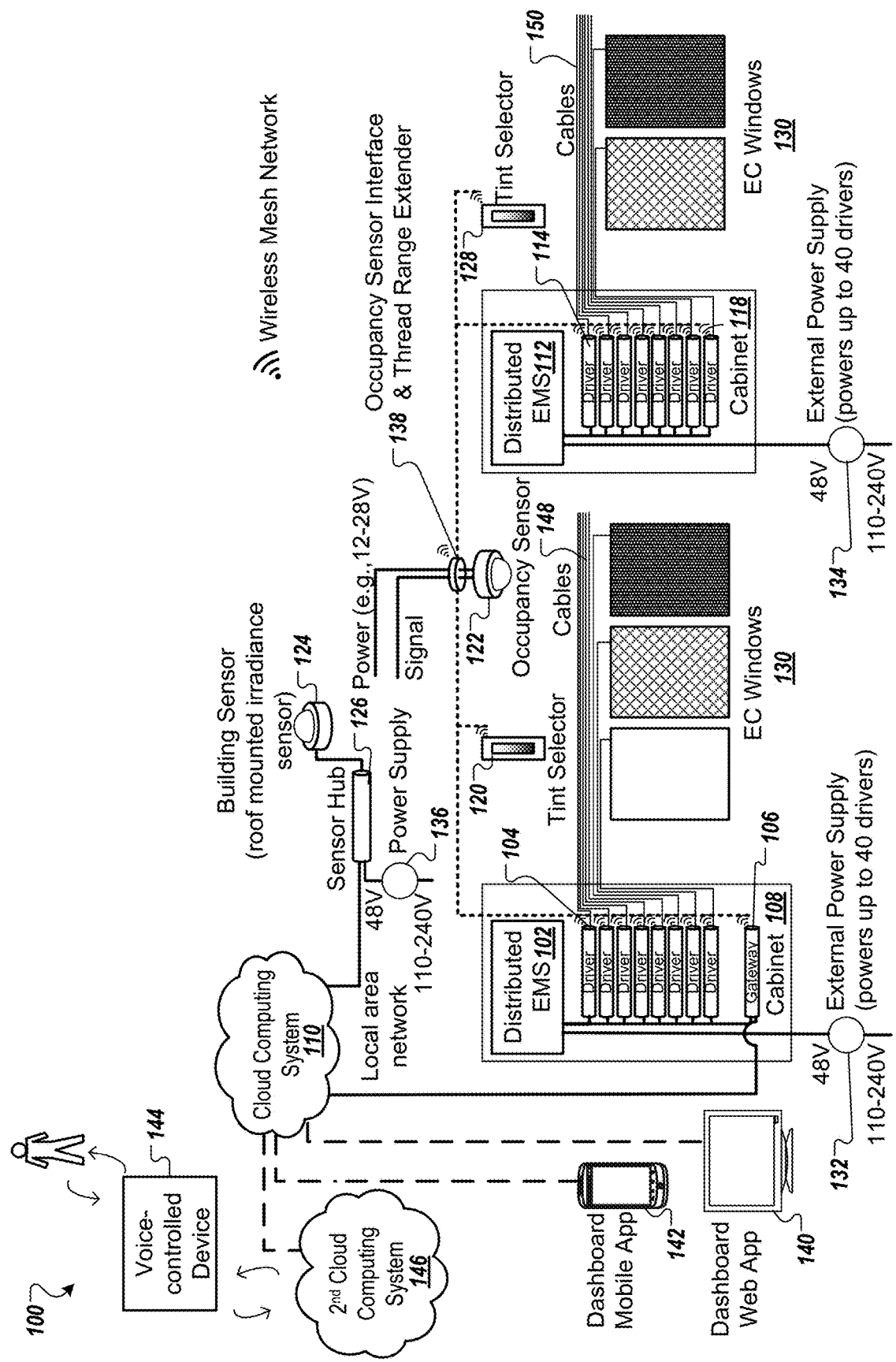
FIG. 1 is a block diagram of an electrochromic window system, according to certain embodiments.

Automated control of an electrochromic device (e.g., using one or more of an obstruction map, allowable sunlight map, reflection map, illuminance value, or the like) is described. Electrochromic devices can be, for example, used for smart windows in a commercial or residential building. A smart window refers to one or more glass units whose characteristics (e.g., a tint level representing a particular transmittance parameter, optical scattering characteristics, etc.) can be changed automatically (e.g., at a particular time, in response to a weather condition, etc.). Selectively tinting smart windows may allow some control of solar heat gain of a building to decrease energy used for heating and/or cooling (e.g., tinting smart windows on sunny summer days allows for less solar heat gain, untinting smart windows in sunny winter days allows for more solar heat gain). Selectively tinting smart windows may provide effective use of daylight (e.g., daylighting) to decrease energy used for lighting. Whereas properly controlled smart windows may reduce energy used for heating, cooling, and lighting, improper control of smart windows may increase energy consumption and decrease user comfort (e.g., not properly allowing natural light, allowing glare from direct sunlight, etc.). A modern multi-story building can include thousands of external and internal windows. As such, controlling electrochromic devices in an efficient manner becomes increasingly important.

Conventional systems typically use local computers to control electrochromic devices by using external light data from an exterior sensor. For example, the local computer may untint the electrochromic devices to allow natural light into a room responsive to receiving external light data from a roof-mounted sensor indicating that the roof-mounted sensor is not receiving direct sunlight. The local computer may tint electrochromic devices to avoid glare (e.g., avoid direct sunlight shining on the occupants of the room) responsive to receiving external light data from a roof-mounted sensor indicating that the roof-mounted sensor is receiving direct sunlight.

The use of local computers with a roof-mounted sensor to control electrochromic devices based on external light data has several deficiencies. For example, the local computer may tint all of the connected electrochromic devices responsive to detecting direct sunlight by the roof-mounted sensor. However, for some of the electrochromic devices, the direct sunlight may be blocked by one or more obstructions, such as a building overhang, one or more neighboring buildings, a tree, etc. Tinting an electrochromic device that is obstructed from direct sunlight may cause occupant dissatisfaction since occupants may prefer to have natural light via untinted electrochromic devices if there is no glare. Tinting an electrochromic device that is obstructed from direct sunlight causes increased energy usage, processor overhead, and required bandwidth to unnecessarily tint and untint the electrochromic device (e.g., during partly cloudy weather conditions). Tinting an electrochromic device that is obstructed from direct sunlight may cause energy inefficiencies of a building (e.g., an unnecessarily tinted electrochromic device may increase energy used for lighting and/or heating, whereas an untinted electrochromic device could help lower the energy used for electric lighting and/or heating).

Aspects of the present disclosure address the deficiencies of conventional systems by providing automated control of an electrochromic device. The present disclosure may provide automated control of an electrochromic device to account for one or more types of glare, such as direct sunlight (e.g., via an obstruction map, allowable sunlight map), specular reflection (e.g., via a reflection map), illuminance such as diffuse reflection (e.g., via an illuminance value), or the like.

In some embodiments, a server device may generate an obstruction map that indicates an obstructed portion and/or an unobstructed portion of an electrochromic device. For example, from the viewpoint of an electrochromic device looking outside, a building overhang, one or more buildings, a tree, etc. that block the electrochromic device (e.g., come between the sun and the electrochromic device) may correspond to an obstructed portion of the sky that shades the electrochromic device. The server device may determine, based on the obstruction map, a desired tinting state of the electrochromic device (e.g., whether the electrochromic device should be tinted or untinted). Responsive to determining the desired tinting state of the electrochromic device, the server device may cause the current tinting state of the electrochromic device to correspond to the determined desired tinting state (e.g., by transmitting instructions to the gateway that controls the driver coupled to the electrochromic device). For example, the server device may send instructions to change the tinting state of the electrochromic device to match the desired tinting state (e.g., if the server device is aware of the current tinting state of the electrochromic device). Alternatively, the server device may send instructions including the desired tinting state and the gateway or the driver may decide whether the tinting state of the electrochromic device should be changed to match the desired tinting state. As used herein, the server device may refer to a single server device or multiple server devices. In some embodiments, one or more other components (e.g., gateway, etc.) may perform some of the functionalities described herein as performed by a server device. As used herein, the tinting state may refer to a particular tint level. For example, the tinting state may be tinted or untinted (e.g., tinted may be above 50% tinted and untinted may be below 50% tinted, tinted may be at least 75% tinted and untinted may be at most 25% tinted, etc.), or have more variations that each represent a distinct tint level (e.g., tint level 1, tint level 2, tint level n, etc.).

In some embodiments, the server device may generate the obstruction map based on one or more images (e.g., a photographic method). The server device may receive an image captured from a viewpoint of the electrochromic device, where the viewpoint faces exterior of a room associated with the electrochromic device (e.g., an image taken from the electrochromic device directed to outside). The server device may identify an obstructed portion and/or an unobstructed portion of the image (e.g., blue pixels corresponding to sky may be unobstructed portion of the image, responsive to receiving user input identifying an obstructed portion and/or unobstructed portion). The server device may generate the obstruction map based on the obstructed portion of the image and/or the unobstructed portion of the image.

In some embodiments, the server device may generate the obstruction map based on one or more dimensions (e.g., geometries of the electrochromic device and/or obstructions, based on an analytics method). The server device may receive first dimensions of the electrochromic device (e.g., height, width, or thickness of the electrochromic device) and second dimensions (e.g., an overhang, height of the overhang above the electrochromic device, extension of the overhang) of one or more obstructions of the electrochromic device. The server device may generate the obstruction map based on the first and second dimensions.

In some embodiments, the server device may generate the obstruction map based on a three-dimensional (3D) model of environment relative to the electrochromic device (e.g., a ray-tracing method). The 3D model may include the electrochromic device, the building corresponding to the electrochromic device, overhangs of the building, additional buildings proximate to the electrochromic device, etc.

In some embodiments, the server device may generate the obstruction map based on two or more of an image, dimensions, or a 3D model.

In some embodiments, the server device may receive propagation information indicating one or more portions of a room (corresponding to the electrochromic device) where direct sunlight is allowed. The propagation information may include a distance from the electrochromic device (e.g., three feet into the room from the electrochromic device) and/or a height (e.g., three feet into the room and two feet off of the floor) where direct sunlight is allowed. The propagation information may include an image from a viewpoint of the electrochromic device looking into the room, where a propagation portion of the image corresponds to portions of the room where direct sunlight can propagate (e.g., the floor). The server device may use the propagation information (e.g., in addition to the obstruction map) to determine the desired tinting state of the electrochromic device.

In some embodiments, the server device may receive a sun map (e.g., sun path) or sun position table indicating the position of the sun relative to the electrochromic device (e.g., trajectory of the sun at different times of the day and different days of the year). The server device may receive sensor data (e.g., indicating direct sunlight or no direct sunlight) from one or more exterior sensors. The server device may determine the desired tinting state of the electrochromic device based on comparing the obstruction map to the sun map to determine whether the sun is within the unobstructed portion of the obstruction map and based on determining whether there is current direct sunlight in view of the sensor data.

Aspects of the present disclosure result in technological advantages of significant reduction in energy consumption (e.g., battery consumption, heating energy, cooling energy, lighting energy, etc.), required bandwidth, processor overhead, and so forth. In some embodiments, the technological advantages result from using one or more of an obstruction map, a reflection map, or an illuminance value to control an electrochromic device. By using one or more of an obstruction map, a reflection map, or an illuminance value, a server device may cause tinting of only electrochromic devices that would have glare and not tint electrochromic devices where there is allowable daylight (e.g., obstructed direct sunlight, no reflected sunlight, allowable amount of illuminance, obstructed glare, or the like). This provides more occupant satisfaction since occupants may prefer to have natural light via the electrochromic devices if there is no glare and may reduce the switching of tint level of the electrochromic devices that do not have glare (e.g., are obstructed from glare). By using one or more of an obstruction map, a reflection map, or an illuminance value to provide automated control of electrochromic devices lowers energy usage, processor overhead, and required bandwidth, as the tint levels of the electrochromic devices are not unnecessarily changed. By using one or more of an obstruction map, a reflection map, or an illuminance value, unnecessary tinting of electrochromic devices (e.g., obstructed from direct sunlight, that do not have reflections, that have an allowable illuminance value) can be avoided, which may increase energy efficiencies of buildings as untinted windows may lower the building heating and lighting requirements.

FIG. 1 is a block diagram of an electrochromic window system 100 (e.g., smart window system) that provides automated control of an electrochromic device (e.g., using one or more of an obstruction map, allowable sunlight map, reflection map, illuminance value, or the like), according to one embodiment. The electrochromic window system 100 includes a first cabinet 108 in which a first distributed energy management system (EMS) 102, a first set of drivers 104, and a gateway 106 are located. In an alternate embodiment, the drivers 104 may be integrated drivers where one or more drivers are integrated into the EC windows. Each of the set of drivers 104 is coupled to an individual one of a set of electrochromic (EC) windows 130. Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window, in the integrated glass unit (IGU) of the EC window, or in the laminated glass unit (LGU) of the EC window.

Each EC window may include an electrochromic panel (e.g., glass or film) that can change transmittance with the application of electric current and voltage. The change of transmittance typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmittance, 50% tint level is 21% transmittance, 100% tint level is 2% transmittance, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply 208). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of EC windows 130. Additionally, the distributed EMS can be used to drive multi-panel electrochromic windows that include more than one EC window 130 connected in series or parallel. A multi-panel electrochromic window may be one where the EC windows 130 are stacked over one another to provide very low transmittance of light through the devices, for example less than 1% transmittance of light or less than 0.1% transmittance of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, automated control, glare control, etc.) to users accessing the cloud computing system 110 via a network. The applications may allow users to manipulate (e.g., access, create, edit, store, delete, share, collaborate, print, etc.) electronic documents (e.g., schedules, rules, configurations, automated control, glare control, etc.). The cloud computing system 110 may include one or more server devices and one or more data stores. The cloud computing system 110 may include an automated control module 224 (see FIG. 2). The automated control module 224 may include one or more applications, one or more server devices, etc. The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4, IPv6, or Transport Layer Security (TLS) networking protocols. The cloud computing system 110 can provide control logic, automated control (e.g., glare control, cause tint level of the EC windows 130 to be set to avoid glare), and configuration for the electrochromic window system 100. The cloud computing system 110 may receive information (e.g., via one or more application programming interfaces (APIs), weather information, etc.) for providing automated control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., for providing automated control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.)

The cloud computing system 110 can provide automation algorithms, data analytics, user management, security protocols, and the like. The cloud computing system 110 can provide extensive system health monitoring and proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as with a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture (e.g., application architecture) that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to the local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

In some embodiments (e.g., residential installations), one or more of the components of the electrochromic window system 100 may be combined. For example, one piece of hardware may include a gateway and two or more electrochromic windows (e.g., hardware that includes a gateway and one or more drivers). In some embodiments (e.g., residential installations), the gateway may transmit data less frequently and/or transmit less data. In some examples, the gateway transmits data at a predetermined point in time (e.g., without transmitting a subset of the data stream immediately). In some examples, the gateway discards a subset of the data stream (e.g., does not store the subset in the file (data file) to be transmitted to the server device. In some examples, the gateway stores the data stream or a subset of the data stream locally (e.g., instead of transmitting the data stream to the server device). In some embodiments, the gateway transmits a subset of the data stream to the server device responsive to a request (e.g., specifying particular types of events, errors, malfunctions, etc.) from the server device (e.g., otherwise the gateway stores and/or discards data). In some embodiments, the gateway dynamically configures what data is transmitted (e.g., based on bandwidth, storage, cost, etc.). In some embodiments, the gateway transmits and/or stores the data that changes (e.g., changes over time, varies from a schedule, that is not redundant, changes from last state of interest, reportable change, anomalous behavior, manually overriding a tinting schedule, etc.).

In some embodiments, one or more of a corresponding tint selector 120, driver 104, one or more EC windows 130, occupancy sensor, etc. are located in each unit (e.g., townhome, apartment, portion of prefabricated building, portion of modular building) and a common gateway 106 is located in a central location (e.g., hallway, mechanical room, etc.). Thread range extenders may be used for the common gateway 106 to communicate with the other components. A user may have access to a user account and a tint selector that only control EC windows 130 corresponding to the unit to which the user has access.

In some embodiments, one or more components (e.g., gateway 106, sensor hub 126, etc.) of the electrochromic window system 100 may have two or more network connections. In some examples, two or more wired network connections (e.g., each corresponding to a different network) may be routed to the same component. In some examples, a wired network connection and a wireless network connection (e.g., each corresponding to a different network) may be provided to the same component. In some examples, two or more wireless network connections (e.g., each corresponding to a different network) may be provided to the same component. A first network may be a primary network (e.g., cable network, Ethernet network, etc.) and a second network may be a cell modem backup network (e.g., integrated cellular modular in the cabinet). The cabinet 108 may have a router for receiving the different network connections. The one or more networks to which components of the electrochromic window system 100 are connected may be separate from other building networks.

In some embodiments, one or more components (e.g., gateway 106, sensor hub 126, etc.) of the electrochromic window system 100 transmit and receive data via the network that is functioning (e.g., if the primary network is down, the cell modem backup network is used). In some embodiments, one network (e.g., cable network) has a lower price than a backup network (e.g., cell modem backup network). The components of the electrochromic window system 100 may send higher priority data via whichever network is functioning and may wait until the lower-price network is functioning to transmit lower priority data. In some embodiments, one or more components (e.g., gateway 106, sensor hub 126, etc.) of the electrochromic window system 100 are aware of which network connection is functioning. In some embodiments, one or more components (e.g., gateway 106, sensor hub 126, etc.) of the electrochromic window system 100 transmit a message to the cloud computing system 110 (e.g., requesting via which network the cloud computing system 110 is receiving the message) and the cloud computing system 110 may provide a response indicating via which network (e.g., hardwired network or cellular network) the message was received. The component of the electrochromic window system 100 may determine which network is functioning based on the response.

In some embodiments, one or more components of the electrochromic window system 100 use wireless power (e.g., wireless power transfer (WPT), non-wired power). The wireless transfer of power may be via induction (e.g., electromagnetic induction, inductive coupling of magnetic fields, non-radiative induction), resonance (e.g., radiative electromagnetic resonance, resonance induction), radio frequency (RF) power transfer (e.g., uncoupled RF wireless power transfer), microwave power transfer, and/or laser power transfer. For example, a driver may wirelessly transmit power to an EC window 130.

In some embodiments, one or more of the EC windows 130 are photovoltaic (PV) windows (e.g., PV EC windows) that include a PV coating coupled to a battery. The PV coating may collect energy from the sun and charge the battery. The battery, wireless power, and/or an external power supply (e.g., via one or more drivers, via distributed EMS, etc.) may be used to tint the EC window (e.g., the battery may be used first and then one or more drivers may be used as a backup power supply).

Figure 2:
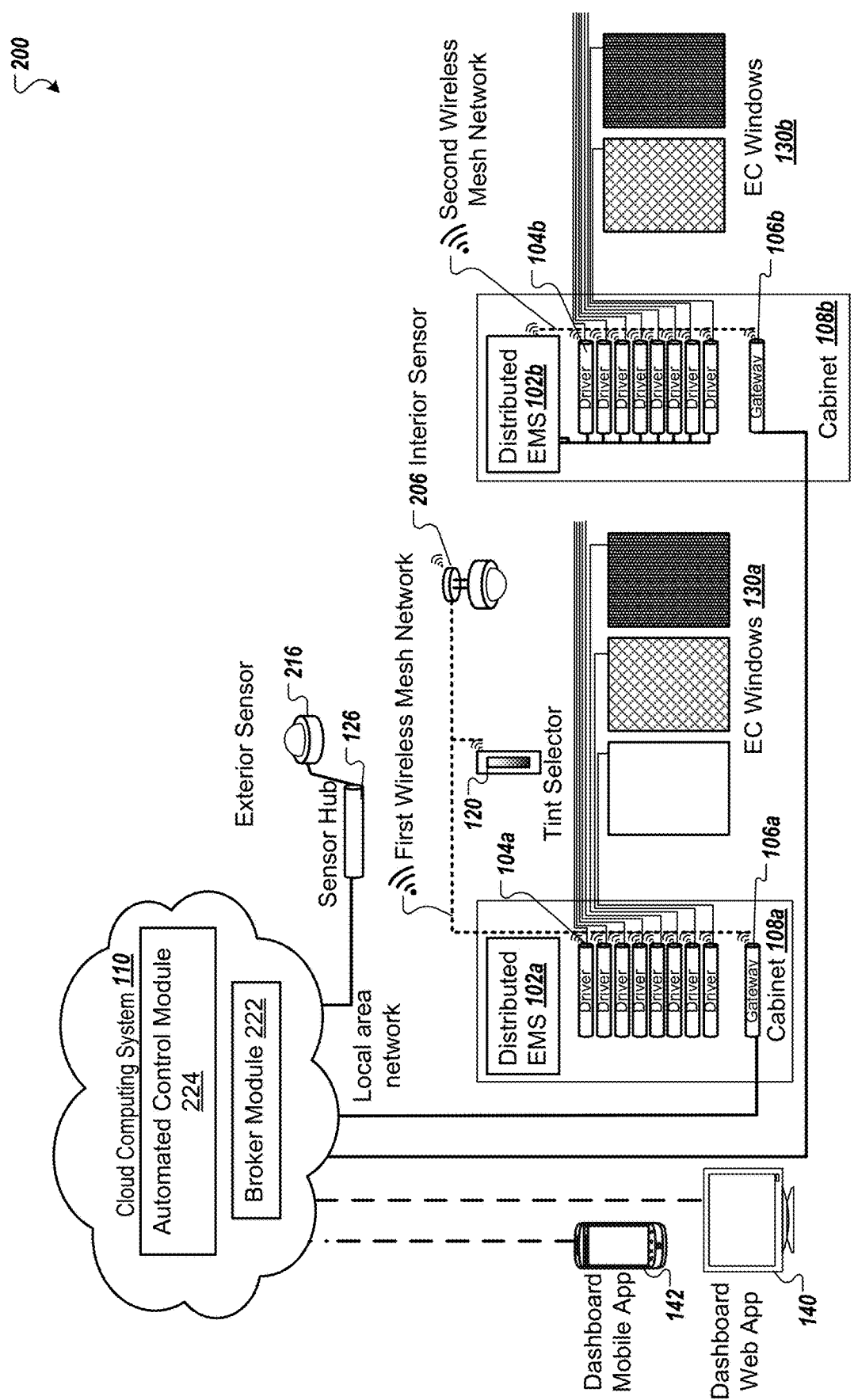
FIG. 2 is a block diagram of an electrochromic window system including an automated control module, according to certain embodiments.

FIG. 2 is a block diagram of an electrochromic window system 200 (e.g., smart window system) including an automated control module 224 and a broker module 222, according to certain embodiments. Components with the same reference number as those in FIG. 1 may include similar or the same functionalities as those described in relation to FIG. 1. One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the automated control module 224. In some embodiments, the automated control module 224 is a single module that operates on the cloud computing system 110. In some embodiments, the automated control module 224 includes two or more modules (e.g., two or more microservices, two or more applications). In some embodiments, the automated module 224 includes two or more modules (e.g., two or more microservices). For example, the automated module 224 (e.g., logic, schedules, trained machine learning model, a retrained machine learning model, etc.) may be deployed at the gateway 106. Components of the electrochromic window system 200 may have a wired and/or wireless connection to one or more other components of the electrochromic window system 200. For example, the gateway may have a wired and/or wireless connection to one or more of the distributed EMS 102, one or more drivers 104, sensor hub 126, exterior sensor 216, interior sensor 206, tint selector 120, and/or one or more EC windows 130. Each of the components of the electrochromic window system 200 may have one or more wireless interfaces, one or more wired interfaces, or any combination thereof. For example, one or more components of the electrochromic window system 200 may include one or more radios, one or more wired transceivers (e.g., Universal Asynchronous Receiver/Transmitter (UART), power line communication (PLC) transceiver), or the like. One or more components (e.g., drivers 104, the gateway 106, the tint selector 120, or the like) of the electrochromic window system 200 may communicate over one or more wired connections or even over power lines.

One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud computing module 224. In some embodiments, the automated module 224 is a single module that operates on the cloud computing system 110. In some embodiments, the automated control module 224 may include one or more applications and one or more servers.

The electrochromic window system 200 may include the cloud computing system 110 and components including one or more of drivers 104, one or more gateways 106, EC windows 130 (e.g., PV EC windows, battery coupled to PV coating, etc.), distributed EMS 102, tint selector 120, interior sensors 206, sensor hub 126, exterior sensors 216, etc. The cloud computing system 110 may include the automated control module 224 and the broker module 222. The automated control module 224 may identify, send instructions to, and receive data from the components of the electrochromic window system 200 (e.g., via broker module 222).

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (shadowed light, diffuse horizontal irradiance (DHI)), calculate direct normal irradiance, include non-visible spectrum), etc. DHI may refer to the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

In some embodiments, a sensor (e.g., interior sensor 206, exterior sensor 216) transmits sensor data to the gateway 106. For example, one or more exterior sensors 216 (e.g., camera, temperature sensor, illuminance sensor, humidity sensor, pressure sensor, rain sensor, or the like) may be mounted on the roof and may transmit data (e.g., sensor data, images, etc.) to the gateway 106. In some embodiments, an exterior sensor 216 is coupled (e.g., wirelessly, wired, etc.) with the gateway 106 (e.g., without use of a sensor hub 126). In some embodiments, an exterior sensor 216 communicates with cloud computing system 110 (e.g., without use of a sensor hub 126, without use of gateway 106). In some embodiments, a sensor (e.g., interior sensor 206, exterior sensor 216) has a wireless module to be able to communicate with the cloud computing system 110 and/or other components (e.g., sensor hub 126, gateway 106, etc.). In some embodiments, one or more exterior sensors 216 and a sensor hub 126 may be integrated into a single component that has the functionalities of exterior sensors 216 and the sensor hub 126.

Each gateway 106 may be coupled, via a corresponding wireless mesh network, to corresponding drivers 104 that control corresponding EC windows 130. For example, gateway 106*a* may be coupled, via a first wireless mesh network, to drivers 104*a* that control EC windows 130*a* and gateway 106*b* may be coupled, via a second wireless mesh network, to drivers 104*b* that control EC windows 130*b* (e.g., the EC windows 130 span more than one wireless mesh network). The drivers 104*a* may be coupled to a gateway 106*a* and drivers 104*b* to gateway 106*b* because of capacities (e.g., capacity of each gateway 106, cabinet 108, distributed EMS 102, wireless mesh network, etc.), length of cables, etc.

In some embodiments, the automated control module 224 may generate an obstruction map based on one or more of an image, dimensions, or a 3D model (e.g., see FIGS. 3B-D). The automated control module 224 may receive a sun map or sun position table indicating the position of the sun at different times of each day. The automated control module 224 may receive propagation information indicating what portions of each room corresponding to an electrochromic device may receive direct sunlight. The automated control module 224 may store a corresponding obstruction map, sun map, and propagation information for each electrochromic device. The automated control module 224 may receive (e.g., via broker module 222) sensor data via the sensor hub 126 from one or more exterior sensors 216. The automated control module 224 may use the same sensor data for multiple electrochromic devices in the same area (e.g., same building, neighboring buildings, etc.).

In some embodiments, the automated control module 224 may generate one or more of an obstruction map, allowable sunlight map, reflection map, illuminance value, or the like. For each electrochromic device, the automated control module 224 may determine, based on a corresponding obstruction map, a corresponding sun map, corresponding propagation information (e.g., allowable sunlight map), corresponding reflection map, corresponding illuminance value, and/or sensor data, a tint level (e.g., tinted or untinted, etc.) of a corresponding electrochromic device. For example, responsive to determining direct sunlight will not enter any portion of a room where sunlight is not allowed (e.g., on occupants, desks, monitors, etc.), the automated control module 224 may determine the corresponding electrochromic device is to be untinted. Responsive to determining direct sunlight will enter a portion of a room where sunlight is not allowed, the automated control module 224 may determine the corresponding electrochromic device is to be tinted.

The automated control module 224 may transmit tint instructions (e.g., via broker module 222) to a corresponding gateway 106 and the gateway 106 is to instruct the corresponding driver 104 to change the tint level of a corresponding electrochromic device 130 based on the instructions.

FIGS. 3A-D are flow diagrams of methods for providing control of an electrochromic device using an obstruction map (e.g., performing automated control), according to certain embodiments. The methods 300A-D can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 300A-D are performed by the cloud computing system 110 of FIG. 1 or FIG. 2. In some embodiments, the methods 300A-D are performed by one or more server devices of the cloud computing system 110. In some embodiments, the methods 300A-D are performed by a processing device of the cloud computing system 110 (e.g., a non-transitory machine-readable storage medium storing instructions which, when executed cause a processing device to perform methods 300A-D). In some embodiments, the methods 300A-D are performed by an automated control module 224 of the cloud computing system 110. In some embodiments, one or more portions of methods 300A-D are performed by one or more other components (e.g., gateway, etc.). For example, the server device may transmit one or more of an obstruction map, projection information, sun map, or sensor data to the gateway and the gateway may use the one or more of obstruction map, projection information, sun map, or sensor data to control an electrochromic device.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3A:
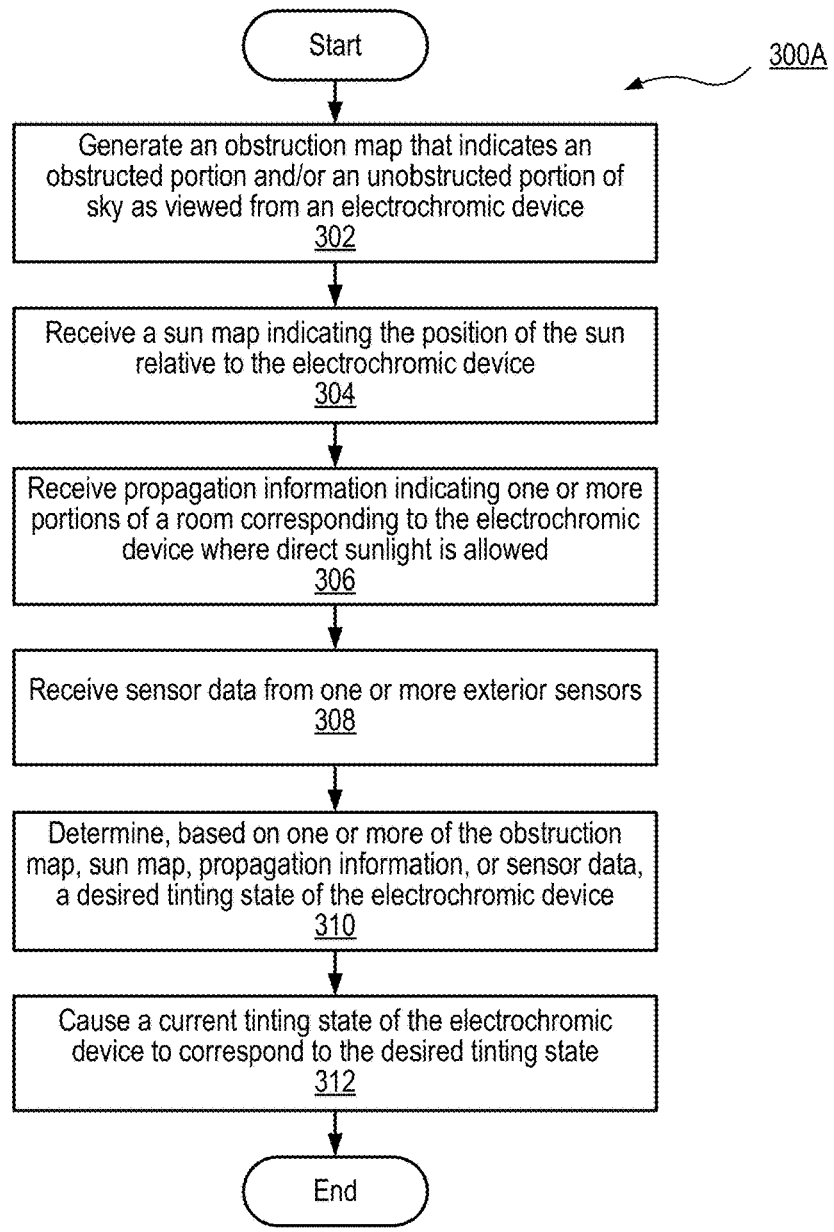

Referring to FIG. 3A, the method 300A begins at block 302 by the processing logic generating an obstruction map that indicates an obstructed portion and/or an unobstructed portion of sky as viewed from an electrochromic device. For example, from the viewpoint of an electrochromic device looking outside, the obstructed portion may correspond to a first portion of the electrochromic that is obstructed (e.g., by a building overhang, one or more buildings, a tree, etc.) from receiving direct sunlight. The obstruction map may be generated for an electrochromic device (e.g., electrochromic device 402 of FIG. 4A) by a photographic method (e.g., method 300B of FIG. 3B; see FIGS. 4B-R), a geometric method (e.g., method 300C of FIG. 3C; see FIGS. 4S-T), and/or a ray-tracing method (e.g., method 300D of FIG. 3D; see FIG. 4U).

The processing logic may generate the obstruction map in an image-based format (e.g., image projection format) that has angular maps of solar obstructions (e.g., characterize angular locations of exterior obstructions that cause shadows on an electrochromic device). Exterior shading obstructions (e.g., solar obstructions) may include building attachments (e.g., overhangs and fins) or site obstructions (e.g., neighboring buildings, trees). The image based storage format may use an angular representation with azimuth angle for the x-axis and profile angle for the y-axis. The image format may preserve lines that are orthonormal to a vector perpendicular to the electrochromic device (e.g., perpendicular to a façade).

The processing logic may generate (e.g., using the photographic, geometric, and/or ray tracing methods) the obstruction map in an image projection format. In some embodiments, the obstruction map is in a format for representing panoramic views. In some embodiments, the obstruction map is in a wide angle projection (e.g., preserve straight lines or object shape). In some embodiments, the obstruction map represents a full hemisphere (e.g., fisheye projection, spherical projection). In some embodiments, the obstruction map uses an equi-rectangular projection (e.g., spherical photo, non-vertical straight lines in physical space represented as curves in the image). In some embodiments, the obstruction map uses a double projection format to improve appearance of straight lines in a hemispherical projection (e.g., non-vertical straight lines represented as curves). In some embodiments, the obstruction map is an equi-rectangular image that is converted into a unit cube set of images to more easily identify straight lines (e.g., six images of a unit cube project may preserve straightness of lines, the format may use six angle bases). In some embodiments, content-adaptive projection methods may be used to preserve straight lines in the obstruction map based on content. In some embodiments, the obstruction map is in an orthonormal pseudo-cylindrical format. The orthonormal pseudo-cylindrical projection maintains straightness of orthonormal geometry. The straight lines make it easier to identify and trace edges between obstructions and sky. The projection also appears more natural visually compared to other formats. In some embodiments, the obstruction map is in an equirectangular format. In some embodiments, the obstruction map uses the same format as the reflection map.

The image-based solar obstruction map relates obstructions relative to the electrochromic device. By using coordinates of the electrochromic device as a reference, the orientation of the electrochromic device, site coordinates, and time parameters may be excluded from the solar obstruction map. One benefit is that the orientation of the window could be changed without affecting the obstruction map if the building orientation was incorrectly determined or if the site latitude and longitude were incorrectly assigned (e.g., errors with orientation, such as from incorrect north arrows on drawings). An obstruction map that does not include time-based schedule formats for obstructions may not be invalidated if a parameter, such as window orientation, was incorrectly applied (e.g., due to error in orientation, such as from an incorrect north arrow on a drawings).

The image-based obstruction format also allows the blending of maps generated from various methods and data. Boolean operations on pixel values can be used to combine obstruction maps. For example, the photographic method could be used to generate an obstruction map for an urban context and the geometric method could be used to generate an obstruction map for an overhang. These two maps can be added together to generate a map that accounts for both overhang and neighboring buildings.

The obstruction map in the image projection format (e.g., orthonormal pseudo-cylindrical projection) may preserve straightness of lines orthonormal to the view direction, which may be useful for storing and querying the characterized solar obstructions. The straight lines may make it easier to identify and trace edges between obstructions and sky. The projection may appear more natural visually compared to other formats.

Obstructions may be defined as profile angle and azimuth angle cutoffs (e.g., since many cities are organized around a street grid). While a projection formats may have straight vertical lines for azimuthal angle cutoffs, the orthonormal projection adds straight horizontal lines for profile angle cutoffs. The sun path crosses a pixelated horizontal or vertical line once as compared to crossing a pixelated curved line multiple times.

The processing logic may use the obstruction map in the image-based format for storing and for querying solar obstructions. In some embodiments, the processing logic generates the obstruction map based on two or more of an image, obstruction dimensions, or a 3D model. In some embodiments, the processing logic receives the obstruction map (e.g., the obstruction map may be generated by another component).

Referring to FIG. 4A, an obstruction map may be generated for an electrochromic device 402 that is shaded by one or more obstructions 404 (e.g., overhang 404A, obstruction 404B to the side of the electrochromic device 402, neighboring buildings, tree, etc.). The electrochromic device 402 may be part of a façade and the processing logic may generate or receive an obstruction map for each electrochromic device in the façade (e.g., each electrochromic device of a 3×3 grid of electrochromic devices).

The obstruction map may be from the vantage of electrochromic device 402 looking outside. For example, the processing logic may generate the obstruction map using one or more images captured by a camera 406 of FIGS. 4B-C from the viewpoint (e.g., vantage) of the electrochromic device 402 (e.g., looking outward, see FIG. 4C).

An obstruction map generated by the photographic method is illustrated in FIG. 4Q. An obstruction map generated by the geometric method is illustrated in FIG. 4T. An obstruction map generated by the ray-tracing method is illustrated in FIG. 4U. As illustrated in FIG. 4V, there may be differences between a photographic obstruction map (e.g., an obstruction map generated using the photographic method of FIG. 3B), the geometric obstruction map (e.g., an obstruction map generated using the geometric method of FIG. 3C), and the ray-traced obstruction map (e.g., an obstruction map generated using the method in FIG. 3D).

In some embodiments, the processing logic may generate the obstruction map by combining obstruction maps generated by different methods. Responsive to user input that glare is to be minimized, the processing logic may combine the obstruction maps to maximize the unobstructed portion of the obstruction map (e.g., if any obstruction map indicates direct sunlight may enter the electrochromic device, the processing logic causes the electrochromic device to be tinted). Responsive to user input that natural light is to be maximized, the processing logic may combine the obstruction maps to maximize the obstructed portion of the obstruction map (e.g., if any obstruction map indicates direct sunlight may be obstructed from entering the electrochromic device, the processing logic causes the electrochromic device to be untinted). In some embodiments, the processing logic may receive user input to identify which portions of which obstruction maps to use.

Each method (e.g., methods 300B-D) may have intrinsic assumptions that may cause discrepancies. The first row of FIG. 4V illustrates the photographic and ray-traced obstruction maps. The difference between maps is shown in the middle between the maps, with the differences highlighted (e.g., in a darker shade). A difference in the first row is the neighboring buildings at the bottom of the photographic obstruction maps. The model used for ray-tracing did not contain the buildings, so the lack of neighboring buildings is expected. There is another difference along the right edge of the overhang, which could stem from one or more of a slight model error in the 3D model for ray-tracing, positioning difference between the camera in the physical space, and/or the origin used for rays in the virtual space.

The photographically and geometrically generated maps in the second row of FIG. 4V have the most discrepancies of all of the map comparisons. First, the geometric obstruction map only contains the jamb and overhang obstructions (e.g., the geometric method may only accept parameters for the electrochromic device and building overhangs). The façade to the left of the window is not incorporated in the geometric obstruction map. This element could be included in the geometric map by adding support for a fin shading geometry. Neighboring buildings may be too complex to be handled with an analytical obstruction map generator (e.g., neighboring buildings may be limited to ray-tracing or photographic methods). A more substantial difference occurs along the right edge of the overhang, where the geometric obstruction map has a different edge angle from both the ray-tracing and the photographic maps. FIG. 4W illustrates a rendering of the façade with the sun located in the region of discrepancy between obstruction maps. The rendering shows that a small part of the window receives direct sunshine, demonstrating that the geometrically derived map may be correct. Both the ray-traced and photographic methods used the lower corners of the electrochromic device to determine if the electrochromic device is shaded by the overhang. The rendering of FIG. 4W illustrates that both corners are shaded. Conversely, the cutoff angle methods used by geometric obstruction map generator effectively identifies when sunlight shines under the edge of the overhang onto any part of the electrochromic device.

The photographic and ray-tracing methods may be enhanced to better identify the spill light by considering multiple points along the bottom edge of the electrochromic device. Alternatively, a hybrid method could use the photographic map or ray-traced map for far-field obstructions such as neighboring buildings and overlay a second map generated with the geometric method for near-field obstructions such as building attached shading (overhangs and fins).

Returning to FIG. 3A, at block 304, the processing logic receives a sun map indicating the position of the sun relative to the electrochromic device (e.g., trajectory of the sun at different times of the day and different days of the year).

Figure 4D:
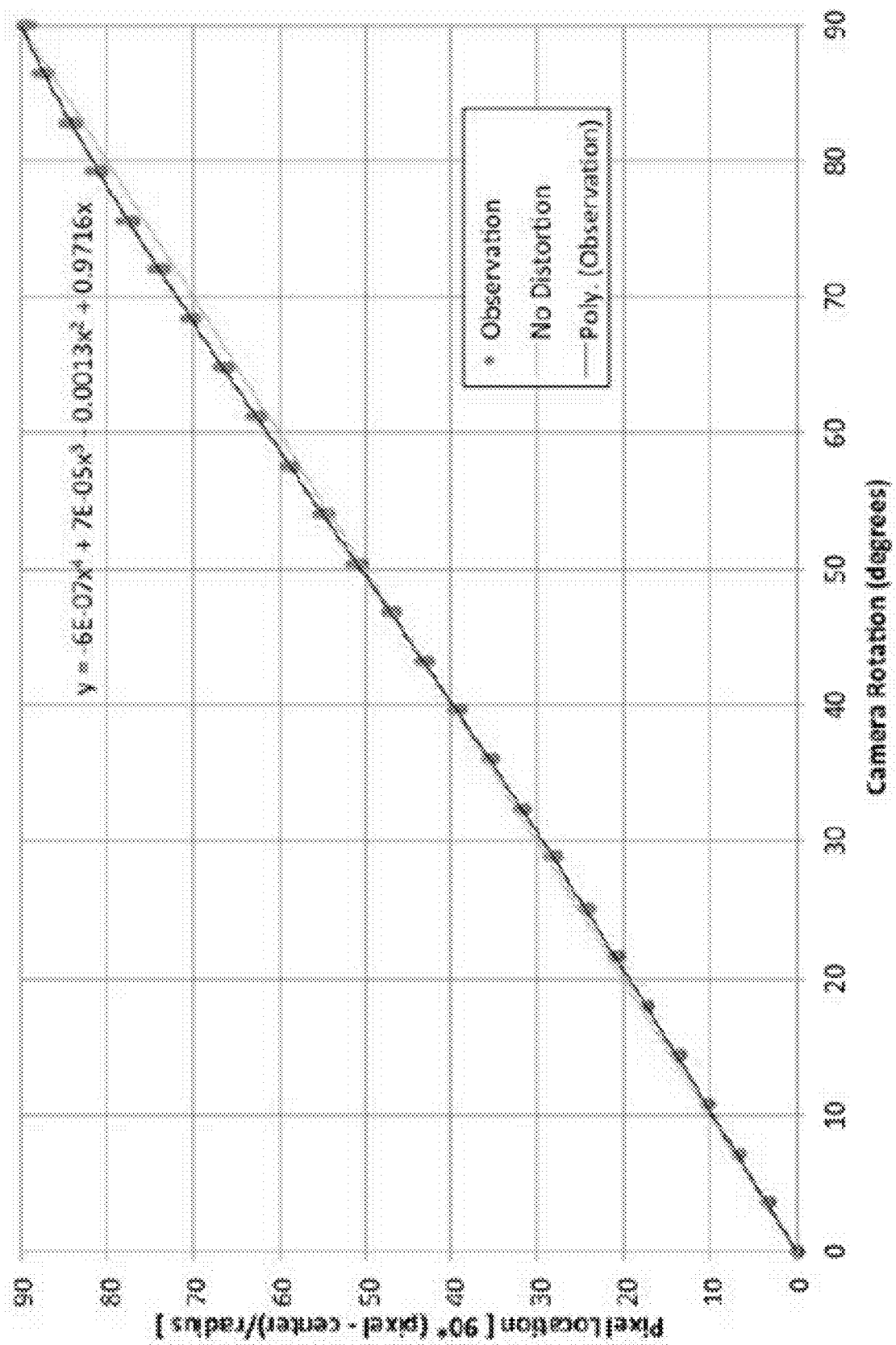
FIG. 4D is a graph illustrating a polynomial fit to observed angular distortion of a camera, according to certain embodiments.
Figure 4E:
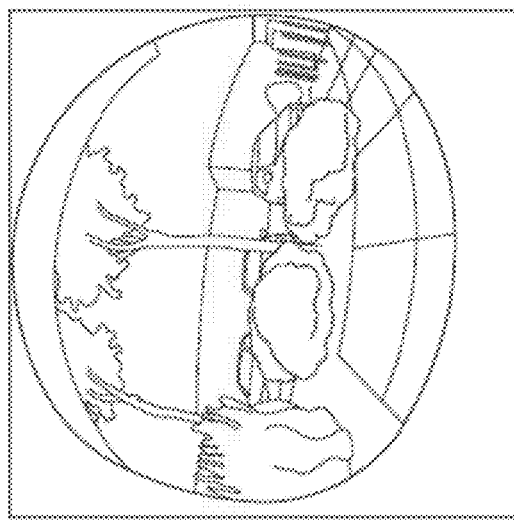
FIGS. 4E-G illustrate fisheye images from a viewpoint of the electrochromic device, according to certain embodiments.
Figure 4F:
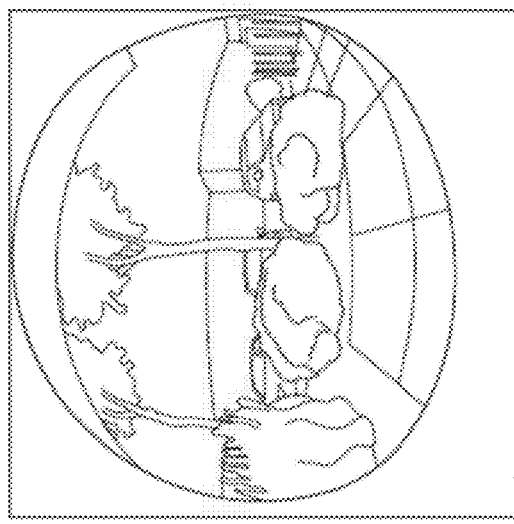
Figure 4G:
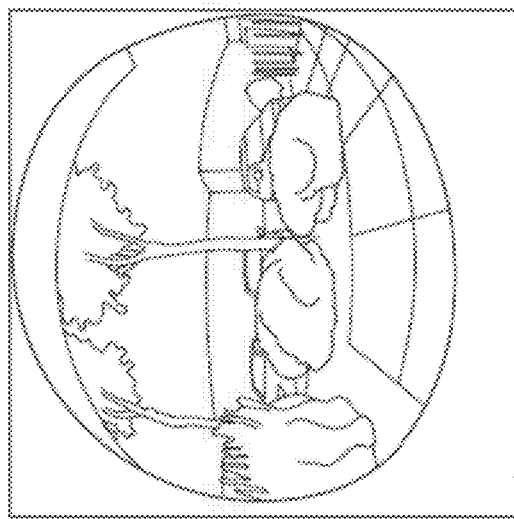
Figure 4I:
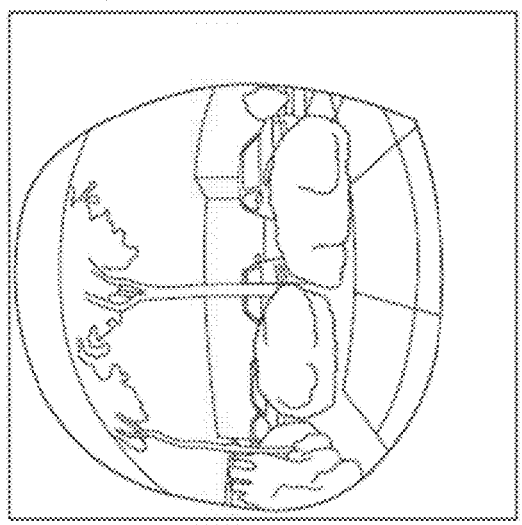
FIGS. 4H-I illustrate images captured from the left and the right side of the electrochromic device, according to certain embodiments.
Figure 4H:
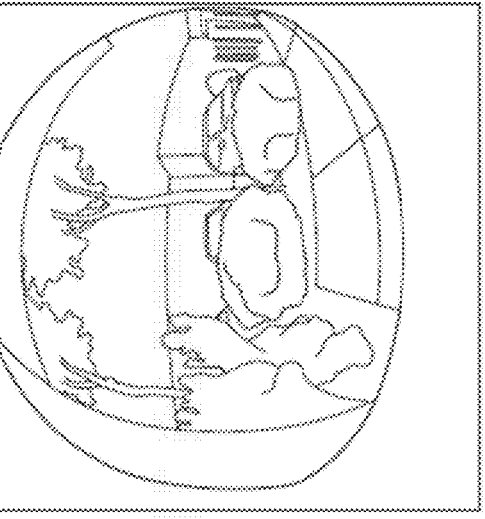
Figure 4J:
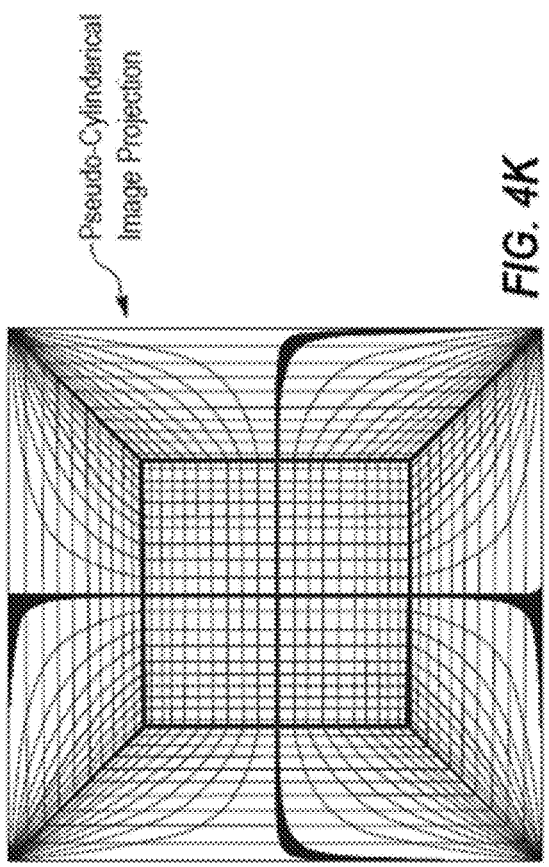
FIG. 4J illustrates rendering from inside a cube in equi-rectangular projection, according to certain embodiments.
Figure 4K:
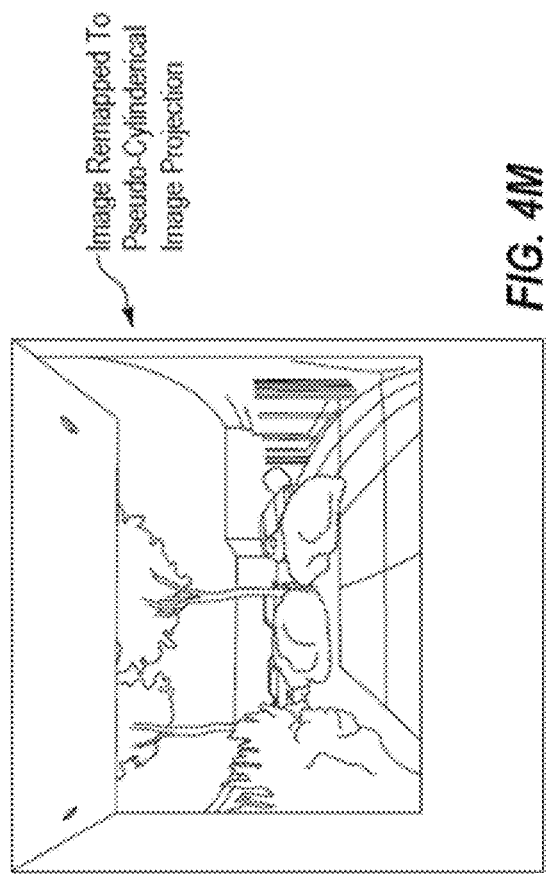
FIG. 4K illustrates rendering from inside a cube in orthonormal pseudo-cylindrical projection, according to certain embodiments.
Figure 4L:
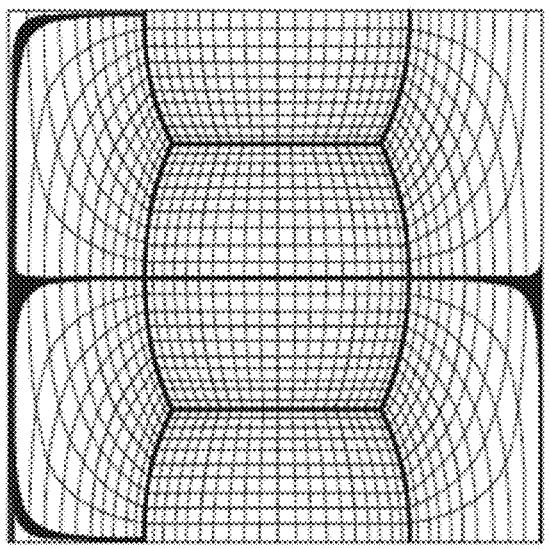
FIG. 4L illustrates a remapped hemispherical fisheye photo to equi-rectangular projection, according to certain embodiments.
Figure 4M:
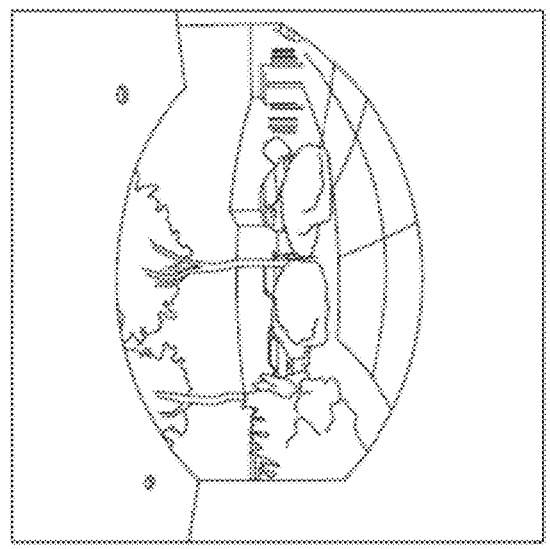
FIG. 4M illustrates a remapped hemispherical fisheye photo to orthonormal pseudo-cylindrical projection, according to certain embodiments.
Figure 4R:
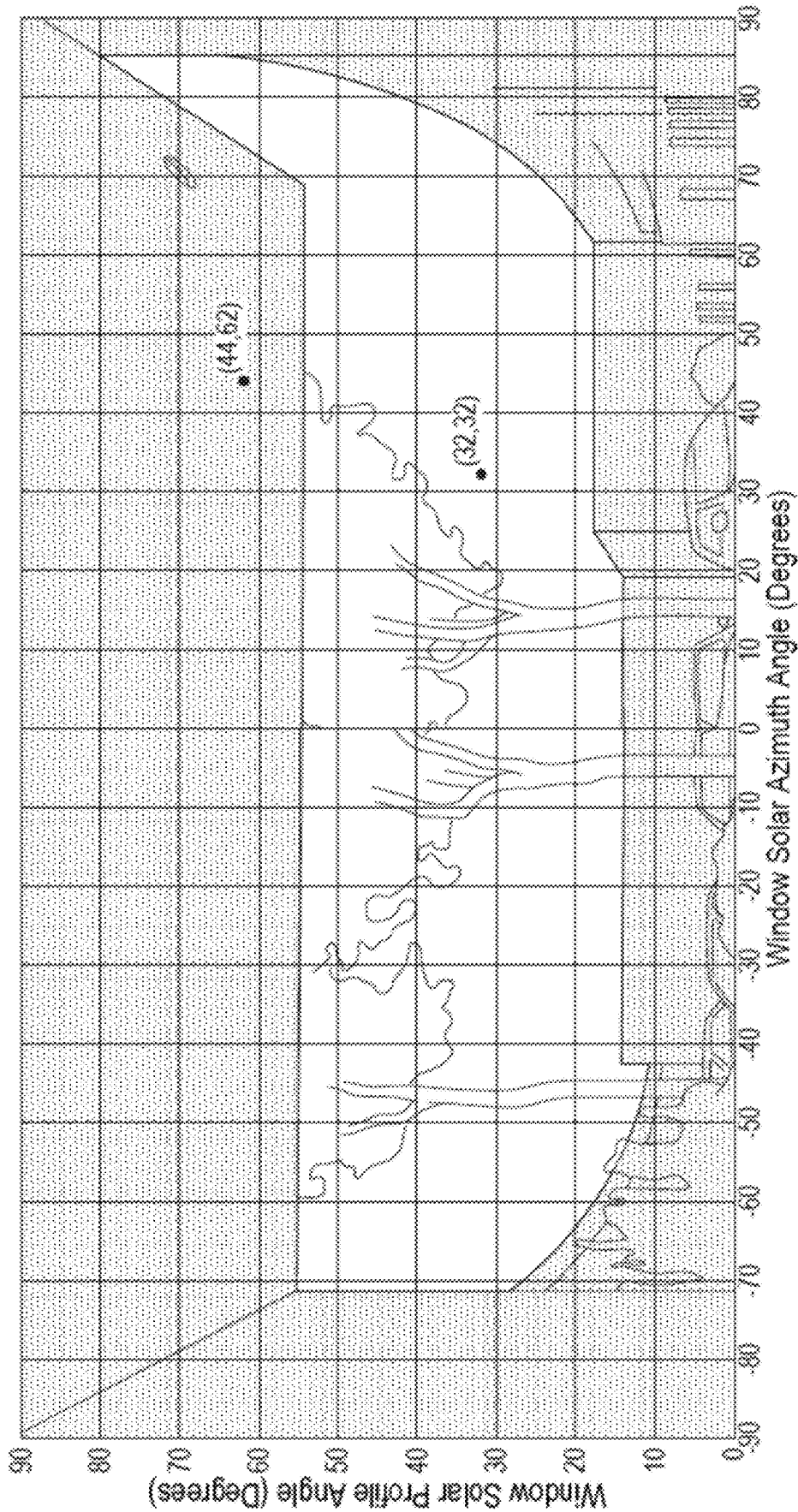
FIG. 4R illustrates a plot of queried solar positions overlaid on a traced image, according to certain embodiments.
Figure 4V:
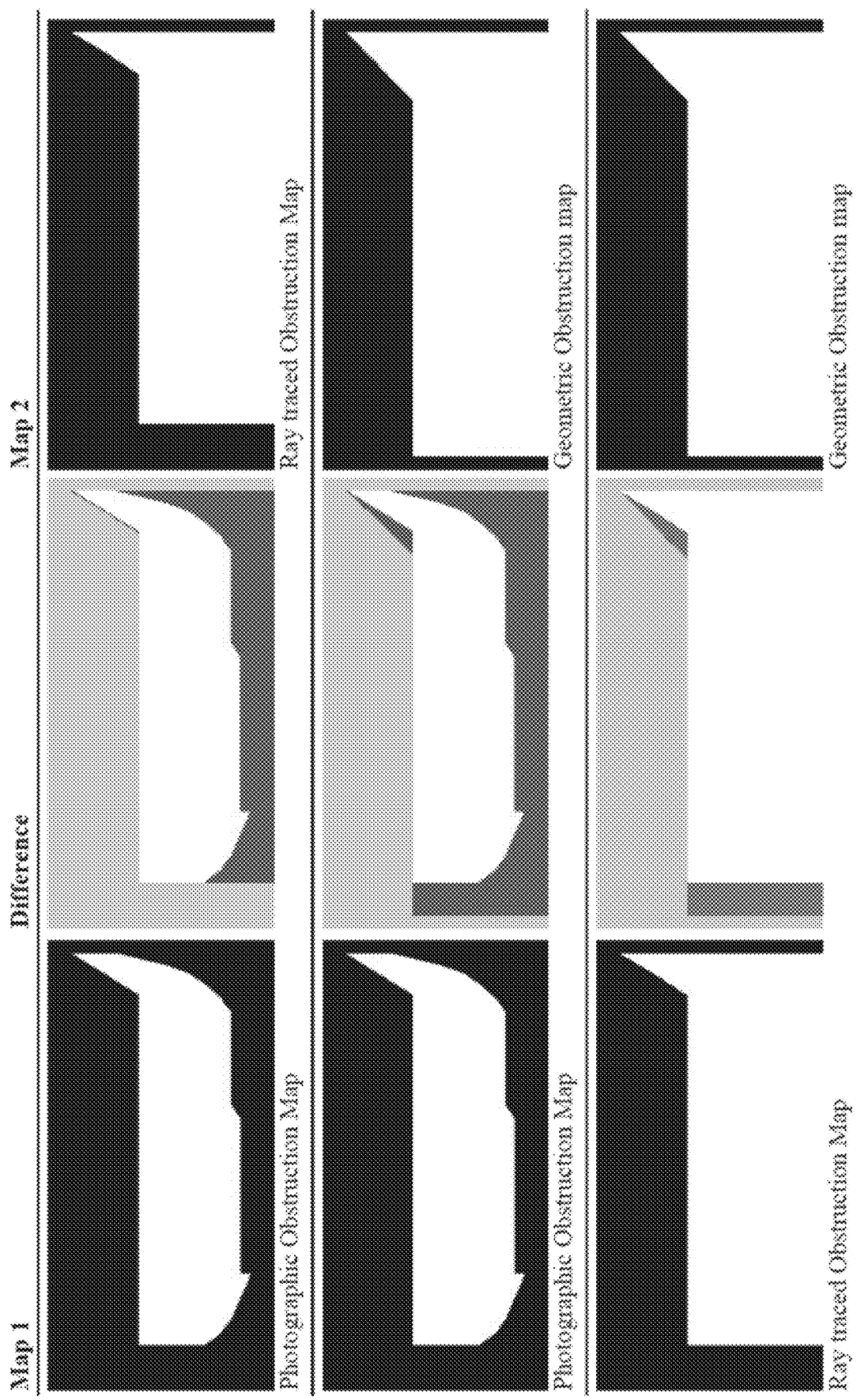
FIG. 4V is a comparison of obstruction maps generated with different methods, according to certain embodiments.
Figure 4W:
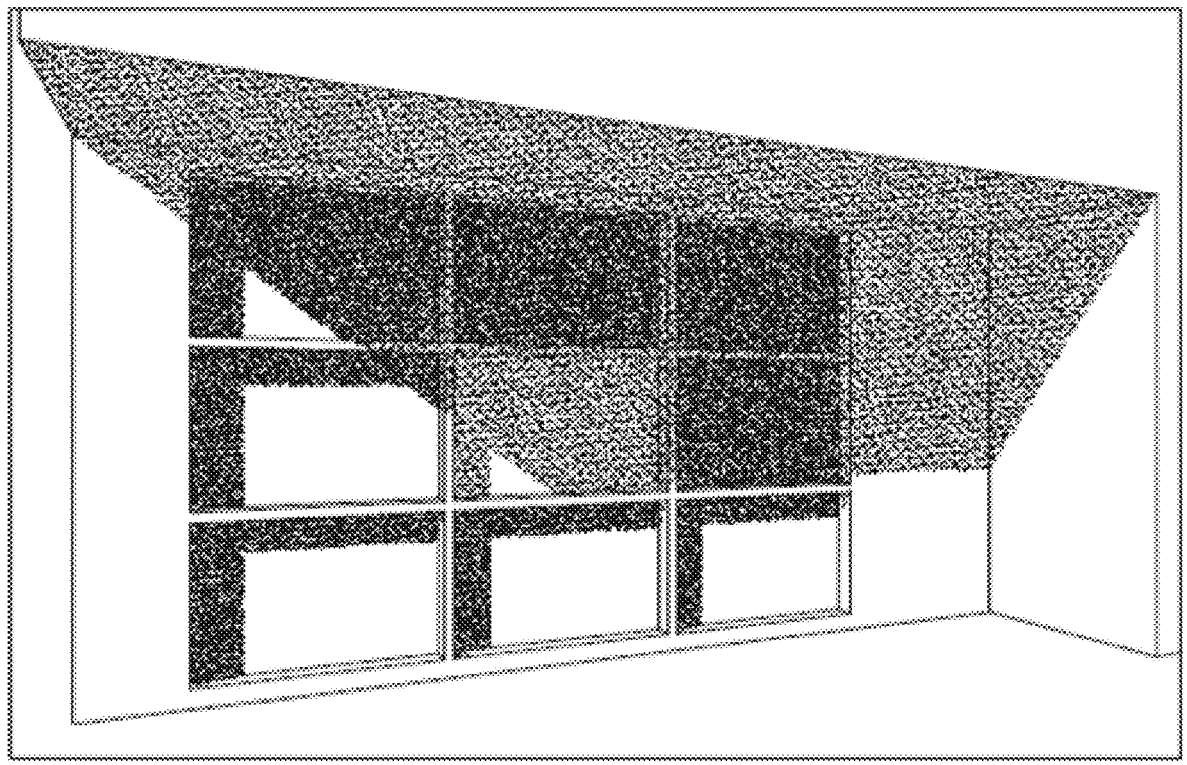
FIG. 4W illustrates a rendering of the façade with the sun located in the region of discrepancy between obstruction maps, according to certain embodiments.
Figure 4W:
Figure 4X:
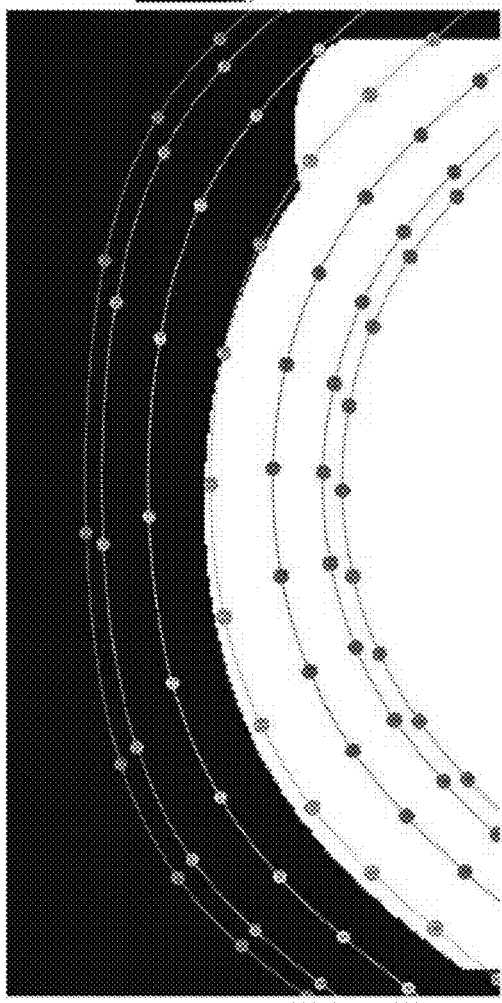
FIG. 4X illustrates a sun path overlaid on an overhang obstruction map using an equi-rectangular projection, according to certain embodiments.

For example, FIG. 4X is a sun map (e.g., sun path) overlaid on an obstruction map using an equi-rectangular projection. The façade orientation may be 4 degrees east of south. The top dotted line may be the path of the sun on June $21^{st}$, the bottom dotted line may be the path of the sun on December $21^{st}$, and the middle dotted line (fourth from top and fourth from bottom) may be the path of the sun on March $21^{st}$. Pixilation of the curved obstruction may cause the sun's path to cross between unobstructed (e.g., white) and obstructed (e.g., black) several times.

Figure 4Y:
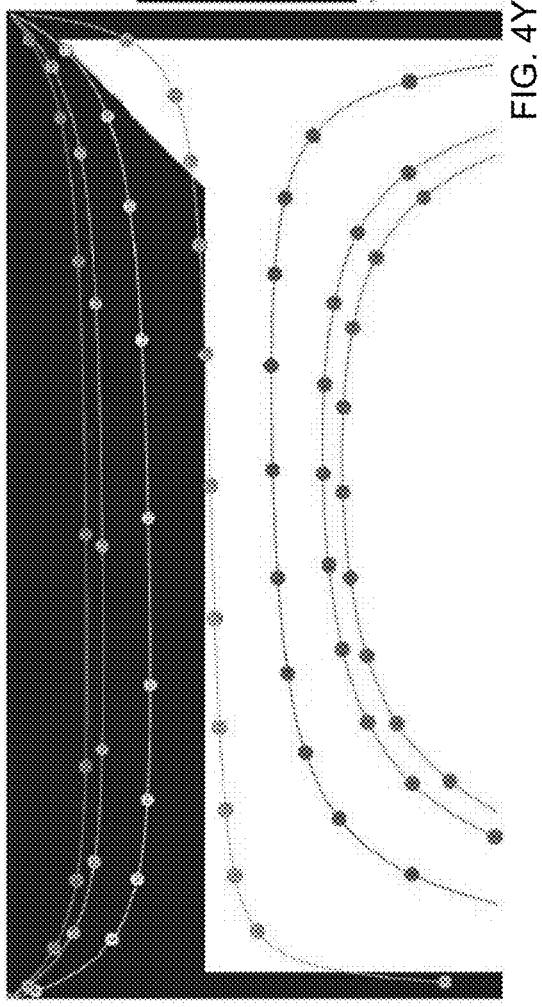
FIG. 4Y illustrates a sun path overlaid on an overhang obstruction map using an orthonormal pseudo-cylindrical projection, according to certain embodiments.

In another example, FIG. 4Y is a sun path overlaid on an obstruction map using an orthonormal pseudo-cylindrical projection. The configuration may be the same as FIG. 4X. In the zoomed portion to the right of FIG. 4Y, the sun path crosses from white to black a single time. Since the overhang is a horizontal line in this projection, pixilation does not result in many crossings between white and black.

Many obstructions may be defined as profile angle and azimuth angle cutoffs, since many cities are organized around a street grid. While most projection formats have straight vertical lines for azimuthal angle cutoffs, the orthonormal pseudo-cylindrical projection adds straight horizontal lines for profile angle cutoffs. The sun path may cross at a pixelated horizontal or vertical line once (e.g., FIG. 4Y), but may cross a pixelated curved line multiple times (e.g., FIG. 4X).

Returning to FIG. 3A, at block 306, the processing logic receives propagation information (e.g., allowable sun map, allowable direct sunlight map, a map of allowable sun zones in a room) indicating one or more portions of a room corresponding to the electrochromic device where direct sunlight is allowed.

Figure 4Z:
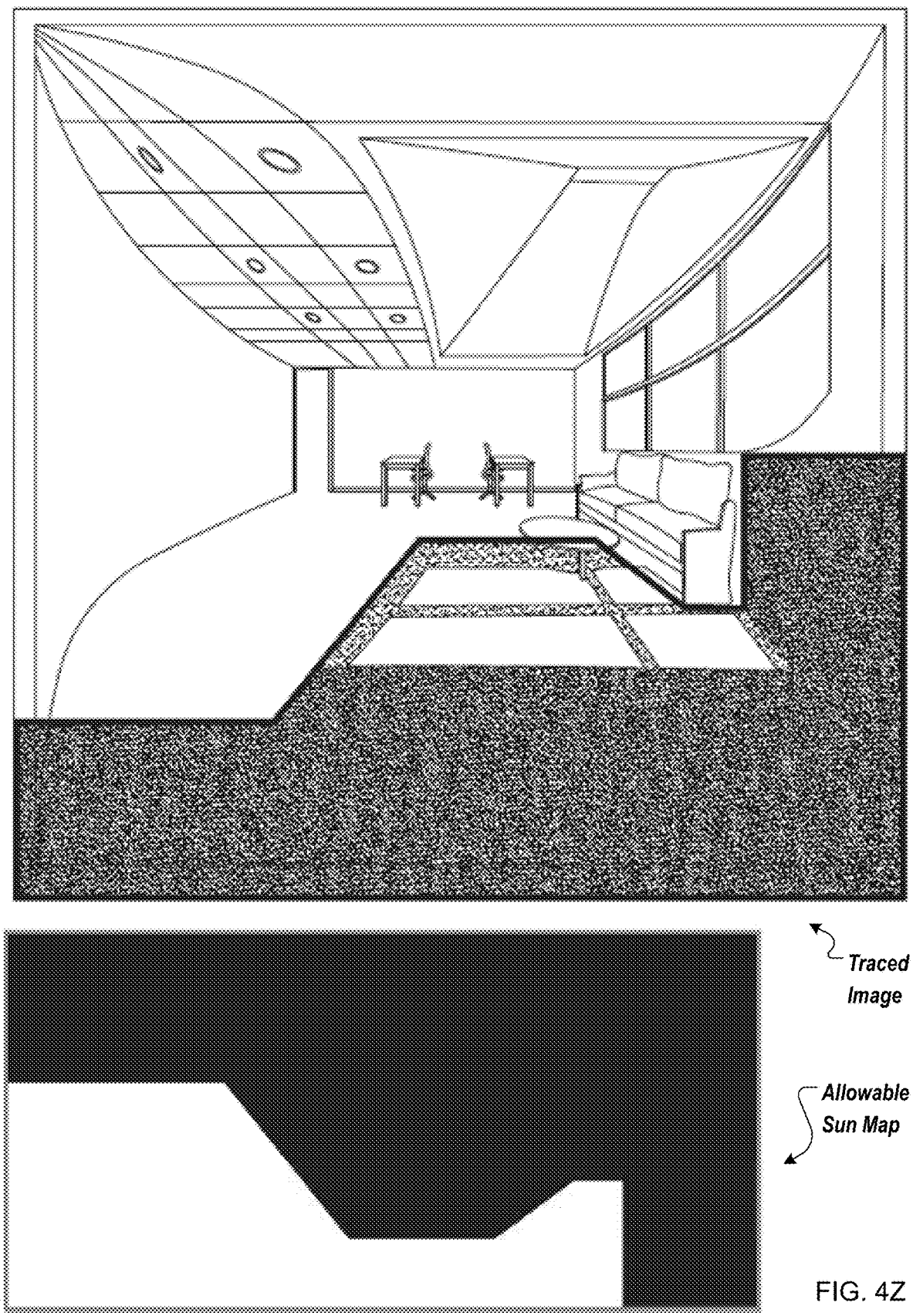
FIG. 4Z illustrates an image for generating an interior facing allowable sunlight map and the allowable sunlight map, according to certain embodiments.

In some embodiments, the propagation information is provided via a photographic method. For example, the camera 406 of FIGS. 4B-C may capture one or more images from the viewpoint of the electrochromic device 402 looking into the corresponding room. For example, in FIG. 4Z, an image is captured of the interior of the room (e.g., photograph facing into the space) from the vantage of the electrochromic device 402 of FIG. 4A. The processing logic may identify allowable sunlight zones (e.g., floor, etc.) and/or unallowable sunlight zones (e.g., desks, seating areas, monitors, screens, etc.) in the image. The processing logic may receive user input tracing the allowable sunlight zones (e.g., a traced polygon). For example, the image in FIG. 4Z illustrates a photo facing into the space that has been traced to identify zones where sunlight would be allowed. The allowable sun map may be similar in format to the obstruction map. FIG. 4Z also illustrates the traced polygon (e.g., allowable sun map) that has been flipped vertically for the solar angles to correspond to those of an obstruction map.

In some embodiments, the propagation information is provided via a geometric method. Dimensions may be received of a distance from the electrochromic device (e.g., three feet into the room from the electrochromic device) and/or a height (e.g., three feet into the room and two feet off of the floor) where direct sunlight is allowed.

In some embodiments, the propagation information is provided via a 3D model. A 3D model may be created that includes zones within a room where sunlight is allowed and/or zones where sunlight is not allowed. For example, the 3D model may indicate zones for hallways (e.g., sunlight allowed) and zones for seating, screens, etc. (e.g., sunlight not allowed).

Returning to FIG. 3A, at block 308, the processing logic receives sensor data (e.g., indicating direct sunlight, no direct sunlight, illuminance value, etc.) from one or more sensors (e.g., exterior sensors, interior sensors).

At block 310, the processing logic determines, based on one or more of the obstruction map, the propagation information, the sun map, or the sensor data, a desired tinting state of the electrochromic device. In block 310, the processing logic may further determine the desired tinting state based on a reflection map, illuminance values, and/or the like. In some embodiments, the processing logic generates tinting schedules (e.g., shadow schedules based on the obstructions and sun trajectory) by querying the obstruction map with solar angles. The obstruction map may be queried in advance to generate a schedule for tinting the electrochromic device or the obstruction map may be queried in real-time to determine tint levels of an electrochromic device.

In some embodiments, the processing logic may overlay an obstruction map (e.g., FIG. 4V) on an allowable sun map (e.g., FIG. 4Z) (e.g., to generate a composite map) and determine whether the position of the sun (e.g., FIGS. 4X-Y) is where direct sunlight is allowed (e.g., located within an obstructed portion of the obstruction map or an allowable sunlight zone of the allowable sun map). The processing logic may determine, using the sensor data, whether there is direct sunlight.

In some embodiments, the processing logic may minimize frequent switching of tint levels. The processing logic may determine there is no direct sunlight for a threshold amount of time before untinting the electrochromic device (e.g., avoid untinting for a rapidly passing cloud, perform untinting responsive to a longer-lasting cloud cover). The processing logic may untint the electrochromic device responsive to determining that the position of the sun is to correspond to direct sunlight being allowed (e.g., located within an obstructed portion of the obstruction map or an allowable sunlight zone of the allowable sun map) for a threshold amount of time (e.g., not untint if the sun is quickly passing through a small obstructed portion or small allowable sunlight zone).

In some embodiments, the processing logic receives further instructions for determining a tint level for the electrochromic device. The processing logic may receive instructions from a building management system, a building security system, a tint selector 120, a dashboard mobile app 142, a dashboard web app 140, etc. For example, responsive to the building being in heating mode (e.g., during winter months), the processing logic may receive instructions from the building management system to maximize untinting of electrochromic devices (e.g., responsive to direct sunlight being obstructed, control the electrochromic windows to be at a 0% tint level (highest transmittance)) to improve heat gain from sunlight and reduce the energy required to heat the building. Responsive to the building being in cooling mode (e.g., summer months), the processing logic may receive instructions from the building management system to maximize tinting of electrochromic devices (e.g., responsive to direct sunlight being obstructed, control the electrochromic windows to be at 50% tint level (mid-level transmittance)) to reduce heat gain from sunlight to reduce the energy required to cool the building. In some embodiments, the processing logic receives instructions from the dashboard mobile app 142 or dashboard web app 140 of tint levels (e.g., 0% tint level, 50% tint level, 100% tint level, etc.) to be used when direct sunlight is obstruction and when direct sunlight is not obstructed (e.g., 75% tint level when direct sunlight is not obstructed, 5% tint level when direct sunlight is obstructed, etc.).

Returning to FIG. 3A, at block 312, the processing logic causes a current tinting state of the electrochromic device to correspond to the desired tinting state. For example, the processing logic may use the obstruction map to tint an electrochromic device at the time that the sun comes above a neighboring building, and then to untint the electrochromic device when the sun passes behind an overhang. The processing logic may cause the electrochromic device to be set at a tint level (e.g., tinted, untinted) by transmitting instructions to the gateway to control the driver coupled to the electrochromic device.

Referring to FIG. 3B, the method 300B may be a photographic method for generating an obstruction map At block 322, the processing logic receives a first image of sky and obstruction exterior to an electrochromic device from a viewpoint of the electrochromic device (e.g., a first image taken from a first viewpoint of the electrochromic device, looking outside). In some embodiments, the processing logic receives multiple images (e.g., a first image proximate a left corner of the electrochromic device and a second image proximate a right corner of the electrochromic device) and combines the images into a single image.

A camera 406 (e.g., see FIGS. 4B-C) may be used to generate obstruction maps for an electrochromic device (e.g., electrochromic device 402 of FIG. 4A). For example, the processing logic may use a calibrated lens and camera 406 to generate solar obstruction maps in situ by taking photos from the vantage of the electrochromic device. The camera 406 may use a sensor and a lens. The lens may be a circular fisheye lens providing a full 180-degrees both horizontally and vertically. A shroud (e.g., square, black shroud) may be placed around the camera 406 to allow the camera 406 to be placed directly against the electrochromic device (e.g., against the glass, against a transparent portion of the electrochromic device) when capturing images, aligning the camera 406 with the plane of the electrochromic device. The shroud may also minimize reflections on the electrochromic device (e.g., on the glass of the window).

The camera 406 may include or be attached to an accelerometer (e.g., three-axis accelerometer) and a magnetometer on a board (e.g., breakout board). The accelerometer may sense the gravity vector relative to the camera 406. The gravity vector may be used to calculate the tilt and rotation of the camera 406. Rotation may be introduced by the camera 406 not being level (e.g., the operator not holding the camera 406 perfectly level). The rotation measured with the accelerometer may be used to correct non-level camera positions by rotating the fisheye image the opposite direction. If the camera 406 is held flat against a vertical electrochromic device, the tilt may be zero. The accelerometer on the camera 406 may be used to measure electrochromic device tilt of non-vertical electrochromic devices.

FIG. 4D is a graph illustrating a polynomial fit to an observed angular distortion of the camera 406 and lens, according to certain embodiments. Angular distortion of a camera 406 may be characterized by a calibration method. The calibration method may include mounting the camera 406 to a stepper motor and capturing images of a small light source. The stepper motor may turn the camera 406 in discrete angles between photos. The pixel position of the light source may be measured in each image and compared to the rotation of the camera 406. FIG. 4D illustrates the relationship between rotation of the camera 406 and light source pixel position. A polynomial fit of observed angular distortion may be used to correct a fisheye image to an equiangular fisheye image. In some embodiments, calibration method includes starting with the light source in the center of the image and the camera turned so the light source travels to the edge in the image. This may be performed multiple times (e.g., four times) with the camera itself turned 90 degrees, so the light source travelled in four directions in the image (e.g., up, down, left, and right). The pixel position of the light source may be measured in in each photo and compared to the rotation of the camera. FIG. 4D illustrates a graph showing the relationship between camera rotation and light source pixel position for the texts (e.g., all four tests). As illustrated in FIG. 4D, there may be slight differences between camera rotations. The results may be rather symmetric. A polynomial fit of observed angular distortion may be used to correct fisheye photos to an equiangular fisheye. FIGS. 4E-G illustrate example images with rotation correction and angular distortion correction.

In some embodiments, a calibration method may be followed by one or more validation methods to validate the calibration of the camera 406. In some embodiments, calibration and validation is performed once per camera 406. In some embodiments, over time, one or more components of the camera 406 (e.g., lens, image sensor, shroud, etc.) may start to introduce error (e.g., due to one or more components shifting relative to each other, one or more components becoming damaged, one or more components undergoing wear and tear, etc.). If the camera 406 is starting to show error, then calibration and validation be performed again for the camera 406. If maintenance is performed on the camera 406 (e.g., replacing one or more components, reconfiguring one or more components, adjusting one or more components, etc.), then calibration and validation may be performed again for the camera 406.

Calibration of the camera 406 may be performed first and then validation may be performed. If the validation does not meet a threshold error value (e.g., the camera has too high of error), then a corrective action may be performed, such as one or more of the camera 406 may be re-calibrated, the camera 406 may be replaced, one or more components of the camera 406 may be replaced, maintenance may be performed on the camera 406, an alert may be provided to the user, or the like Validation may include one or more validation methods. A first method includes photographing the sun and a second method includes photographing the window.

The calibration method and validation methods can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the calibration method and/or one or more of the validation methods is performed by the cloud computing system 110 of FIG. 1 or FIG. 2. In some embodiments, the calibration method and/or one or more of the validation methods are performed by one or more server devices of the cloud computing system 110. In some embodiments, the calibration method and/or one or more of the validation methods are performed by a processing device of the cloud computing system 110 (e.g., a non-transitory machine-readable storage medium storing instructions which, when executed cause a processing device to perform methods 300A-D). In some embodiments, the calibration method and/or one or more of the validation methods are performed by an automated control module 224 of the cloud computing system 110. In some embodiments, one or more portions of the calibration method and/or one or more of the validation methods are performed by one or more other components (e.g., a local computing device, a local server device, a gateway, etc.). For example, the server device may transmit one or more of an obstruction map, sun map, or sensor data to the local computing device and the local computing device may compare one or more images of the sun and/or one or more images of the window to the obstruction map, sun map, and/or sensor data to validate the camera 406. In another example, the server device may receive one or more images of the sun and/or one or more images of the window (e.g., from a local device, from one or more imaging devices, etc.) and may compare the one or more images to the obstruction map, sun map, and/or sensor data.

For the first validation method of photographing the sun, the same camera 406 used for obstruction mapping may be used to capture images of the sun from a window (e.g., periodically, every 5 minutes, every 10 minutes, etc.). A filter (e.g., several layers of neutral density (ND) filter gel) may be placed between the camera and the sun to reduce the quantity of light reaching the camera to prevent circumsolar regions of the image from being overexposed. The image may be processed in the same way that images are prepared for obstruction maps, correcting for rotation and angular distortion and re-projecting into the orthonormal pseudo-cylindrical format. Because of the filter (e.g., ND filter), the sun may be the only noticeable feature in the image (e.g., the rest of the image appears black).

Figure 17A:
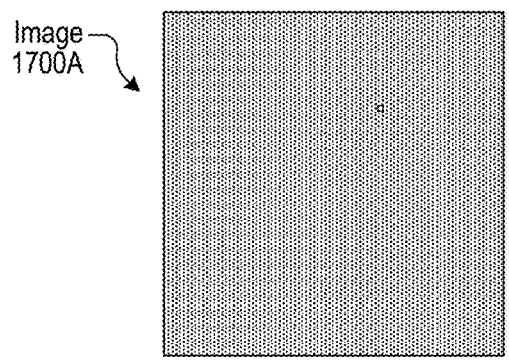
FIGS. 17A-B illustrate examples of one or more images captured of the sun using a camera, according to certain embodiments.
Figure 17B:
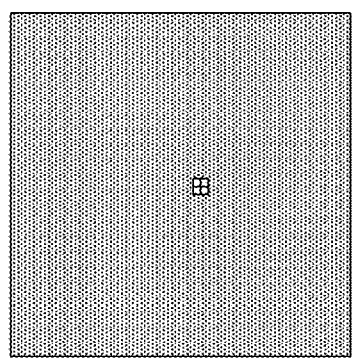

FIGS. 17A-B illustrate examples of one or more images captured of the sun using a camera, according to certain embodiments. The images of FIGS. 17A-B may be captured by the same camera 406 that captures the images for generating the obstruction map (e.g., to validate the calibration of camera 406). To capture the images of FIGS. 17A-B, the camera 406 may have multiple layers of neutral density filter gel. The image of FIG. 17A may be remapped into the orthonormal pseudo-cylindrical projection. The image of FIG. 17B may be an enlarged region (e.g., ten times enlarged region) of the image containing the sun (e.g., image of FIG. 17A).

For analysis, the processing logic may convert the image of the sun to grayscale and may identify the pixels representing the sun by applying threshold values (e.g., identify with thresholding, identify with brightness threshold values, etc.). The processing logic may identify the centroid of the sun (e.g., using OpenCV, a computer vision software package). The processing logic may compare the position of the centroid of the sun in the image with the calculated position of the sun (e.g., from the sun map) at that time and the difference may be reported for each image. Expected sun position (e.g., sun map) may be calculated using a collection of libraries (e.g., using pysolar, an implementation of the solar position algorithm (SPA) from the National Renewable Energy Laboratory (NREL)) for simulating the irradiation of any point on earth by the sun for precise ephemeris calculations (e.g., that is accurate within about 0.6 degrees).

For the second validation method of photographing the window, the processing logic may use the obstruction map (e.g., and sun map and/or sensor data) to determine what times sunshine on the window would begin and end. The processing logic may compare these obstruction-map-determined times to observed times for the window. The processing logic may monitor the window by capturing images periodically (e.g., every minute) via an imaging device. The specular nature of glass may make observing incident sunshine on a window difficult, so the window may be covered with diffuse white paper to make incident sunlight more visible.

Figure 18A:
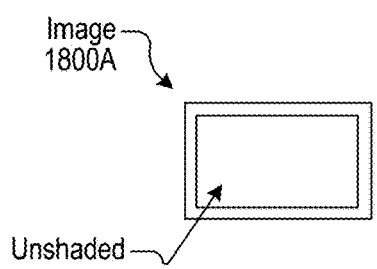
FIGS. 18A-B illustrate examples of images captured of an electrochromic device, according to certain embodiments.
Figure 18B:
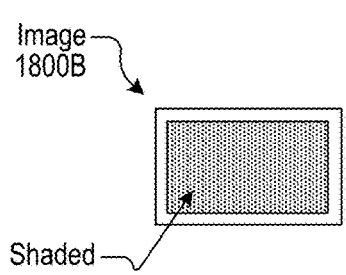

FIGS. 18A-B illustrate examples of images 1800 captured of an electrochromic device, according to certain embodiments. The images 1800 may be used for the second validation method of photographing the electrochromic device. In some embodiments, the electrochromic device is covered (e.g., with diffuse paper, with diffuse white paper, with white paper, etc.). FIG. 18A illustrates an image 1800A of a covered electrochromic device (e.g., covered with paper) with the sun shining on the electrochromic device. FIG. 18B illustrates an image 1800B of a covered electrochromic device without sun shining on the electrochromic device. The images 1800 of the electrochromic device may be captured using any imaging device (e.g., camera 406, a camera other than camera 406, etc.). In some embodiments, the images 1800 may include the electrochromic device plus the area surrounding the electrochromic device (e.g., the images 1800 may be captured from the other side of the room from the electrochromic device). In some embodiments, the images 1800 may include the electrochromic device without the area surrounding the electrochromic device (e.g., the imaging device may be located far enough away from the electrochromic device to capture just the electrochromic device).

Results from the first validation method of photographing the sun may include Table 1 of calculated and photographed sun position and error.

In one example, the validation methods were run on an east facing façade (e.g., 4 degrees south of east) for a morning in September. An overhang above the window and a neighboring building limited the time when the sun was visible to the camera to about three hours. A total of 19 photos of the sun were taken. The maximum error observed during the validation exercise was 0.6 degrees. The average combined error was 0.34 degrees.

The second validation method tests the accuracy of the manual tracing method in addition to the angular accuracy of the obstruction mapping camera.

FIGS. 19A-F illustrate a series of images 1900 of an electrochromic device captured over time, according to certain embodiments. The images 1900 may be captured in the same or similar manner as the images 1800 of FIGS. 18A-B. The camera photographing the window may successfully capture the first and last moment that sunshine is incident on the window (e.g., FIGS. 19B and 19E).

Figure 19A:
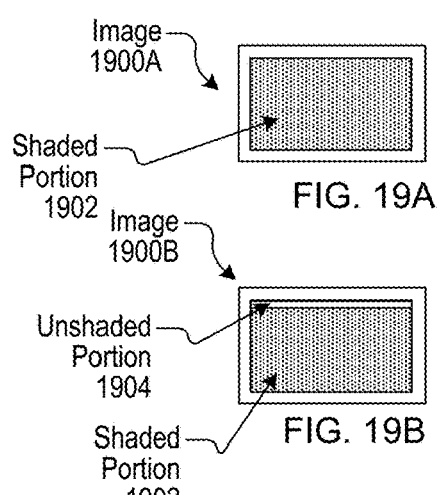
FIGS. 19A-F illustrate a series of images of an electrochromic device captured over time, according to certain embodiments.
Figure 19B:
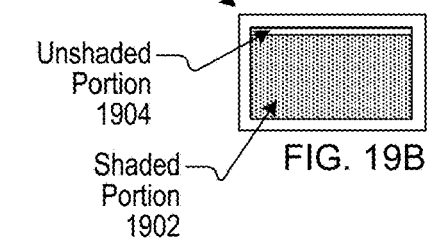
Figure 19C:
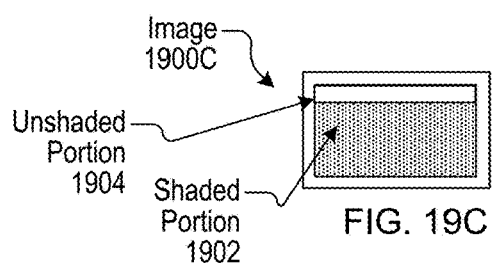

In some embodiments, FIGS. 19A-C illustrate images that capture the first moment that sunshine is incident on the window. For example, image 1900A may have been captured at 7:41 am, image 1900B may have been captured at 7:42 am, and image 1900C may have been captured at 7:43 am (e.g., all on the same day). Image 1900B may illustrate the first silver of sunlight on the window.

Figure 19D:
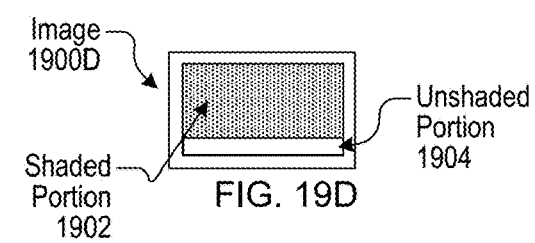
Figure 19E:
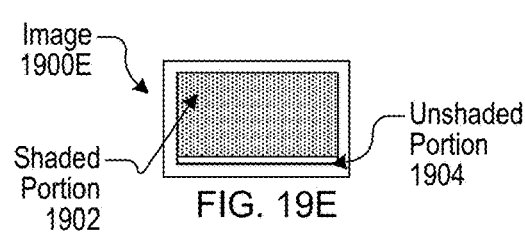
Figure 19F:
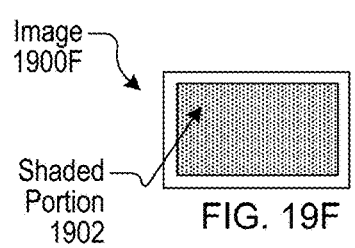

In some embodiments, FIGS. 19D-F illustrate images that capture the last moment that sunshine is incident on the window (e.g., before being obstructed). For example, image 1900D may have been captured at 11:02 am, image 1900E may have been captured at 11:03 am, and image 1900F may have been captured at 11:04 am (e.g., all on the same day). Image 1900E may illustrate the last silver of sunlight on the window.

TABLE 1

| Day and Time | Calculated Sun Angle (degrees) | | Photographed Centroid Pixel | | Photographed Sun Angle (degrees) | | WSA Error (degrees) | WSP Error (degrees) | Combined Error (degrees |
|---|---|---|---|---|---|---|---|---|---|
| | WSA | WSP | X | Y | WSA | WSP | | | |
| Date 08:00 | | | | | | | | | |
| Date 08:10 | 1.61 | 13.38 | 182 | 153 | 1.25 | 13.25 | −0.36 | −0.13 | 0.38 |
| Date 08:20 | 3.20 | 15.36 | 185 | 149 | 2.75 | 15.25 | −0.45 | −0.11 | 0.46 |
| Date 08:30 | 4.81 | 17.34 | 188 | 145 | 4.25 | 17.25 | −0.56 | −0.09 | 0.57 |
| | ... | ... | ... | ... | ... | ... | ... | ... | ... |

The processing logic may calculate the values shown in Table 1. Table 1 has a first column contains the date and time of the observation and the next two columns are the calculated sun position angles. The following two columns (photographed centroid pixel: X & Y) contain the pixel coordinates of the sun's centroid from the photo. The processing logic may convert the pixel coordinates into sun angles (e.g., using an inverse of obstruction map sampling code) and enter the sun angles into columns titled photographed sun angle. The last three columns contain the error between the photographed sun position and the calculated sun position. A table may include more or less columns than those described and illustrated here. One or more data structures other than a table may be used. The WSA and WSP error columns may be the difference between the calculated and photographed columns. The combined error may be the root sum of squares of the two errors (e.g., the Euclidian distance of the discrepancy in 2D coordinate space, specifically the orthonormal projection).

Table 2 shows the obstruction map time and the observed time (e.g., from the second validation method of photographing the window) of sunshine on the window (e.g., and the error between the two).

TABLE 2

| Event | Obstruction Map Time | Observed Time | Error | WSP Error |
|---|---|---|---|---|
| Sun begins to shine on the window | 7:39 | 7:42 | −3 min | +0.5 degrees |
| Sun finishes shining on the window | 11:06 | 11:03 | +3 min | −0.5 degrees |

The processing logic may be used to calculate the values shown in Table 2. Both events occurred within 3 minutes of the expected time based on the obstruction map. The beginning of sunshine on the window occurred three minutes later than expected and the end of sunshine occurred three minutes earlier than expected. In both cases, the event occurs when the sun passes a horizontal line in the obstruction map, so WSP angle accuracy is considered in this case. The WSP accuracy during these times in the first validation (−0.13 and +0.07 degrees) was much lower than in the second validation method (+0.5 and −0.5 degrees). The obstruction map may have been traced (e.g., by a user) acting conservatively with respect to the glare, by erring on the side of more sunshine when tracing.

The first validation tested the angular accuracy of the obstruction mapping camera directly. The second validation tested the accuracy of the overall result for a window. These two validations show errors of less than one degree. The resulting error in shade control actuation time of three minutes can be overcome simply by deploying shading a few minutes early and removing shading a few minutes late. This conservative approach also offers shading from the exceedingly bright circum-solar region of the sky. These validation results show that the photographic method of mapping obstructions can be used for controlling electrochromic windows.

FIGS. 4E-G illustrates sample images with rotation correction and angular distortion correction, according to certain embodiments. FIG. 4E may illustrate a raw fisheye image, FIG. 4F may illustrate a rotation-corrected fisheye image, and FIG. 4G may illustrate an angular distortion corrected fisheye image.

In some embodiments, two or more images are captured to identify obstructions of an electrochromic device. For example, a first image (e.g., FIG. 4H) captured from the left side of the electrochromic device and a second image (e.g., FIG. 4I) captured from the right side of the electrochromic device. A first image captured from the left side may provide a better view of obstructions to the right side of the electrochromic device and a second image captured from the right side may provide a better view of obstructions to the left side of the electrochromic device. The height of the camera 406 for capturing the image may depend on the control intent. For daylight and glare control purposes, the image may be captured from workplane height (e.g., a horizontal plane situated at the nominal working height in an interior space, desk height, etc.) or if a bottom portion (e.g., the window sill) of the electrochromic device is above the workplane, from the height of the bottom portion (e.g., window sill height). Before capturing the images, the camera rotation may be corrected using the gravity vector by rotating the image. The first and second images (e.g., left and right images, FIGS. 4H-I) may be stitched together into a single image after re-mapping.

The image for generating the obstruction map may be an orthonormal pseudo-cylindrical image. For the orthonormal pseudo-cylindrical image, the pixels in the x-axis may be determined by an azimuthal angle with a direction perpendicular to the electrochromic device used as a reference (e.g., similar to equi-rectangular format). Azimuthal angle may be measured in a horizontal plane. For non-vertical electrochromic devices (e.g., tilting forward or backward), the azimuthal angle may be measured in a plane perpendicular to the plane of the electrochromic device whose intersection with the window is horizontal.

Pixels in the y-axis may also be equiangular, however instead of an elevation angle (e.g., used by the equi-rectangular projection), the orthonormal pseudo-cylindrical image may use a profile angle. A profile angle may be the angle between the electrochromic device perpendicular and a direction vector projected into a vertical plane perpendicular to the electrochromic device.

FIG. 4J-K illustrate a comparison between the equi-rectangular (e.g., FIG. 4J) and the orthonormal pseudo-cylindrical (e.g., FIG. 4K) image projections (e.g., rendered from inside a cube). Lines orthonormal to the view direction vector retain linearity in the orthonormal pseudo-cylindrical projection, while only vertical lines retain linearity in the equi-rectangular projection (e.g., horizontal lines become curved).

FIG. 4L illustrates a remapped hemispherical fisheye photo (e.g., from FIG. 4E, 4F, or 4G) to equi-rectangular projection. FIG. 4M illustrates a remapped hemispherical fisheye photo (e.g., from FIG. 4E, 4F, or 4G) to orthonormal pseudo-cylindrical projection.

After images captured from the left and the right side of an electrochromic device are converted to an orthonormal pseudo-cylindrical representation, the images may be combined into a single image that includes the maximum horizontal viewable extend of the electrochromic device (e.g., see FIGS. 4N-P). The combination of two images may result in duplication artifacts, particular for near field objects such as the center tree in the image, which appears as two trees in the combined image. Minor variations in the height of the camera may appear as step changes in the combined image, such as a bottom frame of the electrochromic device in FIGS. 4N-P. The step change is generally not apparent for objects further from the lens, as exhibited by the line in the concrete and the overhang edge.

FIGS. 4N-O illustrate photos taken from the left and right side of an electrochromic device (e.g., from FIGS. 4H-I) remapped to an orthonormal pseudo-cylindrical projection. FIG. 4P illustrates FIGS. 4N-O combined into a single composite image.

Returning to FIG. 3B, at block 324, the processing logic identifies one or more obstructed portions of the first image and/or one or more unobstructed portions of the first image. In some embodiments, the processing logic may identify a first set of pixels (e.g., blue pixels) in the first image and determine that the first set of pixels correspond to an unobstructed portion (e.g., correspond to sky). In some embodiments, the processing logic may identify a second set of pixels (e.g., red pixels, non-blue pixels) in the first image and determine that the first set of pixels correspond to an obstructed portion (e.g., do not correspond to sky). In some embodiments, the processing logic may receive user input identifying (e.g., tracing) one or more of an obstructed portion or an unobstructed portion of the first image.

Images may be traced with a polygon drawing tool to generate a Boolean obstructed/unobstructed map for the electrochromic device. Only angles above the horizon may be used, so for vertical electrochromic devices, the obstruction map may be cut off below a profile angle of zero degrees, resulting in a "half map" that covers half of a hemisphere. Skylights or tilted facades may use maps containing a profile angle below zero degrees, so a "whole map," may be used that covers the entire hemisphere. FIG. 4Q is an example of a half map generated using the composite image from FIG. 4P. When tracing images, objects smaller than the electrochromic device (e.g., tree trunks) may be ignored. In some embodiments, other objects, such as deciduous tree canopies, may be ignored. In some embodiments, season obstruction maps are generated for deciduous tree canopies (e.g., that are sufficiently large and dense).

FIG. 4Q illustrates a polygon traced over the orthonormal pseudo-cylindrical image and a resulting black/white Boolean image map where black represents obstructed sky and white represents unobstructed sky.

In some embodiments, the processing logic may identify obstructed and/or unobstructed regions in the image may via manual user input (e.g., and may be accelerated with a custom workflow and toolkit). In some embodiments, the processing logic may identify the obstructed and/or unobstructed regions in the image via automation by employing computer vision (CV) and machine learning (ML) techniques. For example, a machine learning model may be trained using training input of images (e.g., including indications of colors of pixels, such as blue pixels, etc.) and target output of an identification of obstructed and/or unobstructed regions of the images (e.g., polygon traced over the images). New images may be provided to the trained machine learning model and an output may be obtained from the trained machine learning model indicating obstructed and/or unobstructed regions of the images (e.g., polygon traced over the images). In some embodiments, the output of obstructed and/or unobstructed regions may be verified by manual review for re-training of the machine learning model (e.g., based on the new images and the manual review of the obstructed and/or unobstructed regions).

Returning to FIG. 3B, at block 326, the processing logic generates the obstruction map based on the obstructed and/or the unobstructed portion of the first image.

The resulting obstruction map (e.g., black/white Boolean image map of FIG. 4Q) may have a resolution equivalent to 0.5 degrees which may be the approximate subtended angle of the sun. Resolutions finer than 0.5 degrees may have quickly diminishing returns. Half-map image files may be 360 pixels wide by 180 pixels tall. Full map image files may be 360 pixels wide by 360 pixels tall.

For compactness, the image format may be portable network graphics (PNG) file format which may have a lossless compression (e.g., substantially lossless, completely lossless, etc.) which may work well for images with limited pixel colors. The half-map in FIG. 4Q may use 4 kilobytes (KB) in PNG format without losing or modifying any pixel data.

To determine whether or not the electrochromic device is currently in a shadow (e.g., determine whether the position of the sun corresponds to an obstructed portion of the obstruction map), the obstruction map may be queried with the solar azimuth and profile angles of the electrochromic device. For a vertical electrochromic device, the solar azimuth angle may be calculated from the solar azimuth angle and the orientation of the electrochromic device as follows:

$$WSA = SA - WO \quad (1)$$

Where:
WSA=Window solar azimuth angle
SA=Solar azimuth angle (0=north, 90=east, 180=south, 270=west)
WO=Window orientation (0=north, 90=east, 180=south, 270=west)

Calculating the profile angle for a vertical electrochromic device from solar azimuth angle and solar elevation angle of the electrochromic device as follows:

$$WSP = a\tan 2(\sin(SE), \cos(WSA)) \quad (2)$$

Where:
WSP=Window solar profile angle
WSA=Window solar azimuth angle (0=north, 90=east, 180=south, 270=west)
SE=Solar Elevation Angle Electrochromic device azimuth (e.g., WSA) and electrochromic device profile angles (e.g., WSP) for non-vertical electrochromic devices are calculated by first applying a change of basis transformation to move the solar angle into the a reference coordinate system defined by the window normal and window up vectors, after transforming the solar vector into the window reference space, the same equations above can be used to calculate the electrochromic device solar azimuth and electrochromic device solar profile angles.

FIG. 4R illustrates a plot of queried solar positions overlaid on a traced image (e.g., traced image of FIG. 4Q). Querying a WSA of 32 and WPA of 32 would return false for sun obstructed. Querying a WSA of 44 and a WPA of 62 returns true for sun obstructed.

In some embodiments, the automated control module 224 (e.g., shadow based control) may use python and the imageio library (e.g., python library for reading and writing image data). The image map (e.g., obstruction map) may be read into a python array. Array indexing may correspond to the resolution of the obstruction map. When queried with the electrochromic device solar azimuth and electrochromic device profile angle, the automated control module 224 may convert the angles to the nearest pixel index and may verify the brightness value of the pixel. If the brightness is below 5 (e.g., out of a 256 range for PNG), then the window is considered to be in a shadow (e.g., corresponding to an obstructed portion of the image).

In some embodiments, one or more exterior sensors (e.g., a rooftop sensor, camera, etc.) has un-obstructed view of the sky. The sensor data from the one or more exterior sensors may be used to determine whether the sun is shining. An obstruction map for a specific electrochromic device may indicate whether sunshine reaches the electrochromic device for the current sun position. By using obstruction maps, shading may not be deployed for electrochromic windows that are in the shadow of an external obstruction. Obstruction maps may be provided for every electrochromic device individually or several obstruction maps may be combined logically so that a group of electrochromic devices can be controlled together.

The image used to generate the obstruction map may be retained to provide photographic record of context at the time of map generation for later use. Having a visual record of the obstruction map may be beneficial (e.g., for shading control companies that offer post-sales service). The photographic record may be used to determine what in the obstruction map is working or not working (e.g., correctly or incorrectly causing the electrochromic devices to tint or untint) and the photographic record may be compared to current conditions to see if something has changed (e.g., a new building constructed, or a building has been demolished).

The photographic method may allow characterizing complex contexts (e.g., environments). For example, a residential neighborhood with pitched roofs on tightly packed townhomes may be difficult to model and often is not included in urban models for purchase, but could easily be photographed to generate accurate solar obstruction maps. Other examples of obstructions that can be characterized using the photographic method, but may otherwise be difficult to characterize are a grove of evergreen trees, a mountain range, a highway bridge, etc.

The photographic method offers the ability to generate obstruction maps for small projects. For example, an installation of automated shading in a restaurant with six windows in an urban context, may not justify the cost of creating a 3D model of the urban context for ray tracing. However, the photographic method for generating obstruction maps is a low cost and could be used.

In addition to or instead of the photographic method, the processing logic may use one or more other methods for generating an obstruction map. In some embodiments, the photographic method (e.g., method 300B) uses a calibrated fisheye lens and may be used for smaller projects. The photographic method may be quick and efficient for a small number of electrochromic devices. As the number of electrochromic devices increases, other methods such as geometry derivation (e.g., FIG. 3C) or ray-tracing (e.g., FIG. 3D) may become more efficient methods for generating obstruction maps. A variety of methods for generating obstruction maps may be available to a commissioning agent, allowing the choice based on project specifics. Using a common format (e.g., orthonormal pseudo-cylindrical format) for storing obstruction maps allows simple methods for using obstruction maps regardless of how the obstruction maps are generated. Orthonormal pseudo-cylindrical obstruction maps may be generated using an analytic method or a ray-tracing method. The analytic method (e.g., geometric derivation of method 300C) may be used for well-defined obstructions such as overhangs and fins. The ray-tracing method (e.g., method 300D) may be used for larger projects where a 3D model of the building an environment (e.g., context) may be used.

Referring to FIG. 3C, the method 300C may geometrically derive an obstruction map (e.g., shading map, generating an obstruction map with geometric analysis). Geometric derivation of obstruction maps may be useful for common forms of building-attached shading elements, such as overhangs, fins, cowls, louvers, etc. The commissioning workflow for geometrically-derived obstruction maps may begin with dimensioning geometric properties of the building, either by scaling from drawings or measuring in situ.

At block 342, the processing logic receives first dimensions of an electrochromic device and second dimensions of obstructions of the electrochromic device (e.g., geometries of the electrochromic device and/or obstructions). The first dimensions of the electrochromic device may include one or more of height, width, or thickness of the electrochromic device. The second dimensions may include an overhang, height of the overhang above the electrochromic device, extension of the overhang of one or more obstructions of the electrochromic device. In some embodiments, the processing logic receives the first and second dimensions via user input. In some embodiments, the processing logic receives the first and second dimensions by processing a 3D model.

The processing logic may use an obstruction-map-generating function specific to the particular shading type to receive the provided geometric dimensions to calculate various shading cutoff angles. The processing logic may convert the cutoff angles into an obstruction map in PNG format in orthonormal pseudo-cylindrical image format. As an example, table 1 includes geometry parameters to be used to generate an obstruction map for an overhang.

TABLE 1

| Geometry Parameter | Description |
| --- | --- |
| Overhang depth (OD) | Distance from the facade to the overhang |
| Overhang height above window (OH) | Distance from the top of the window to the bottom of the overhang |
| Window height (WH) | Distance from the window sill to the window head |

TABLE 1-continued

| Geometry Parameter | Description |
| --- | --- |
| Window width (WW) | Distance from the left window jamb to the right window jamb |
| Overhang extension left (OEL) | Distance from the left edge of the window to the left edge of the overhang (looking from inside out) |
| Overhang extension right (OER) | Distance from the right edge of the window to the right edge of the overhang (looking from inside out) |
| Jamb Thickness (JD) | Distance from the inside edge of the window jamb to the outside edge of the window jamb |

FIG. 4S illustrates examples of obstruction maps that are geometrically derived. The processing logic may use the input parameters shown in FIG. 4S to generate obstruction map images shown in FIG. 4S. The black area of the obstruction maps in FIG. 4S depicts sun positions where the electrochromic device is completely shaded by the overhang geometry. The strips of black on the left and right of the image are azimuthal cutoff angles caused by the jamb thickness and window width.

Returning to FIG. 3C, at block 344, the processing logic generates an obstruction map based on the first dimensions and the second dimensions. FIG. 4T is an obstruction map image for the overhang above the electrochromic device 402 of FIG. 4A. The obstruction map excludes the effect of the façade wall perpendicular to the electrochromic device on the left side and the effect of neighboring buildings. The obstruction map of FIG. 4T is generated using the geometric method and FIG. 4T includes the parameters used by the processing logic (e.g., obstruction map generating scrip) to generate the obstruction map.

Referring to FIG. 3D, method 300D may be for generating an obstruction map with ray-tracing (e.g., using a 3D model). The 3D model may be a 3D computer-aided-design (CAD) model of the project site. The processing logic may generate or retrieve the 3D model. Control for solar obstructions may be an additional feature for a 3D model. The setup cost of shadow modeling may be high due to the time required to prepare a 3D model. Once the 3D model is setup, ray-tracing costs per window are low. Because of high setup cost and low per window costs, large projects may justify the cost of a 3D model. One or more of methods 300B-D may generate obstruction maps in a way that avoids high setup cost (e.g., even with higher per window costs) to make obstruction-enabled control affordable for small projects.

At block 362, the processing logic receives a 3D model of environment relative to an electrochromic device. The 3D model may include the electrochromic device and surrounding geometry, such as the building corresponding to the electrochromic device, overhangs of the building, additional buildings proximate the electrochromic device, etc.

FIG. 4A may illustrate a simple 3D CAD model of an electrochromic device 402 including window framing, overhang, and adjacent perpendicular façade. The processing logic may use ray-generating script to generate sample rays for sampling the geometry of the 3D model of FIG. 4A. The ray-generating script may take electrochromic device orientation and tilt, as well as coordinates for one or two points, to be used as ray origins in the 3D model. If only one point is provided, all rays may originate from that point. If two points are provided, rays in the left direction (e.g., negative façade azimuth angle) may originate from the first origin coordinates provided and rays in the right direction may originate from the second origin coordinates provided. If the tilt of the electrochromic device is greater than or equal to 90 degrees, the script may generate rays for a half map (e.g., profile angles from 0 to 90 degrees) and if the tilt is less than 90, the script may generate sample rays for a full map (e.g., profile angles from −90 to 90 degrees). The 3D model may be converted to a compatible file format and sample rays may then be traced. The resulting image may be converted to a PNG format.

Returning to FIG. 3D, at block 364, the processing logic generates an obstruction map based on the 3D model (e.g., for electrochromic device 402 of FIG. 4A). FIG. 4U illustrates the obstruction map generated by ray tracing the model shown in FIG. 4A. Elements included in the model (e.g., overhang, window jambs, and perpendicular façade) are included in the obstruction map. Likewise, shading elements not included in the model (e.g., neighboring buildings) are not included in the ray-traced obstruction map.

Method 300A may use one or more of methods 300B-D to generate an obstruction map. In some embodiments, the obstruction maps generated by two or more of methods 300B-D are used to check for errors (e.g., troubleshoot each other). For example, responsive to determining one of the obstruction maps has an error, an obstruction map may be re-generated using additional images in method 300B, using additional dimensions in method 300C, or using additional elements and/or points in the 3D model of method 300D.

Figure 5:
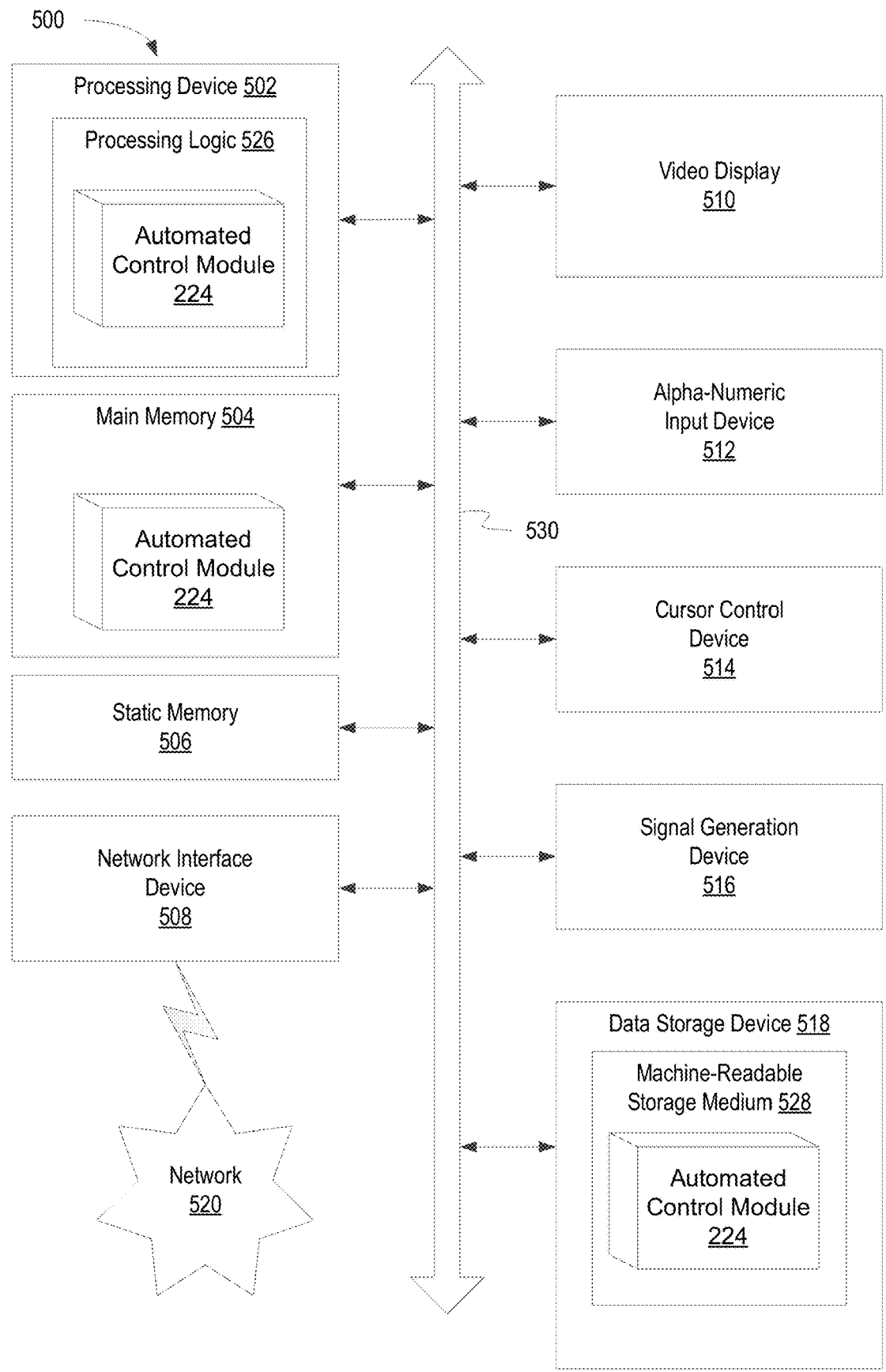
FIG. 5 illustrates a diagrammatic representation of a machine in the example form of a computer system including a set of instructions executable by a computer system for automated control of an electrochromic device according to any one or more of the methodologies discussed herein.

FIG. 5 illustrates a diagrammatic representation of a machine in the example form of a computer system including a set of instructions executable by a computer system 500 for automated control of an electrochromic window (e.g., using one or more of an obstruction map, allowable sunlight map, reflection map, illuminance value, or the like) according to any one or more of the methodologies discussed herein. In some embodiments, computer system 500 includes one or more server devices of a cloud computing system (e.g., cloud computing system 110 of one or more of FIGS. 1-2). The computer system 500 may have more or less components than those shown in FIG. 5 (e.g., one or more server devices of cloud computing system 110 may have fewer components than shown in computer system 500). In one embodiment, the computer system may include instructions to enable execution of the processes and corresponding components shown and described in connection with FIGS. 1-4 and 6-16C.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein In some embodiments, the example computer system 500 (e.g., cloud computing system 110) includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM), and a data storage device 518, which communicate with each other via a bus 530. In some embodiments, memory (e.g., main memory 504, data storage device 518, etc.) may be spread across one or more mediums (e.g., of an on-demand cloud computing platform).

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for performing the operations and processes described herein (e.g., the automated control module 224 of FIG. 2, methods 300A-D of FIGS. 3A-D, methods 1600A-C of FIGS. 16A-C, etc.).

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (or machine-readable medium) on which is stored one or more sets of instructions embodying any one or more of the methodologies or functions described herein (e.g., automated control module 224, methods 300A-D, methods 1600A-C, etc.). The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 6:
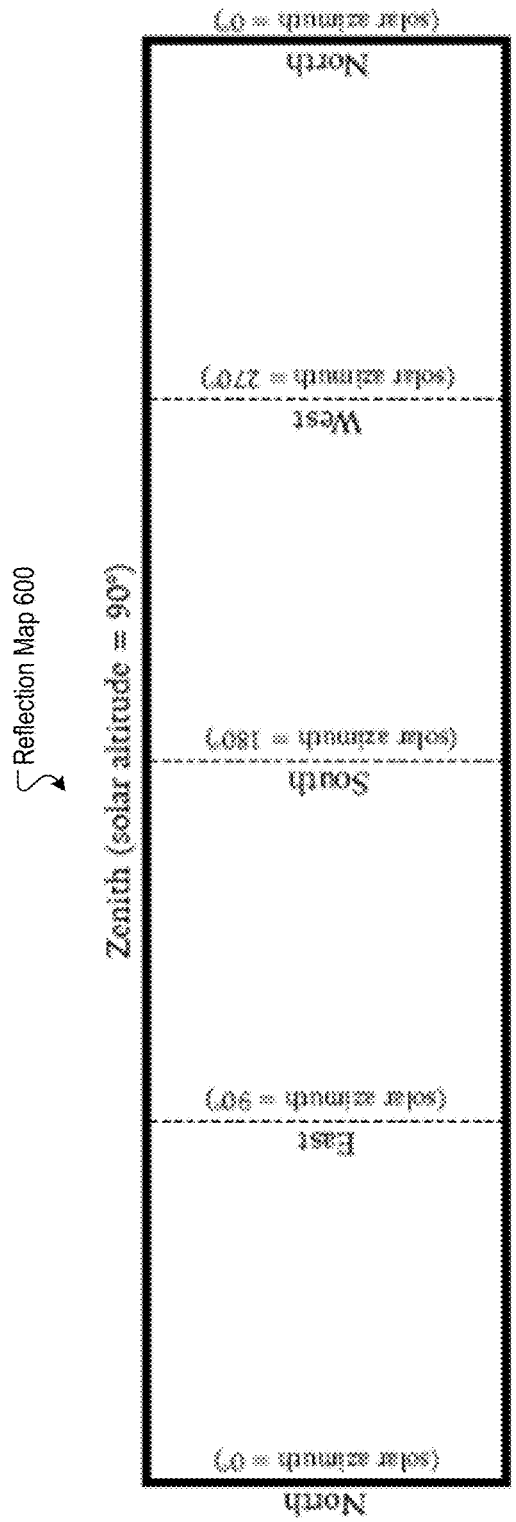
FIG. 6 illustrates a reflection map for automated control of an electrochromic device, according to certain embodiments.

FIG. 6 illustrates a reflection map 600 (e.g., specular reflection map, reflection image map, specular reflection image map, etc.) for automated control of an electrochromic device, according to certain embodiments. Specular reflections may be caused by shiny or glossy surfaces, such as glass, metal, water, or the like. A reflection map 600 may be an image map that is generated and used for characterizing specular reflection.

A reflection map 600 may be drawn as rectangular grids of solar angles (e.g., equirectangular format). Light (e.g., sunlight) may reflect off of a surface onto an electrochromic device from any sun position, including sun positions of the sun being behind the electrochromic device. A reflection map 600 may encompass 360-degrees in azimuth (e.g., azimuthal angle may be measured in a horizontal plane, azimuthal angle may be measured in a plane perpendicular to the plane of the electrochromic device whose intersection with the electrochromic device is horizontal) and 90-degrees in altitude. A reflection map 600 may be situated such that the left and right edges are north, the first quarter line is east, the center is south, and the last quarter line is west. The bottom of the reflection map 600 may be the horizon and the top of the image may be the zenith (e.g., point in the sky directly above the observer). In some embodiments, regardless of the orientation or tilt of the electrochromic device, these orientations (e.g., north, east, south, west, horizon, zenith, or the like) may remain constant in the reflection map 600. In FIG. 6, the reflection map 600 has positions relative to the site (e.g., electrochromic device, viewpoint, or the like) marked.

The reflection map 600 may be an unwrapped cylinder of 360-degree image of all possible sun positions in the sky relative to the electrochromic device (e.g., behind, to the front of, to the sides of, etc. the electrochromic device).

In some embodiments, the reflection map 600 may be 720 pixels wide by 180 pixels tall and may have a resolution of 0.5-degrees per pixel. Pixels may represent a half degree of angular range. The first column of pixels may represent azimuth angles from 0-degrees to 0.5-degrees. The center of the first column of pixels may be 0.25-degrees azimuth. This may continue until the last column, which covers 395.5-degrees to 360-degrees, centered at 359.75-degrees. The same may apply to the vertical pixel representation.

Each pixel of the reflection map 600 may have one or more corresponding pixel values (e.g., stored in one or more channels). In some embodiments, a pixel value of zero (e.g., a value of zero stored in the alpha channel for the pixel) may indicate there is not a risk of reflected glare when the sun is in the position represented by the pixel. A pixel value greater than zero (e.g., a value greater than zero stored in the alpha channel for the pixel) may indicate that there is a risk of glare when the sun is in the position represented by the pixel.

In some embodiments, the position of the reflection in the field of view (e.g., elevation, altitude, etc.), the incidence angle of the reflection on the electrochromic device, and the properties of the surface causing the reflection may not be calculated solely from the position of the sun. In some embodiments, the position factor, angular transmission factor, and/or specular reflection property may be calculated (e.g., when the reflection map 600 is generated) and may be encoded as a single coefficient (e.g., pixel value) to be stored for the pixel and to be used to calculate the adjusted direct normal irradiance (DNI) for determining a tint level for the electrochromic device.

The position factor for a reflection may be determined based on the position of the reflection relative to the electrochromic device (e.g., elevation, altitude, etc.). The angular transmission factor for a reflection may be determined based on the incidence angle of the reflection relative to the electrochromic device. The specular reflection property for a reflection may be determined based on a property of the surface that caused the reflection.

In some embodiments, the position factor, angular transmission factor, and/or specular reflection property may be calculated and stored as separate pixels values for the pixel (e.g., the position factor may be stored in a first channel, the angular transmission factor may be stored in a second channel, and the specular reflection property may be stored in a third channel).

In some embodiments, a reflection map 600 may be in a 32-bit, four channel (8-bit per channel) portable network graphic (PNG) format. In some embodiments, the first three channels (e.g., red, green, blue (RGB)) may all contain the same coefficient which is the product of surface specular reflectance, position factor, and angular transmission coefficient multiplied by 256. The fourth channel (e.g., alpha) may indicate whether or not a reflection occurs. The fourth channel may have a value of zero when no reflection occurs for the sun position and may have a value of 255 when a reflection does occur.

A sun position may cause more than one reflection to an electrochromic device (e.g., sunlight reflects off of a body of water and off of a building to the electrochromic device). In cases of multiple reflections, the reflection with the larger pixel value (e.g., greater illuminance) may be retained. The higher pixel values may result in darker tint levels.

Figure 8:
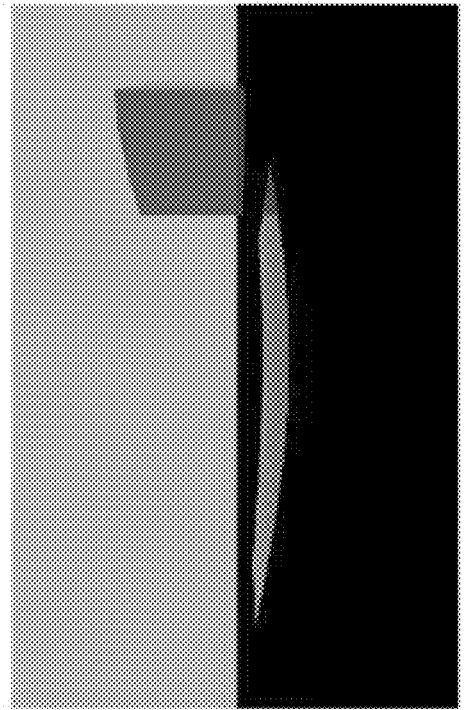
FIG. 8 illustrates a rendering of the site from a view of an electrochromic device, according to certain embodiments.
Figure 7:
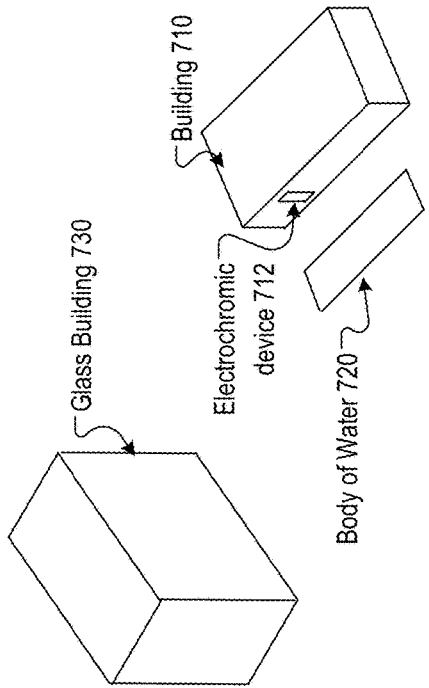
FIG. 7 illustrates a 3D model of a site for generating a reflection map, according to certain embodiments.

FIG. 7 illustrates a 3D model 700 of a site for generating a reflection map, according to certain embodiments. FIG. 8 illustrates a rendering 800 of the 3D model 700 of the site from the view of an electrochromic device 712, according to certain embodiments. The 3D model 700 may be an example model for illustrating the reflection map 600. The 3D model may include a building 710 that includes an electrochromic device 712. The 3D model may also include a body of water 720 (e.g., a small pond of water) and a glass building 730. In this example the reflectance of the glass building 730 may be 15% and the reflectance of the body of water 720 may be 6%.

In the 3D model 700, sample rays may be cast from the electrochromic device 712 sampling the hemisphere in 0.5-degree increments. In some embodiments, the sample rays are cast from a common location on the electrochromic device. In some embodiments, the sample rays are cast from multiple locations on the electrochromic device. The amount of locations may vary depending on the size of the electrochromic device (e.g., cast from more locations for a larger electrochromic device). Sample rays may be cast from one or more locations that are in the field of view of users (e.g., not below workspace depth level). In the 3D model, the sample rays cast from the electrochromic device 712 may contact a surface (e.g., glass façade, body of water, or the like) and be reflected in the 3D model to a corresponding sun position.

In the 3D model 700, sample rays may be generated in a UVW vector space defined by orientation of the electrochromic device 712 (e.g., in the Lawrence Berkley National Laboratory (LBNL) window bi-directional scattering distribution function (BSDF) convention) (e.g., V=normal, W=up, and U=in a plane perpendicular to up). The sample rays may be translated between real world and CAD model space using a transformation matrix. The real world coordinates may use XYZ radiance convention of Y=north, X=east, and Z=up.

The position factor and the angular transmission coefficient may be generated based on the sample ray directions. The V component of the sample unit vector may be used to calculate the incidence angle of the reflection on the electrochromic device as follows:

$$\text{refl\_inc\_ang} = a\cos(v)$$

The Z-component of the real world unit vector for the sample ray may be used to calculate altitude angle of the reflection as follows:

$$\text{refl\_alt\_ang} = a\sin(Z)$$

The position index may be calculated using Guth's position index (e.g., assuming t=0, the observer is looking toward the reflection) for reflection altitude angles above horizontal, and using Einhorn's analytical equation for reflection altitude angles below horizontal as follows:

```
if refl_alt_ang >= 0 :
    position_index = e^(0.03398 * refl_alt_ang + 0.00021 * refl_alt_ang ^2)
else : #refl_alt_ang < 0
    if tan(-refl_alt_ang) >= 0.6:
        position_index = 1 + 1.2 * tan(-refl_alt_ang)
    else:
        position_index = 1 + 0.8 * tan(-refl_alt_ang)
```

When calculating the position factor, a position factor weight (e.g., 1) may be used, which allows a different weight to be applied at runtime. The position factor may be calculated as follows:

$$position\_factor = 1/position\_index$$

If a propagation distance is set, the propagation distance and window header height (e.g., height of the header of the electrochromic device) may be used to cut off sample rays that would be shaded by the window header. The sample rays may be traced into the 3D model 700 by sending the sample rays to the standard input of the following Radiance rtrace command:

rtrace -ab 0 -st 0 -lr 1 -h -otwdv model.oct

The following table may explain the parameters used in the rtrace command above:

| Parameter | Name | Description |
|---|---|---|
| -ab 0 | Ambient bounces | Turns off diffuse reflections |
| -st 0 | Specular threshold | A threshold of zero allow specular reflections (e.g., ensure all specular reflections) are traced |
| -lr 1 | Limit reflections | Limits specular reflections to a single bounce (e.g., the reflection map may not control for secondary or higher order reflections) |
| -h | Header | Turns off the header in the output |
| -otwdv | Output specification | Outputs the following:<br>t—whole ray tree<br>w—ray weight<br>d—ray direction<br>v—ray value |

The primary rays in the ray tree may be the sample rays and may be mostly ignored (e.g., except to keep track which sample is currently being considered). The secondary rays in the ray tree may be the specular reflections. The weight of the secondary rays may be equal to the specular reflectance of the surface. The direction of a secondary ray may be the direction of the reflected ray towards the sky, which may be used to know the position of the sun that causes the reflection.

The secondary rays in the tree may be used. Secondary rays with a value greater than zero may find their way to the sky. For the secondary rays with a value of greater than zero, the direction vector of the secondary ray may be converted into azimuth/altitude angle for the sun position and a reflection map pixel index may be generated from the angles. The weight of the secondary ray may be the reflectance of the surface (e.g., modified by Fresnel equations to account for non-normal incidence).

Figure 9A:
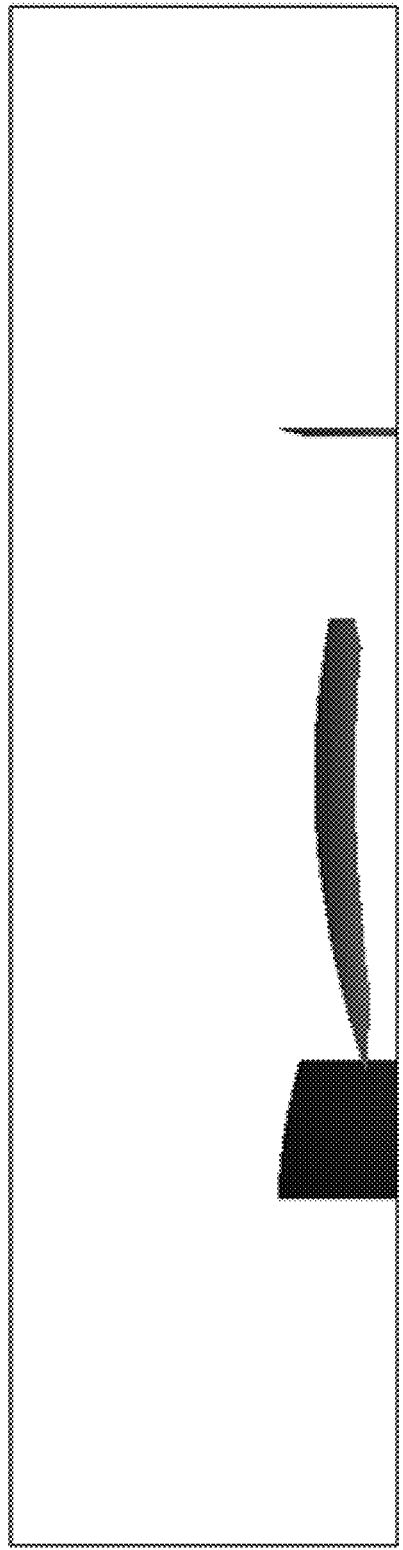
FIG. 9A illustrates a reflectance map generated for a 3D model, according to certain embodiments.

FIG. 9A illustrates a reflectance map 900A generated for the 3D model 700, according to certain embodiments. The white background may be a result of the alpha channel being set to zero where there is no specular reflection.

The reflectance map 900A may be an equirectangular image. Reflectance map 900A may be generated assuming that all surfaces are perfectly smooth and oriented exactly according to the model. In the real world, glass façades may have deflections and wind blowing over water may cause roughness. To accommodate for these imperfections, the reflection map 900A may be resampled to include a wider range of sun angles that could cause offensive reflections. The resampling may consider all pixels within an angular radius and may use the maximum value of pixels within the angular radius.

Figure 9B:
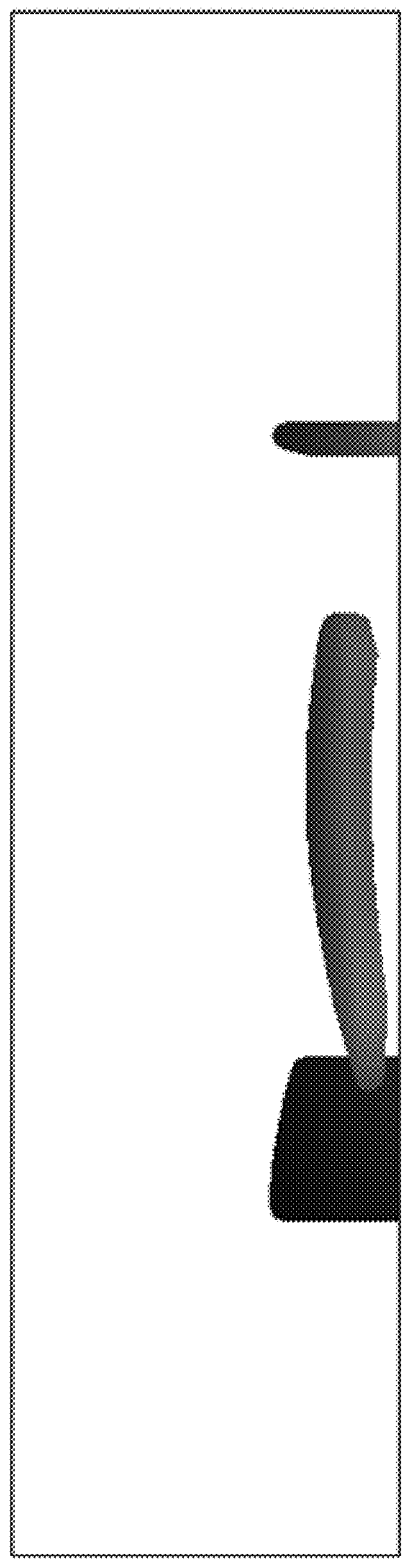
FIG. 9B illustrates a reflection map that has been resampled, according to certain embodiments.

FIG. 9B illustrates a reflection map 900B that has been resampled, according to certain embodiments. Reflection map 900B may be resampled with 3-degrees (e.g., 6-pixel) radius.

Figure 10A:
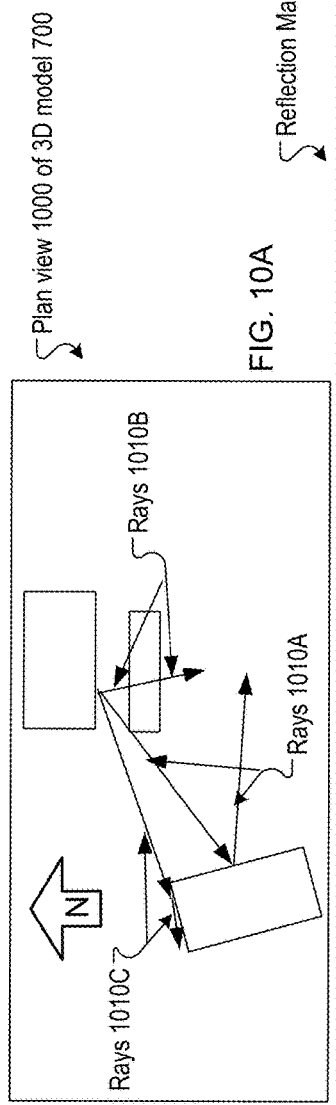
FIG. 10A illustrates a plan view of a 3D model associated with a reflection map with example reflection rays, according to certain embodiments.

FIG. 10A illustrates a plan view 1000 of the 3D model 700, according to certain embodiments. The plan view 1000 may illustrate the sample and reflection rays 1010A-C.

By verifying the reflection angles in plan view may demonstrate that reflections occur approximately where expected. The plan view 1000 illustrates arrows representing rays 1010A-C for each surface type.

Figure 10B:
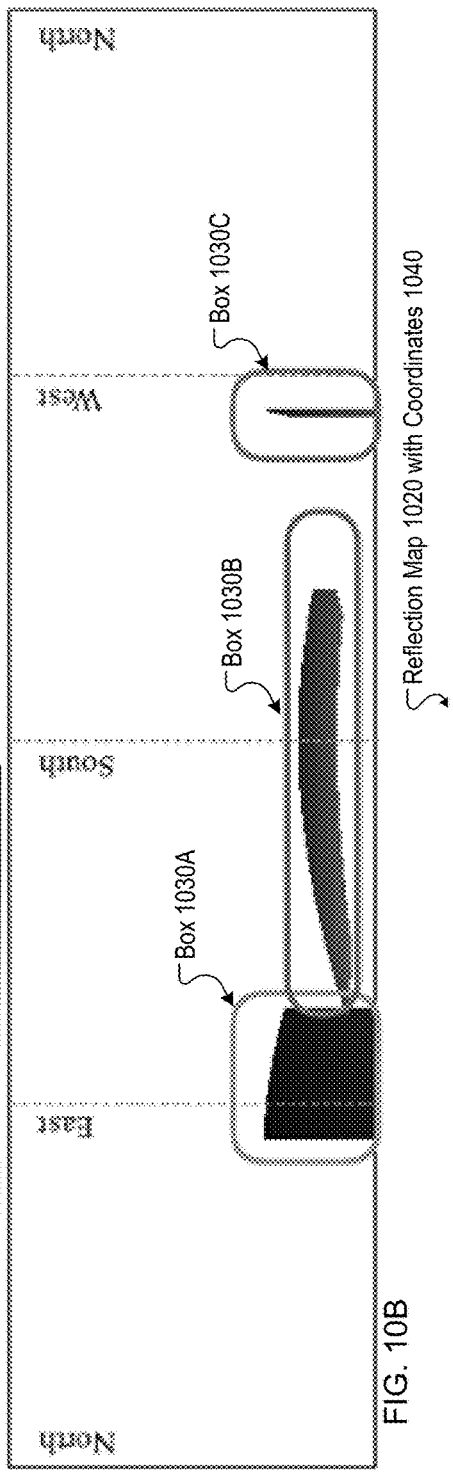
FIG. 10B illustrates a reflection map with boxes around sun positions, according to certain embodiments.

FIG. 10B illustrates a reflection map 1020 with boxes 1030A-C around sun positions, according to certain embodiments. Box 1030A corresponds to reflection rays 1010A, box 1030B corresponds to reflection rays 1010B, and box 1030C corresponds to reflection rays 1010C. Box 1030A may correspond to a larger surface of a glass building 730, box 1030B may correspond to the body of water 720, and box 1030C may correspond to a smaller surface of glass building 730 that is perpendicular to the larger surface of building 720.

Figure 10C:
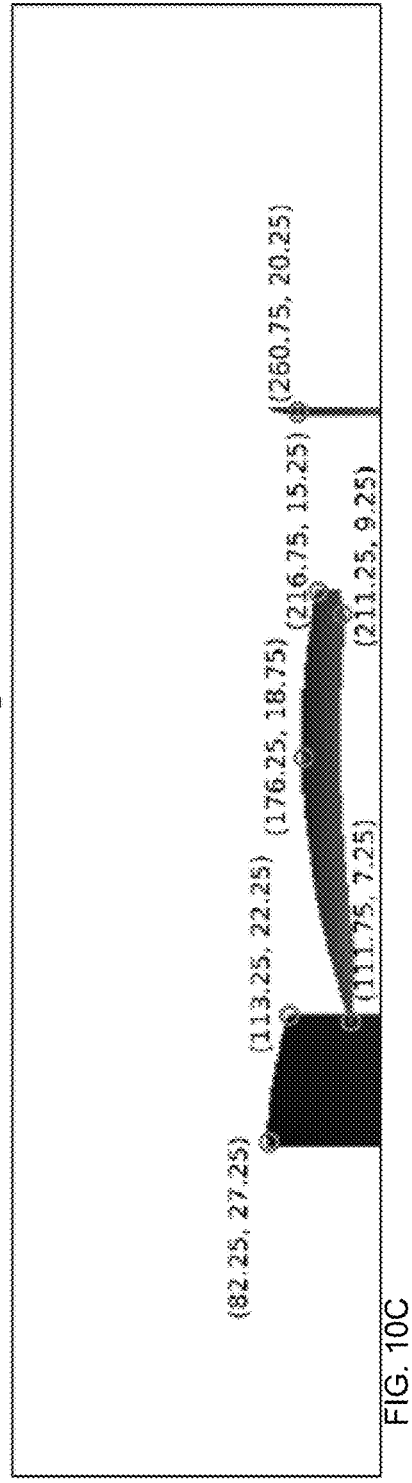
FIG. 10C illustrates a reflection map with coordinates of spot checks, according to certain embodiments.
Figure 11A:
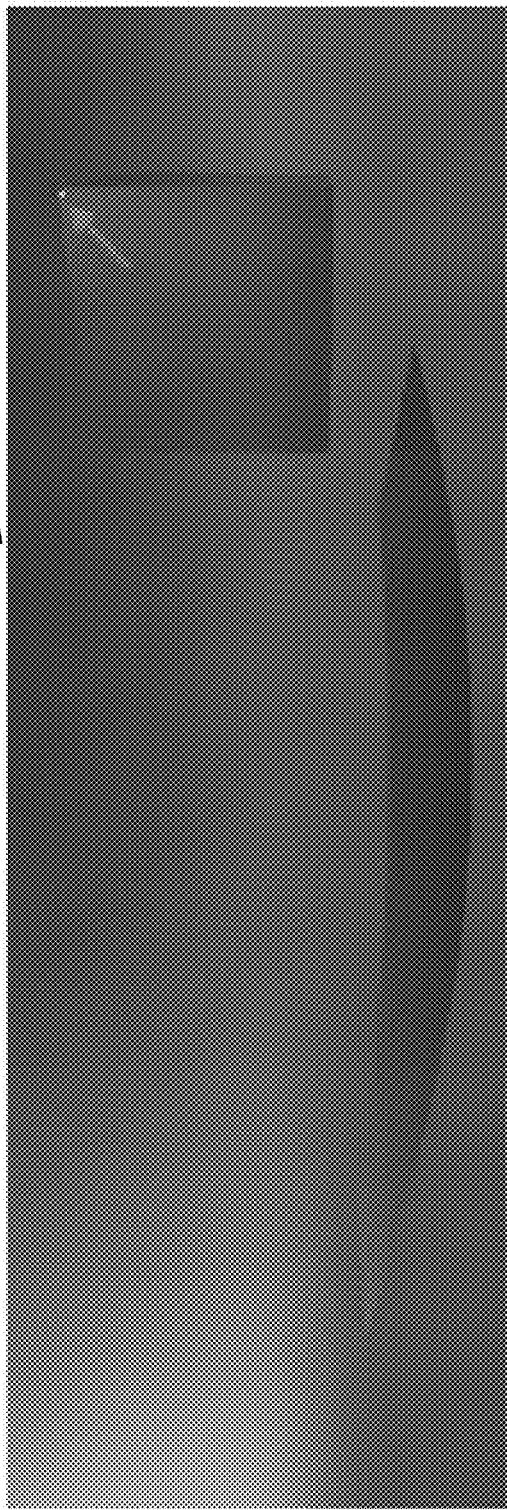
Figure 11B:
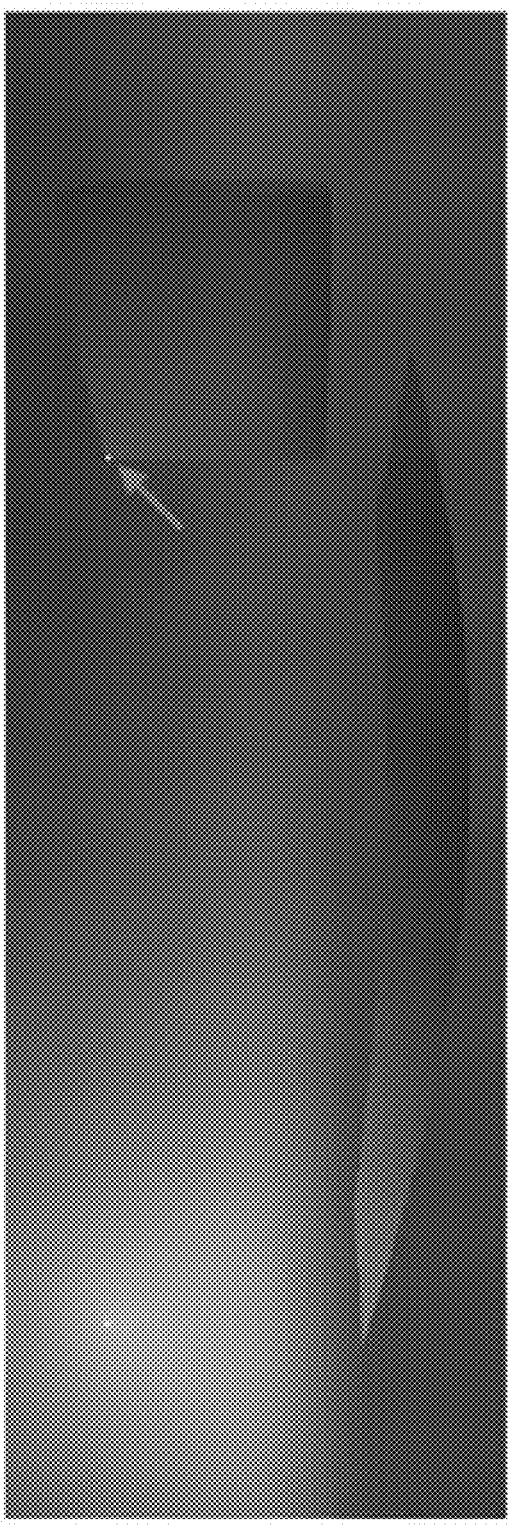
Figure 11E:
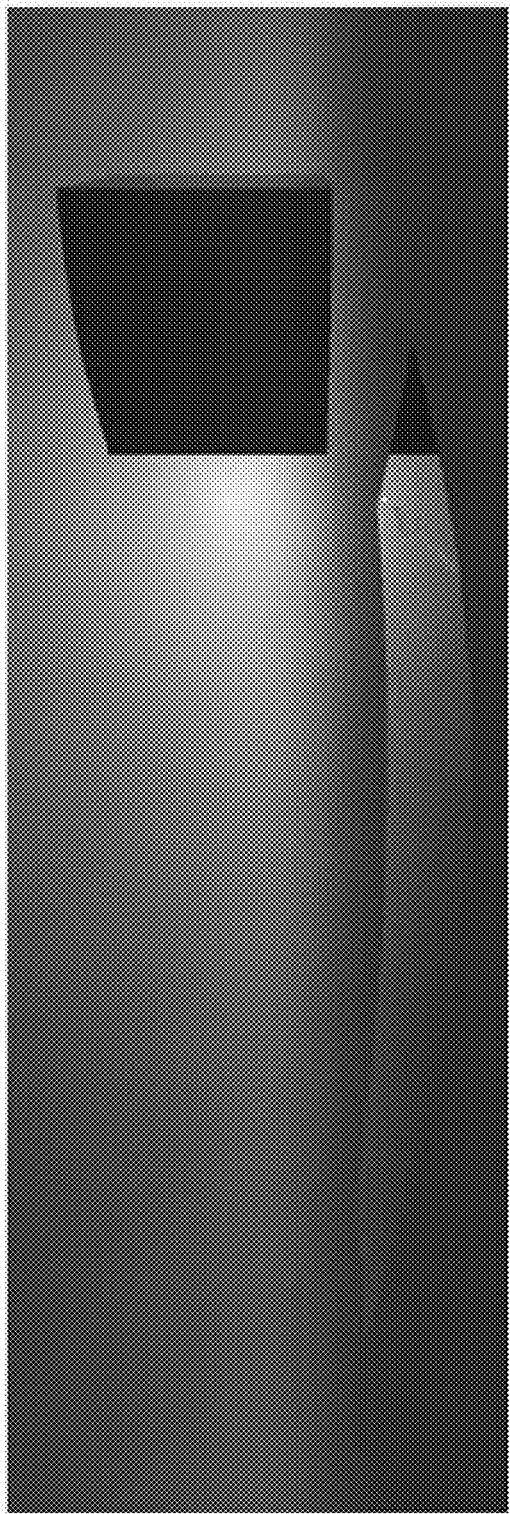
Figure 11F:
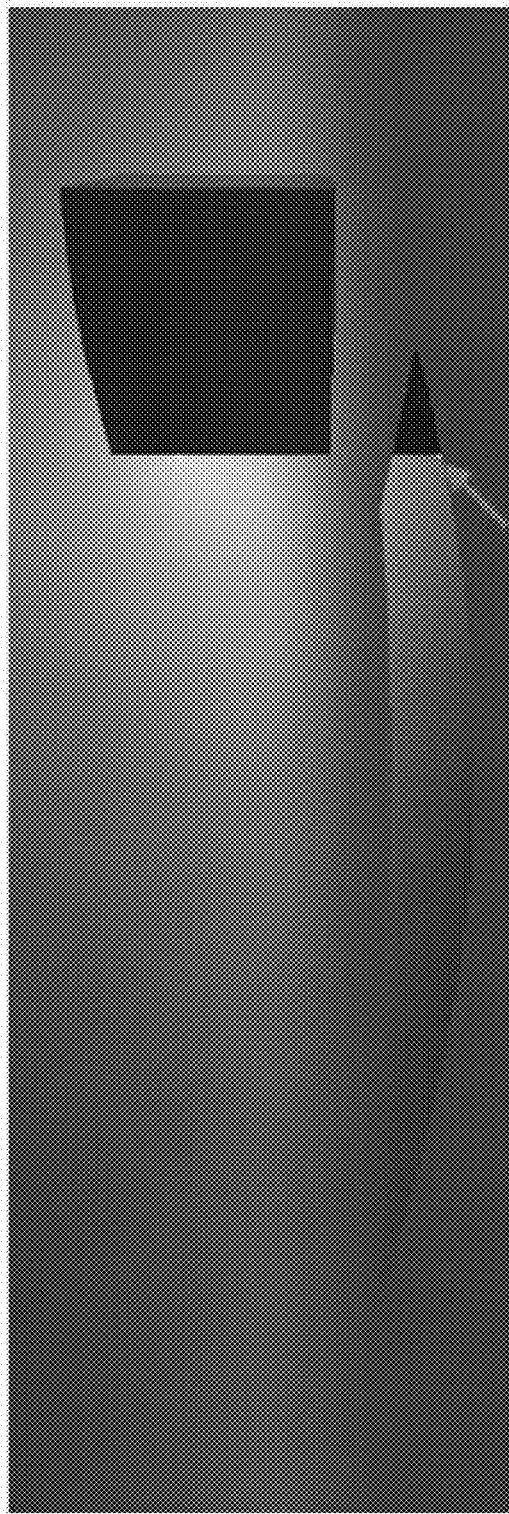
Figure 11G:
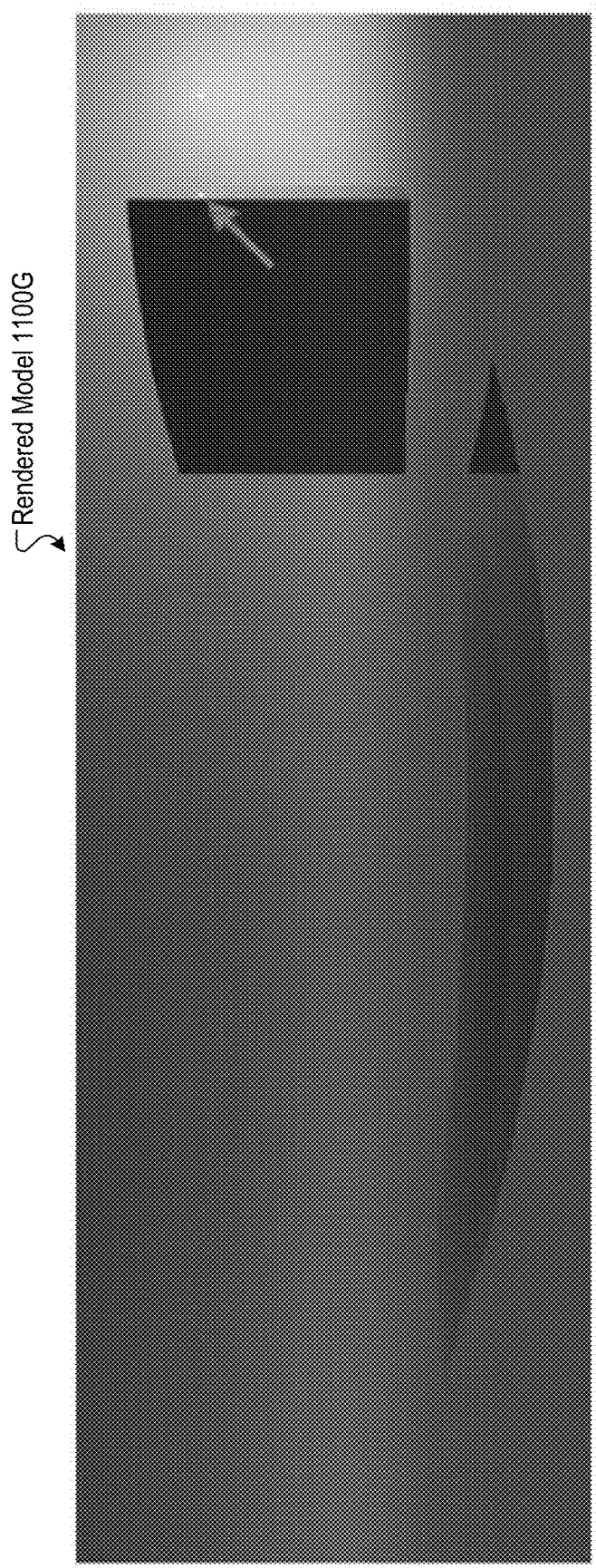
Figure 12A:
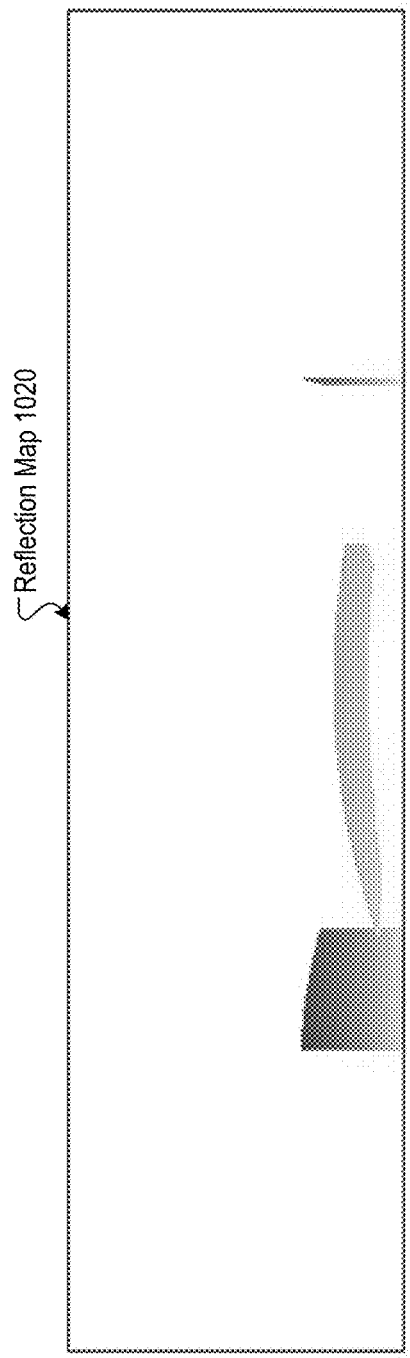
FIGS. 12A-D illustrate reflection maps, according to certain embodiments.
Figure 12B:
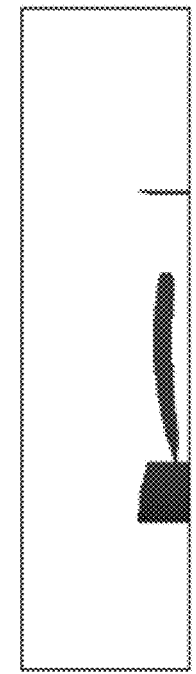
Figure 12C:
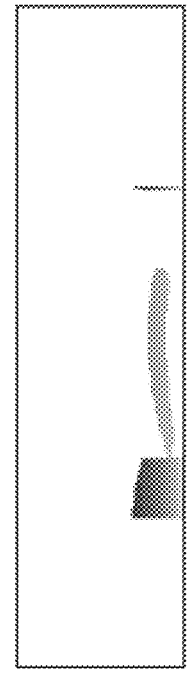
Figure 12D:
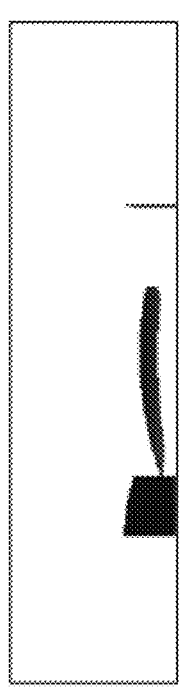

FIG. 10C illustrates the reflection map 1020 with coordinates 1040 of spot checks, according to certain embodiments. The sun positions may be spot checked in the reflection map 1020 by rendering an image with the sun in the selected position (e.g., coordinates). Positions (e.g., coordinates) identified may be in corners or along edges of the reflection map 1020 to verify reflections occurred for those positions and may be near the edge or in the corner of the reflecting surface. The coordinates may indicate sun position (e.g., azimuth, altitude). For example, set of coordinates 1040A may be (82.25, 27.25), set of coordinates 1040B may be (113.25, 22.25), set of coordinates 1040C may be (111.75, 7.25), set of coordinates 1040D may be (176.25, 18.75), set of coordinates 1040E may be (211.25, 9.25), set of coordinates 1040F may be (216.75, 15.25), and set of coordinates 1040G may be (260.75, 20.25). In some embodiments, the spot checks may be performed to check the accuracy of the reflection map. In some embodiments, the spot checks may be performed to check the accuracy of the automated control module 224 (e.g., the accuracy of the generating, by the automated control module 224, of reflection maps). In some embodiments, the spot checks may be performed to check the accuracy of the 3D model (e.g., surface properties in the 3D model, objects entered in the 3D model, objects omitted from the 3D model, or the like).

A spot check may be performed for the sun position when an electrochromic device is not accurately being tinted based on the reflection map (e.g., by the automated control module 224). The spot check may indicate a set of coordinates of a sun position. A rendered model (e.g., see FIGS. 11A-G) may be generated to show the location of the reflection corresponding to the sun position coordinates from the spot check. The actual location may be examined to determine why the electrochromic device is not being accurately tinted.

In some embodiments, an electrochromic device may be tinted based on the reflection map without having any actual reflections. For example, an object (e.g., tree, pier on a body of water, new structure) that is not accounted for in the 3D model may be obstructing the location of the reflection. In some embodiments, an electrochromic device may not be tinting enough based on the reflection map to account for actual reflections. For example, an object in the 3D may have an actual reflection greater than what was modeled. In another example, an object (e.g., automobiles in a new parking lot) or property of an object (e.g., surface property, angle, or the like) may not be accounted for in the 3D model. The spot check may indicate a set of coordinates of a sun position and the rendered model may be generated to show the location of the reflection corresponding to the sun position. The actual location may be examined to determine why the reflection map did not account for the actual reflection.

Based on the spot check and/or rendered model, the 3D model and/or the automated control module 224 may be updated to more accurately represent the actual conditions and to generate a more accurate reflection map.

FIGS. 11A-G illustrate rendered models 1100A-G for sets of coordinates 1040A-G, according to certain embodiments. The rendered models 1100 may be used to verify the accuracy of one or more of the reflection map, the 3D model (e.g., objects in the 3D model, surface properties of the 3D model), or the automated control module 224. For example, if an electrochromic device is not accurately tinting (e.g., too high or too low of a tint state) for a sun position, a rendered model may be generated to compare the rendered reflection or lack of reflection in the rendered model with the actual reflection or lack of reflection coming into the electrochromic device from the actual environment. By comparing the rendered model with the actual environment, updates to one or more of the reflection map, 3D model, or automated control model 224 may be made to generate a more accurate reflection map.

Rendered model 1100A may illustrate the set of coordinates 1040A of solar azimuth of 82.25-degrees and solar altitude of 27.25-degrees.

Rendered model 1100B may illustrate the set of coordinates 1040B of solar azimuth of 113.25-degrees and solar altitude of 22.25-degrees.

Rendered model 1100C may illustrate the set of coordinates 1040C of solar azimuth of 111.75-degrees and solar altitude of 7.25-degrees. In rendered model 110C, there are two reflections that occur for the given sun position (e.g., a first reflection from the body of water and a second reflection from the glass building). The reflection map may store the larger of the coefficients for the two reflections. The coefficient may equal the product of reflectance, position factor, and angular transmission coefficient (e.g., reflectance*position factor*angular transmission coefficient).

Rendered model 1100D may illustrate the set of coordinates 1040D of solar azimuth of 176.25-degrees and solar altitude of 18.75-degrees.

Rendered model 1100E may illustrate the set of coordinates 1040E of solar azimuth of 211.25-degrees and solar altitude of 9.25-degrees.

Rendered model 1100F may illustrate the set of coordinates 1040F of solar azimuth of 216.75-degrees and solar altitude of 15.25-degrees. In the rendered model 1100F, the sun position may not be at the corner of the reflecting surface, however reflections to the right of this point in the body of water may be blocked by the glass building.

Rendered model 1100G may illustrate the set of coordinates 1040G of solar azimuth of 260.75-degrees and solar altitude of 20.25-degrees.

In some embodiments, there may be a unique reflection maps (e.g., specular reflection maps) for each electrochromic device (e.g., from the unique viewpoint of the electrochromic device). In some embodiments, there may be a single reflection map for a group of electrochromic devices that are in close proximity to each other (e.g., a row of electrochromic devices, a column of electrochromic devices, a collection of electrochromic devices, a set of electrochromic devices that are configured to be controlled together, or the like).

The reflection map may be sampled by converting site solar azimuth and site solar altitude to image pixel coordinates. First, the alpha channel is checked to see if a reflection occurs for that sun position. Then, one of the RGB channels may be queried to obtain the coefficient for the sun position. The channel value may be divided by 256 to obtain the coefficient. The reflection coefficient may be multiplied by the filtered DNI to determine the transmitted adjusted DNI for the reflection. The transmitted adjusted DNI may then be entered into the tint curve for the electrochromic device to determine a minimum tint setting for the electrochromic device.

In some embodiments, two values are encoded (e.g., stored) into the four channels of a PNG image, with the coefficient being repeated across the RGB channels. In some embodiments, the surface reflectance, position factor, and normalized angular transmission are encoded into each channel separately. The reflectance (e.g., property of the surface causing the reflection), position factor (e.g., position of the reflection on the electrochromic device), and normalized angular incidence transmission (e.g., incidence angle for the reflection on the electrochromic device) may be stored in the reflection map's RGB channels of the pixel and the alpha channel may be changed from 0 to 255.

FIGS. 12A-D illustrate reflection maps 1020, according to certain embodiments. Reflection map 1020A may illustrate a combined reflection map (e.g., channels 1-4). Reflection map 1020B may correspond to a first channel, reflection map 1020C may correspond to a second channel, and reflection map 1020D may correspond to a third channel.

| Channel | Value |
| --- | --- |
| 1 (red) | Surface reflectance (e.g., parabolic mapping: reflectance = (pixel/256)^2), property of the surface) |
| 2 (green) | Reflection elevation angle (linear mapping where −90-degrees = 0; and +90-degrees = 255; position) |
| 3 (blue) | Reflection incident angle (linear mapping where: 0-degrees = 0; and 90-degrees = 255; incidence angle) |
| 4 (alpha) | Boolean value where: 255 for sun positions with reflections to the electrochromic device; and 0 for sun positions with no reflections to the electrochromic device. |

Figure 13:
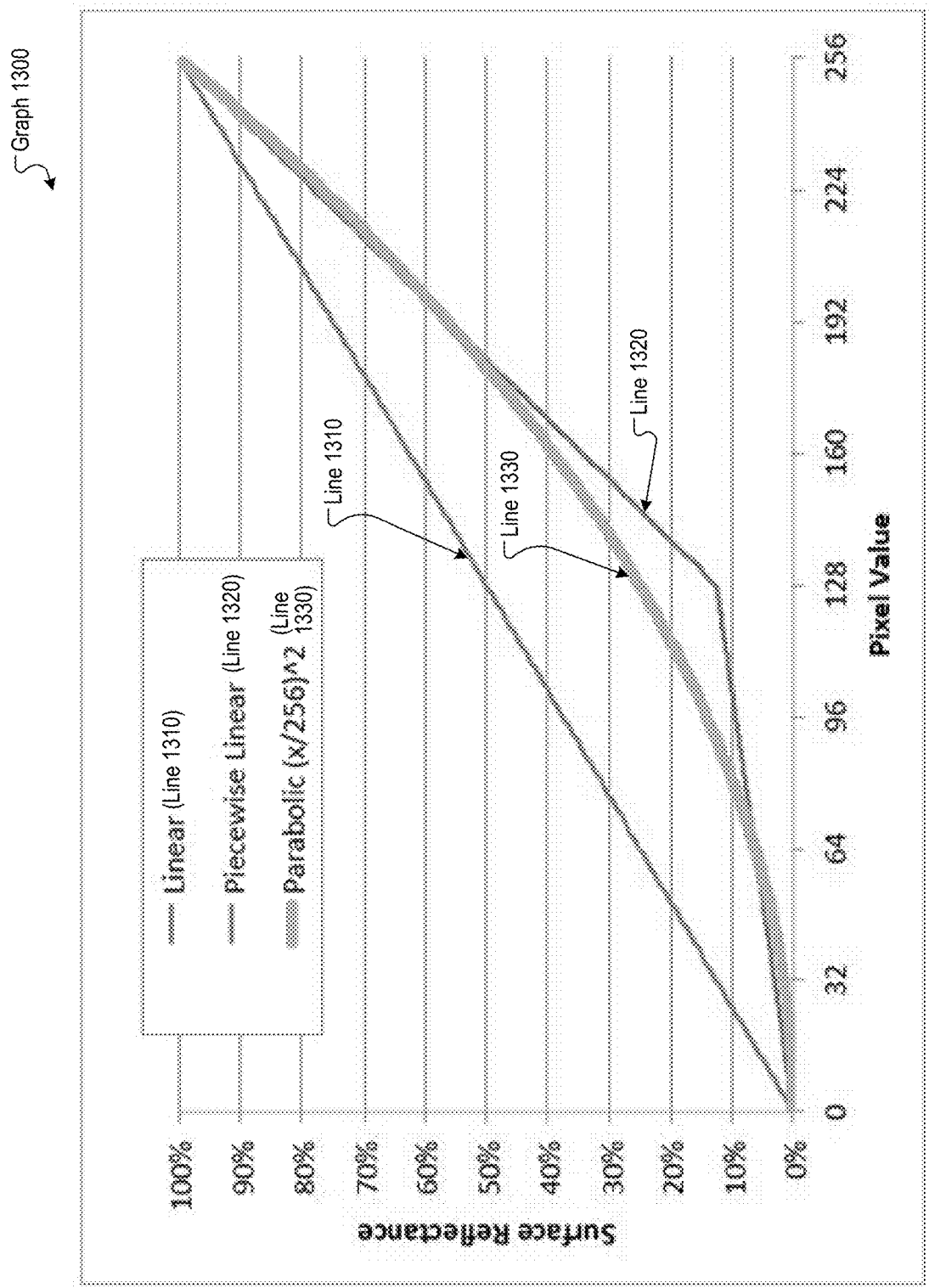
FIG. 13 illustrates a graph of equations that relate surface reflectance to pixel value, according to certain embodiments.

FIG. 13 illustrates a graph 1300 of surface reflectance to pixel value, according to certain embodiments. The graph illustrates a first line 1310 that is linear, a second line 1320 that is piecewise linear, and a third line 1330 that is parabolic (e.g., $(x/256)^2$).

In some embodiments, automated control of electrochromic devices may be based on one or more of an obstruction map, a reflection map, illuminance value (e.g., vertical illuminance calculation, bright sky calculation, bright sky glare), or the like.

Figure 14:
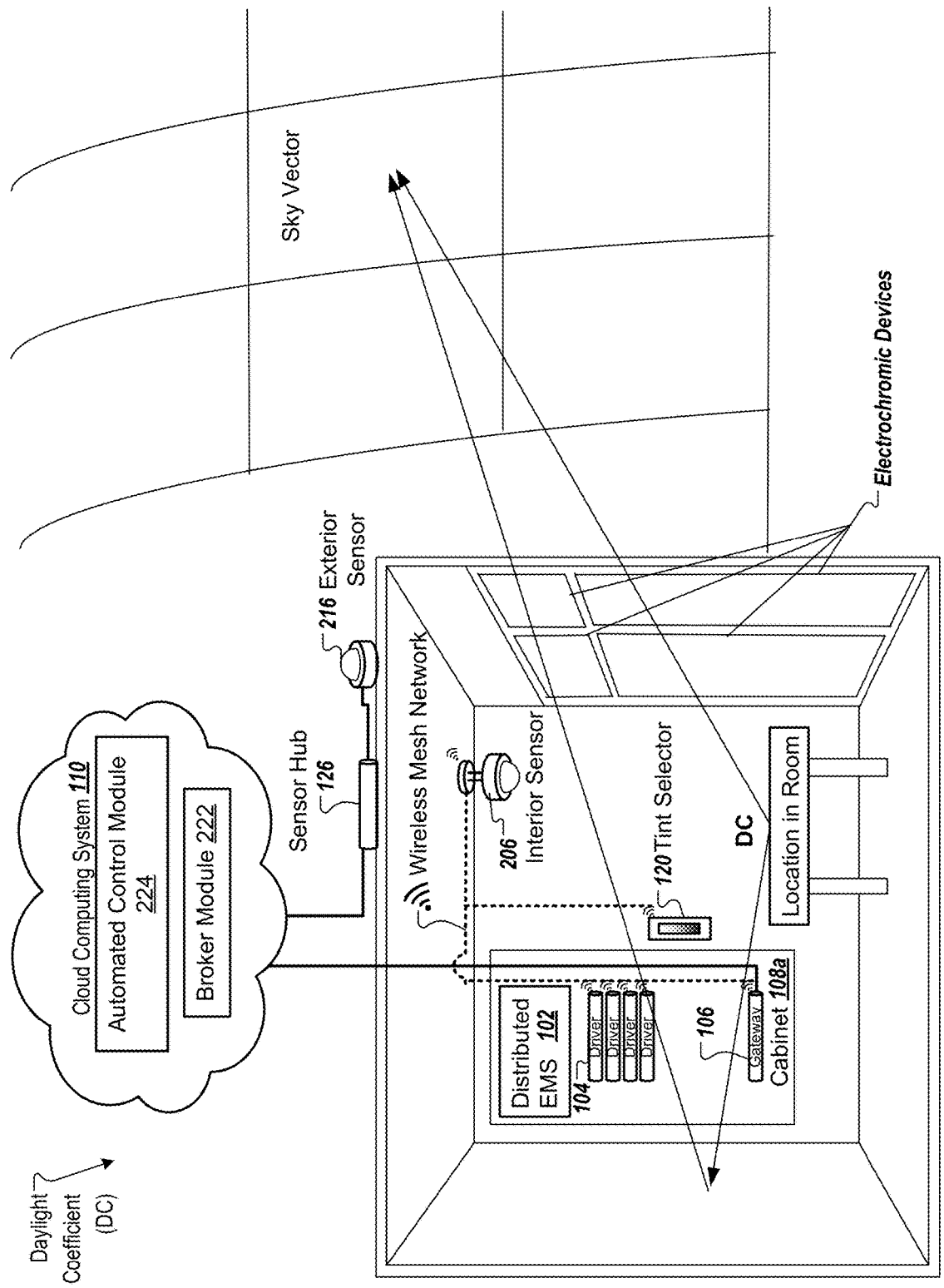
FIG. 14 illustrates use of a daylight coefficient, according to certain embodiments.

FIG. 14 illustrates use of a daylight coefficient (DC), according to certain embodiments. A daylight coefficient may relate illuminance at a location in a room (e.g., on a desk, at a point of view, or the like) to luminance of environmental patches (e.g., sky patches, diffuse surface patches, etc.). A daylight coefficient may include inter-reflection in the room (e.g., reflecting off of walls, ceiling, floor, objects, or the like) and/or outside the electrochromic device. An automated control module 224 of a cloud computing system 110 may use sensor data (e.g., from an exterior sensor 216, from an interior sensor 206) and one or more daylight coefficients to determine an illuminance value at a location in the room. The automated control module 224 may control the tinting state of one or more electrochromic devices (e.g., via gateway 106 and driver 104) based on the illuminance value.

An illuminance value may indicate vertical illuminance at the eye (e.g., vertical eye illuminance) for occupants near the façade (near the electrochromic device). The vertical eye illuminance may be converted into a simplified daylight glare probability (DGP). DPG may be as shown in the table below:

| Daylight Glare Probability (DGP) | Subjective Rating | Vertical Illuminance at Eye (for DGPs) |
|---|---|---|
| <0.35 | Imperceptible | <2650 |
| 0.35-0.4 | Perceptible | 2650-3475 |
| 0.4-0.45 | Disturbing | 3475-4275 |
| >0.45 | Intolerable | >4275 |

DPGs = 6.22 * (10^-5) * $E_v$ + 0.184

The vertical eye illuminance may be calculated using a daylight coefficient method. Daylight coefficients related the luminance of discrete sky patches to illuminance contributions at the sensor point. The coefficients may be multiplied by sky luminance values for each of the patches to determine illuminance at a point of view (e.g., viewpoint, sensor point). For zones where automation will control electrochromic devices in more than one group, separate daylight coefficients may be generated for each collection of electrochromic devices, allowing illuminance contribution for each collection of electrochromic devices to be known for all tint levels.

The sky patch luminance values may be generated using Perez all weather sky model generated with diffuse horizontal and direct normal irradiance. The sky patch luminance values may be stored in a vector referred to as a sky vector. Radiance's validated and robust workflow may be used for sky vectors.

Light from many adjacent electrochromic devices may combine to cause vertical eye illuminance (e.g., bright sky glare). Illuminance or glare may be a function of brightness and size in the field of view. For a particular sky brightness, a single electrochromic device by itself may not be large enough to induce glare, however two or more electrochromic devices next to each other might cause glare under the same conditions. A representative amount of electrochromic devices in a room may be considered. For a smaller room (e.g., a small private office), the representative amount of electrochromic devices may be all of the electrochromic devices of the smaller room. For a larger room (e.g., a large open office with a curtain wall façade), the representative amount of electrochromic devices may be five electrochromic devices wide (e.g., a row of five electrochromic devices).

Electrochromic devices that are controlled as a group by automation may be combined into collections of electrochromic devices for vertical illuminance calculation (e.g., bright sky glare calculation). In a room with floor to ceiling electrochromic devices without horizontal breaks, there may be a single collection of electrochromic devices containing all of the electrochromic devices. In a room with stacked rows of electrochromic devices (e.g., three stacked rows), each row may be a separate collection of electrochromic devices.

Automation (e.g., cloud computing system 110, automated control module 224, etc.) may control the electrochromic devices using discrete tint levels (e.g., nine discrete tint levels). For a room with nine tint levels, there are $9^n$ possible tint combinations based on tint combinations where "n" is the number of collections of electrochromic devices. Since all electrochromic devices are to be considered together for vertical illuminance (e.g., bright sky glare), the vertical illuminance may be evaluated for each potential tint combination. The number of tint combinations can first be reduced by direct sun or specular reflected glare constraints, if any exist. For example, if a room has three collections of electrochromic devices, but two of the collections are to be set to tint level 80 to satisfy direct sun glare, then there are only three possible tint levels for two of the collections of electrochromic devices (e.g., 80, 90, and 100). The total number of potential tint combinations for vertical eye illuminance (e.g., bright sky glare) are then 81 (e.g., $(3^2)*(9^1)$=81).

In some embodiments, a model (e.g., radiance model) may be generated (e.g., block 1632 of method 1600B) based on dimensions of a room for determining an illuminance value at a location in the room (e.g., block 1638 of method 1600B). Daylight coefficients may be generated for vertical eye illuminance. The model may be a simplified model of the room and façade. Generation of the model may be performed with a simple script (e.g., python script) with basic geometric information. For example, a python script may generate a model based on room dimensions, electrochromic device sizes, and positions and viewpoints of and directions. Along with generating the model (e.g., geometric model), the script may run simulations to generate daylight coefficients for vertical eye illuminance.

In the model, the electrochromic devices may be assigned to three collections corresponding to the top row, middle row, and bottom row. Daylight coefficients may be created for each collection of electrochromic devices. The result of the daylight coefficient simulation may be a file for each collection of electrochromic devices containing a row for each viewpoint and 578 columns (e.g., one for each sky patch). The daylight coefficient matrices may be loaded into a python numpy array ready to be multiplied by a sky vector.

A sky vector may contain average luminance values within discretized patches of sky hemisphere. Although the terms sky vector, sky patches, bright sky glare, or the like are used herein, references to sky may also refer to other portions of the environment relative to the electrochromic device. For example, a building (e.g., light-color building, building with a diffuse surface) or other objects (e.g., that provide diffuse reflection) may be part of the sky vector, sky patches, bright sky glare, or the like.

Sky vectors (e.g., see FIGS. 14-15) may be used for calculating vertical eye illuminance. A high dynamic range (HDR) image of the sky (environment) may be captured (e.g., from the roof, from a viewpoint of the electrochromic device, etc.). The image may illustrate a hemisphere of the environment (e.g., sky, sun, clouds, buildings, or the like) from a viewpoint proximate the electrochromic device (e.g., from an external sensor or camera on the same or a proximate building as the electrochromic device). An image of the environment (e.g., sky) may be broken into 145 patches (e.g., using the Tregenza discretization scheme). The patches may be indexed from 1 (e.g., north horizon) to 145 (e.g., zenith) in a spiral pattern, with zero patch being the ground One or more types of sky vectors may be used for calculating vertical eye illuminance. A sky luminance gradient may be divided into a first discretized sky luminance (e.g., Tregenza) that has a lower resolution or a second discretized sky luminance (e.g., Reinhart MF:4, first for direct sun consideration) that has a higher resolution. In some embodiments, the amount of sky patches may be 145, 577, 2305, or some other value.

In some embodiments, the sky vector may be generated using a sky model such as the Perez All-weather sky model, which is sampled one or more positions within a sky patch. In some embodiments, the sky vector may be generated using one or more of the following radiance programs:

gendaylit—generate Perez all-weather sky from DNI, DHI, façade, solare azimuth, and solar altitude;
genskyvec—convert the sky model into a sky vector;
rmtxop—convert the RGB radiance channels into a single luminance channel; or
getinfo—remove the header data.

The sky vectors may be generated (e.g., by a sky vector generator) as follows:

```
def gen_skyvector(facade_solar_azimuth, solar_altitude, DNI, DHI, sun=True, unit='visible'):
        if unit == 'visible':
        genday_spectrum = "0"
        efficacy = "179"
    elif unit == 'solar':
        genday_spectrum ="1"
        efficacy = "1"
    else:
        print('skyvector - unit must be \'visible\' or \'solar\'")
    if sun:
        sun_switch ="+s"
    else:
        sun_switch ="-s"
    gendaylit = subprocess.Popen([str(elem) for elem in ["gendaylit", "-ang",
solar_altitude, facade_solar_azimuth,
        "-O", genday_spectrum, sun_switch, "-W", DNI, DHI ]],
stdout=subprocess.PIPE )
    genskyvec = subprocess.Popen(["genskyvec", "-m", "2", "-c", "1", "1", "1" ],
        stdin=gendaylit.stdout, stdout=subprocess.PIPE)
    rmtxop = subprocess.Popen(["rmtxop", "-c", "0", efficacy, "0", "-"],
stdin=genskyvec.stdout, stdout=subprocess.PIPE)
    getinfo = subprocess.Popen(["getinfo", "-" ], stdin=rmtxop.stdout,
stdout=subprocess.PIPE)
    gendaylit.stdout.close( )
    genskyvec.stdout.close( )
    rmtxop.stdout.close( )
    skyvec = [float(a) for a in getinfo.communicate( )[0].decode("utf-
8").strip( ).split('\n')]
        return(skyvec)
```

The output may of the sky vector generator may be a series of 578 luminance values (e.g., one ground patch followed by 577 sky patches).

To calculate an illuminance value (e.g., vertical eye illuminance, bright sky glare), daylight coefficients may be multiplied by the sky vector to calculate the vertical eye illuminance contribution for each collection of electrochromic devices in the clear state.

A first function to load the daylight coefficient matrices into a nested list may be as follows:

```
def loadDC( filename ):
    mainlist = [ ]
    with open( filename, 'r' ) as infile:
        dc_file = csv.reader( infile, delimiter='\t' )
        for row in dc_file:
            mainlist.append([ float( item.strip( ) ) for item in row if item != ''])
    return(mainlist)
window_collections = [ 'ST', 'SM', 'SB' ]
daylight_coefficient_matricies = [ loadDC('DC/' + win + '_vp.dcx') for win in
window_collections ]
```

The sky vector may be calculated as follows:

```
skyvector=gen_skyvector(facade_solar_azimuth=0,
    solar_altitude=72,DNI=200,DHI=350,sun=True,
    unit='visible')
```

The daylight coefficients may be multiplied by the sky vector to generate partial illuminance contributions for each collection of electrochromic devices as follows:

```
viewpoints_ill=[numpy.matmul(dc,skyvector) for dc
    in daylight_coefficient_matricies]
``` viewpoints_ill:
[[4104.9, 4368.2, 1539.5, 1721.8, 1605.3, 1735.6],
 [14588.8, 4098.0, 5407.4, 1629.5, 5401.8, 1640.5],
 [1445.5, 2465.5, 1403.9, 1137.9, 1473.9, 1161.9]]

The partial illuminance contributions may be normalized to a perpendicular incidence visible light transmission (VLT) of 100%, so that other VLT settings can be tested by multiplying by the perpendicular incidence of the glazing (e.g., to get viewport illuminance of a first electrochromic device with tint level of zero, multiply by 65% or for a second electrochromic device, multiple by 52%). To calculate vertical illuminance for tint levels of a combination of collections of electrochromic devices, matrix multiplication may be used to multiply the VLT level for each collection of electrochromic devices by the partial illuminance contribution matrix as follows:

Illuminance for all window collections clear:

```
all_clear=numpy.matmul([0.52,0.52,0.52],viewpoin-
    ts_ill)
```

[10472.4, 5684.5, 4342.4, 2334.4, 4410.1, 2359.8]
Illuminance for Middle row tinted:

```
middle_tinted=numpy.matmul([0.52,0.001,0.52],
    viewpoints_ill)
```

[2900.8, 3557.6, 1536.0, 1488.7, 1606.6, 1508.4]
To calculate DGPs for each viewpoint, a linear function may be applied to the vertical illuminance values:

DGPs=lambda x:round(0.0000622*x+0.184,3)

DGP for all windows clear:
list(map(DGPs, all_clear))
[0.835, 0.538, 0.454, 0.329, 0.458, 0.331]
DGP for middle row tinted:
list(map(DGPs, middle_tinted))
[0.364, 0.405, 0.28, 0.277, 0.284, 0.278]
To create a list of all tint combinations with DGPs below 0.35, a list of all possible tint combinations may be created. The list of all possible tint combinations may be constrained by direct sun glare and specular reflection glare. Then, each option (e.g., possible tint combination) may be multiplied by the partial illuminance matrix. Since DGPs is a linear function, the maximum vertical illuminance may be used to calculate the DGP. If that DGP is less than 0.35, the tint combination meets the illuminance constraint (e.g., vertical illuminance restraint, bright sky glare constraint) as follows:

```
tint_options=[ ]
for WC1 in [0.52, 0.25, 0.11, 0.05, 0.02, 0.01, 0.004,
    0.002, 0.001]:
    for WC2 in [0.52, 0.25, 0.11, 0.05, 0.02, 0.01, 0.004,
        0.002, 0.001]:
        for WC3 in [0.52, 0.25, 0.11, 0.05, 0.02, 0.01, 0.004,
            0.002, 0.001]:
            tint_options.append([WC1, WC2, WC3])

valid_options=[option for option in tint_options if
    DGPs(max(numpy.matmul(option,viewpoin-
    ts_ill)))<0.35]
```

In this case, there may be 534 valid options from the 729 potential combinations as follows:
len(valid_options)
534

The following table contains all the tint combinations for the middle and top rows, with the bottom row at 52% VLT. The cells containing 'TRUE' represent a tint combination that meets the restriction of DGPs<0.35, while the cells containing 'FALSE' represent a tint combination that violates the illuminance combination (e.g., bright sky glare combination):

| SB = 0.52 | | SM (Middle Row) Tint Levels | | | | | | | | |
|---|---|---|---|---|---|---|---|---|---|---|
| (Bottom Row) | | 0.52 | 0.25 | 0.11 | 0.05 | 0.02 | 0.01 | 0.004 | 0.002 | 0.001 |
| ST | 0.52 | FALSE | FALSE | FALSE | FALSE | FALSE | FALSE | FALSE | FALSE | FALSE |
| (Top | 0.25 | FALSE | FALSE | FALSE | TRUE | TRUE | TRUE | TRUE | TRUE | TRUE |
| Row) | 0.11 | FALSE | FALSE | FALSE | TRUE | TRUE | TRUE | TRUE | TRUE | TRUE |
| Tint | 0.05 | FALSE | FALSE | TRUE | TRUE | TRUE | TRUE | TRUE | TRUE | TRUE |
| Levels | 0.02 | FALSE | FALSE | TRUE | TRUE | TRUE | TRUE | TRUE | TRUE | TRUE |
| | 0.01 | FALSE | FALSE | TRUE | TRUE | TRUE | TRUE | TRUE | TRUE | TRUE |
| | 0.004 | FALSE | FALSE | TRUE | TRUE | TRUE | TRUE | TRUE | TRUE | TRUE |
| | 0.002 | FALSE | FALSE | TRUE | TRUE | TRUE | TRUE | TRUE | TRUE | TRUE |
| | 0.001 | FALSE | FALSE | TRUE | TRUE | TRUE | TRUE | TRUE | TRUE | TRUE |

Figure 15:
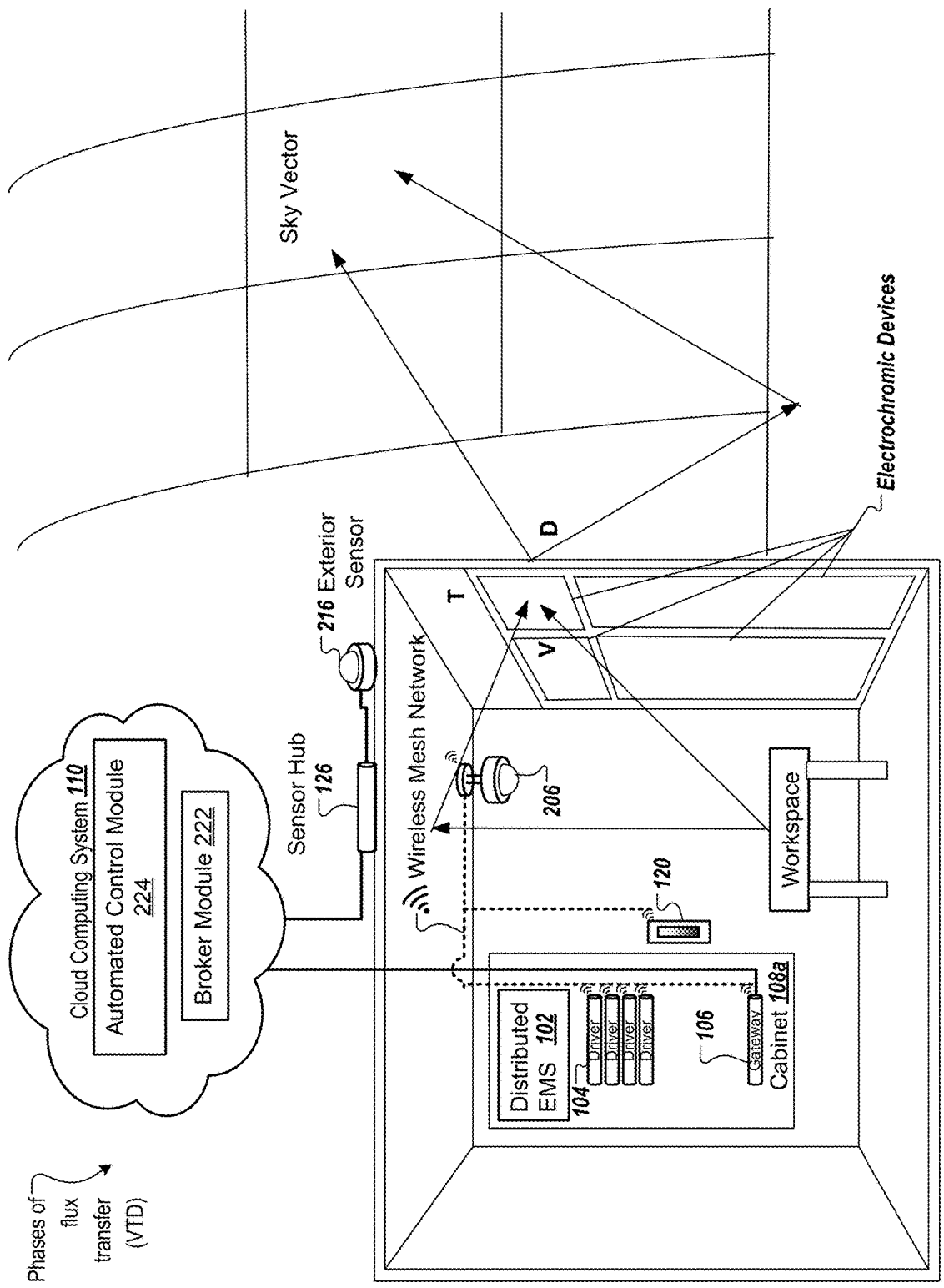
FIG. 15 illustrates a three-phase method to break flux transfer into three phases, according to certain embodiments.

FIG. 15 illustrates a three-phase method to break flux transfer into three phases, according to certain embodiments. The three phases may include exterior (D), window transmission (T), and interior V).

In some embodiments, an obstruction map including information regarding exterior obstructions may be available. To determine whether the environment (e.g., sky, cloud, diffuse surfaces on buildings, light-color buildings, etc.) causes glare, the obstruction map may be used to determine if part of the environment is obstructed by neighboring buildings, building-attached shading (e.g., overhangs, etc.). The obstruction map may be used to mask part of the sky in the vertical illuminance calculation (e.g., bright sky glare calculation) by using a three-phase method to generate daylight coefficients. The three-phase method may break flux transfer between the environment and viewpoint in the room (e.g., illuminance point) into three phases: the exterior phase (D); the window transmission phase (T); and the interior phase (V) (e.g., reflections off of interior surfaces). The obstruction map may be resampled into a bi-directional scattering distribution function (BSDF) and incorporated into the window transmission matrix. A daylight coefficient matrix may be generated by multiplying the three phase matrices (e.g., V, T, and D in FIG. 15).

In some embodiments one or more of the obstruction map, reflection map, and illuminance value may be combined to provide automated control of electrochromic devices.

Figure 16A:
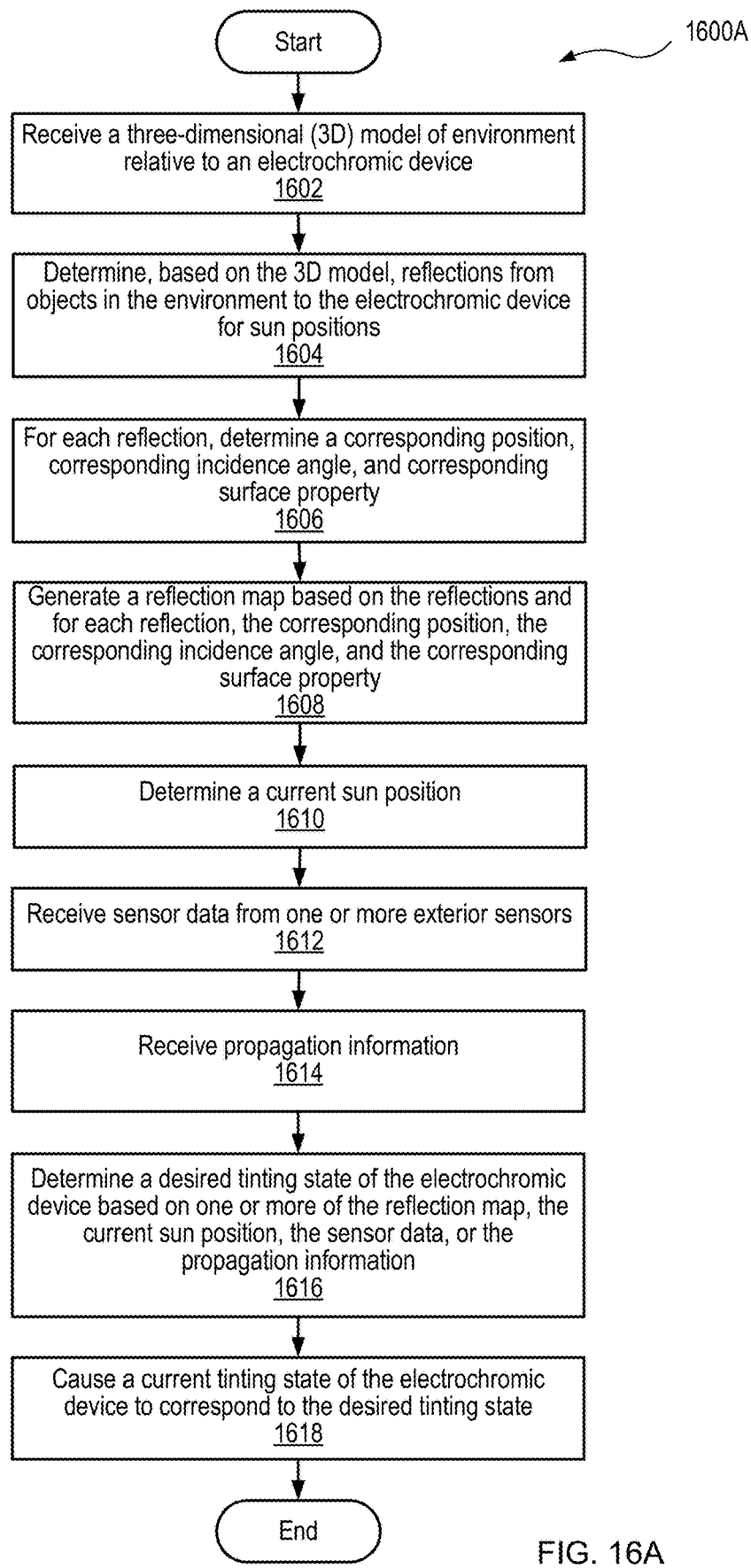
FIGS. 16A-C are flow diagrams of methods for providing automated control of an electrochromic device, according to certain embodiments.
Figure 16B:
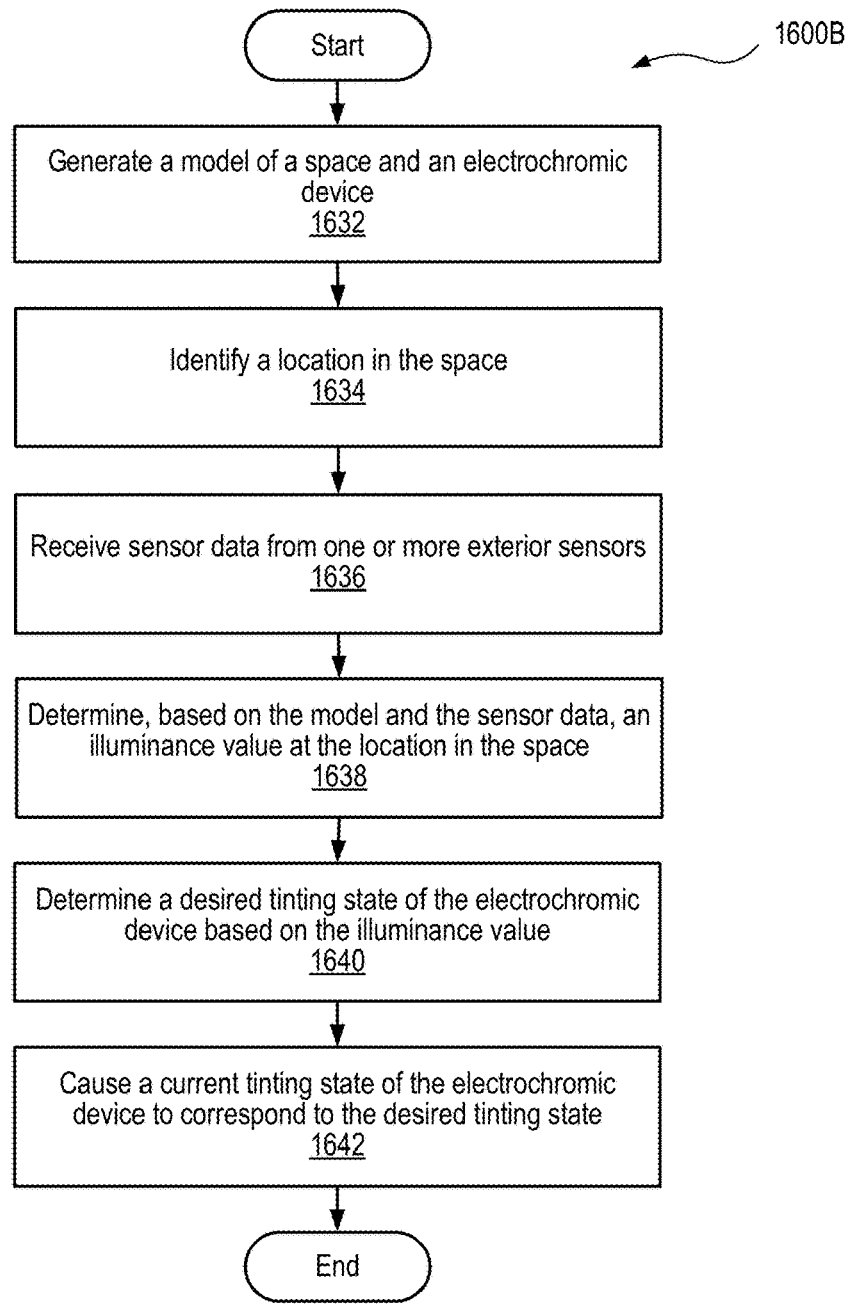
Figure 16C:
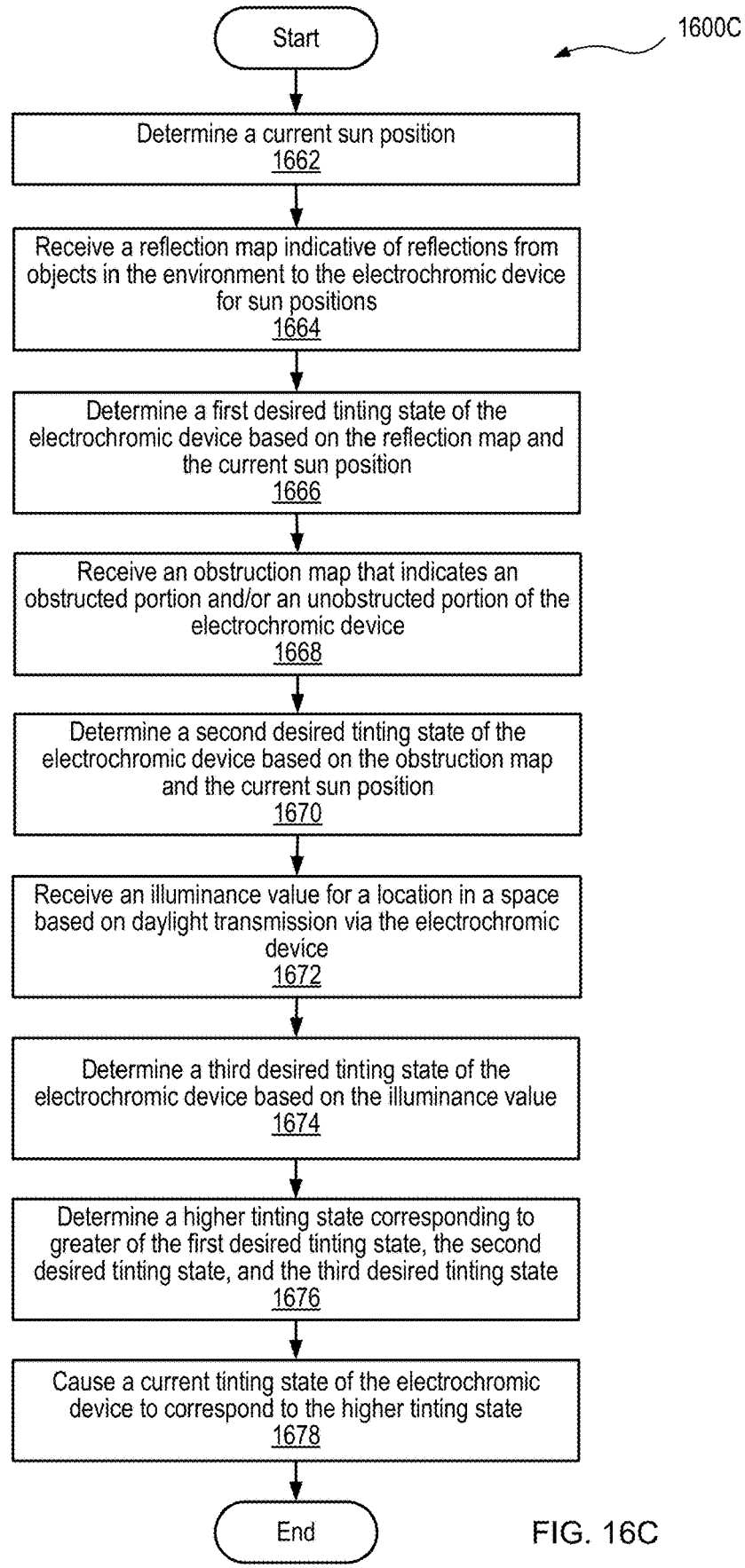

FIGS. 16A-C are flow diagrams of methods 1600A-C for providing automated control of an electrochromic device, according to certain embodiments. The methods 1600A-C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 1600A-C are performed by the cloud computing system 110 of FIG. 1 or FIG. 2 (e.g., automated control module 224 of cloud computing system 110). In some embodiments, the methods 1600A-C are performed by one or more server devices of the cloud computing system 110. In some embodiments, the methods 1600A-C are performed by a processing device of the cloud computing system 110 (e.g., a non-transitory machine-readable storage medium storing instructions which, when executed cause a processing device to perform methods 1600A-C). In some embodiments, the methods 1600A-C are performed by an automated control module 224 of the cloud computing system 110. In some embodiments, one or more portions of methods 1600A-C are performed by one or more other components (e.g., gateway, etc.). For example, the server device may transmit one or more of an obstruction map, projection information, sun map, or sensor data to the gateway and the gateway may use the one or more of obstruction map, projection information, sun map, or sensor data to control an electrochromic device.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 16A is a flow diagram of a method 1600A for providing control of an electrochromic device using a reflection map, according to certain embodiments.

At block 1602, the processing logic receives a 3D model of environment relative to an electrochromic device. The 3D model may include objects (e.g., body of water, glass building, windshields of automobiles, or the like) and the electrochromic device. The 3D model may indicate the type of surfaces of the objects and the surface properties of each of the surfaces. For example, a surface of a glass building may have a first surface property and a surface of a body of water may have a second surface property. In addition to reflecting objects, the 3D model may include non-reflecting objects (e.g., non-reflecting building, etc.) or features (e.g., overhang, etc.) that may obstruct the electrochromic device.

In some embodiments, in the 3D model, the surface property of the body of water may indicate the type of surface that would generate the most reflection (e.g., still water surface due to no wind, agitated water due to wind, etc.). In some embodiments, in the 3D model, multiple surface properties are assigned to the body of water. A reflection for each surface property may be determined and the greatest reflection is used in the reflection map.

In some embodiments, location, quantity, type, and/or angle one or more objects relative to the electrochromic device may change over time. For example, the location, quantity, type, and/or angle of cars in a parking lot may change over time. In another example, the type and/or angle of moveable portions of a building may change over time (e.g., a rotating building, a retractable roof structure, or the like). In some embodiments, the 3D model may be representative of surfaces of objects that would cause the greatest amount of reflections (e.g., a full parking lot with windshields angled towards the electrochromic device, moveable portions of buildings angled towards the electrochromic device, or the like). In some embodiments, the 3D model is representative of multiple scenarios of location, quantity, type, and/or angle of objects. The reflections may be determined for the different scenarios and the greatest reflection may be used. In some embodiments, multiple reflection maps can be generated for different variations (e.g., for each location, quantity, type, and/or angle) and the reflection maps may be combined into one overall reflection map (e.g., parametric set of windshields). In some embodiments, the 3D model may be indicative of location, quantity, type, and/or angle of objects at different times of the year (e.g., parking lot empty on weekends and holidays, retractable roof is closed during winter months, or the like) and the location, quantity, type, and/or angle of objects corresponding to the specific time of year may be used in generating the reflection map.

At block 1604, the processing logic determines based on the 3D model, reflections (e.g., sunlight reflections) from objects in the environment to the electrochromic device for sun positions. Each of the reflections may be from a corresponding surface of the objects to the electrochromic device for a corresponding sun position. In some embodiments, the processing logic may determine reflections for sun positions of a full elevation (e.g., between horizon and zenith, 90-degrees in altitude) and a full angular rotation (e.g., 360-degrees in rotation including north, south, east, and west, full 360-degrees in azimuth) relative to the electrochromic device. In some embodiments, the processing logic may determine reflections for actual sun positions (e.g., any location where the sun may be located relative to the electrochromic device, any solar position over the course of a year). In some embodiments, the processing logic may determine the reflections by casting, in the 3D model, rays from the electrochromic device to sample the environment. Each of the reflections may correspond to a respective ray reflecting off of a corresponding surface of an objection for a corresponding sun position.

In some embodiments, instead of or in addition to using a 3D model, the processing logic may use dimensional measurements to determine reflections. For example, the processing logic may receive first dimensions of an electrochromic device and second dimensions of objects relative to the electrochromic device (e.g., geometries of the electrochromic device and/or objects). The first dimensions of the electrochromic device may include one or more of height, width, or thickness of the electrochromic device. The second dimensions may include an overhang, height of the overhang above the electrochromic device, extension of the overhang of one or more obstructions of the electrochromic device, buildings, bodies of water, or the like. In some embodiments, the processing logic receives the first and second dimensions via user input. In some embodiments, the processing logic receives the first and second dimensions by processing a 3D model.

In some embodiments, the same model (e.g., 3D model, measurements, etc.) are used for two of more of the obstruction map, the reflection map, or the illuminance value.

At block 1606, the processing logic, for each reflection, determines a corresponding position, a corresponding incidence angle, and a corresponding surface property. The corresponding position may indicate an elevation of the reflection relative to the electrochromic device (e.g., location of the reflection in the field of view, such as top left corner, middle, or the like). The corresponding incidence angle may indicate the angle of the reflection relative to the electrochromic device (e.g., 90-degree angle, 45-degree angle, etc.). The corresponding surface property may be indicative of an amount of sunlight that would reflect from the surface (e.g., surface roughness, irregularity of the surface, or the like). In some embodiments, the surface property may include an indication of one or more of specularity of reflection of the surface, surface roughness, or the like. The processing logic may determine the position and the incidence angle of the reflections based on the casting of rays from the electrochromic device to the environment.

At block 1608, the processing logic generates a reflection map based on the reflections. The reflection map may be indicative of, for each reflection, the corresponding position, the corresponding incidence angle, and the corresponding surface property.

In some embodiments, the reflection map may be an equirectangular map that is from horizon to zenith (e.g., 0 to 90-degrees in altitude) and in a 360-degree angular rotation (e.g., including north, east, south, and west) relative to the electrochromic device. The processing logic may generate pixels on the reflection map. Each pixel may indicate one or more properties of the reflection. For example, an alpha channel of each pixel may indicate whether or not there is a reflection at that sun position. One or more additional channels may indicate the corresponding position, the corresponding incidence angle, and the corresponding surface property.

In some embodiments, the reflection map is a table of values (e.g., whether or not there is a reflection, position, incidence angle, and/or surface property) for each sun position (e.g., without having pixels representing reflections for each sun position).

In some embodiments, there may be more than one reflection at a sun position (e.g., a first reflection from a first building and a second reflection from a second building). The processing logic may determine a greater reflection of the more than one reflection for the sun position and generate the reflection map based on the greater reflection for the sun position.

In some embodiments, the processing logic may resample using pixels within an angular radius to include a range of sun angles in the reflection map.

In some embodiments, each electrochromic device has a corresponding reflection map. In some embodiments, a group of electrochromic devices (e.g., that are controlled together) use a common reflection map. The common reflection map may include first reflections from objects to a first electrochromic device and second reflections from objects to a second electrochromic device.

At block 1610, the processing logic determines a current sun position. The processing device may determine the current time of year and lookup the current sun position in a table that correlates time of year to sun position.

At block 1612, the processing logic receives sensor data (e.g., indicating direct sunlight, no direct sunlight, amount of direct sunlight, or the like) from one or more exterior sensors.

At block 1614, the processing logic may receive propagation information. The propagation information may be indicative of one or more portions of a room (e.g., office, conference room, or the like) corresponding to the electrochromic device where reflections are allowed and/or one or more portions of the room corresponding to the electrochromic device where reflections are not allowed. For example, reflections may be allowed onto the ceiling of the room. Reflections may not be allowed at working stations.

At block 1616, the processing logic determines a desired tinting state of the electrochromic device based on one or more of the reflection map, the current sun position, the sensor data, or the propagation information. For example, the processing logic may determine that there is direct sunlight based on the sensor data, there is reflection based on the pixel (or table) of the reflection map corresponding to the current sun position, and the reflection would enter a portion of the room where reflections are not allowed. The processing logic may determine the position, incidence angle, and surface property of the reflection based on the pixel (or table) of the reflection map. The desired tinting state may be based on the position, incidence angle, surface property, and/or amount of direct sunlight. In some embodiments, a table includes corresponding tinting states for each combination of position, incidence angle, surface property, and/or amount of direct sunlight.

In some embodiments, the processing logic generates tinting schedules (e.g., reflection schedules based on the reflections and sun positions) by querying the reflection map. The reflection map may be queried in advance to generate a schedule for tinting the electrochromic device or the reflection map may be queried in real-time to determine tint levels of an electrochromic device.

In some embodiments, the processing logic may minimize frequent switching of tint levels. The processing logic may determine there are no reflections for a threshold amount of time before untinting the electrochromic device (e.g., avoid untinting for a rapidly passing cloud, perform untinting responsive to a longer-lasting cloud cover). The processing logic may untint the electrochromic device responsive to determining that the position of the sun is to correspond to reflection being allowed (e.g., located within an allowable sunlight zone of the allowable sun map) for a threshold amount of time (e.g., not untint if the sun is quickly passing through a small allowable sunlight zone).

In some embodiments, the processing logic receives further instructions for determining a tint level for the electrochromic device. The processing logic may receive instructions from a building management system, a building security system, a tint selector 120, a dashboard mobile app 142, a dashboard web app 140, etc. For example, responsive to the building being in heating mode (e.g., during winter months), the processing logic may receive instructions from the building management system to maximize untinting of electrochromic devices (e.g., responsive to no reflection, control the electrochromic devices to be at a 0% tint level (highest transmittance)) to improve heat gain from sunlight and reduce the energy required to heat the building. Responsive to the building being in cooling mode (e.g., summer months), the processing logic may receive instructions from the building management system to maximize tinting of electrochromic devices (e.g., responsive to no reflections, control the electrochromic devices to be at 50% tint level (mid-level transmittance)) to reduce heat gain from sunlight to reduce the energy required to cool the building. In some embodiments, the processing logic receives instructions from the dashboard mobile app 142 or dashboard web app 140 of tint levels (e.g., 0% tint level, 50% tint level, 100% tint level, etc.) to be used when there are unallowed reflections and when there are not any unallowed reflections (e.g., 75% tint level when unallowed reflections, 5% tint level when no unallowed reflections, etc.).

At block 1618, the processing logic causes a current tinting state of the electrochromic device to correspond to the desired tinting state. For example, the processing logic may use the reflection map to tint an electrochromic device at the time that the sun is reflected from a neighboring building, and then to untint the electrochromic device when the sun is no longer reflected from the neighboring building. The processing logic may cause the electrochromic device to be set at a tint level (e.g., tinted, untinted) by transmitting instructions to the gateway to control the driver coupled to the electrochromic device.

In some embodiments, the processing logic determines a first desired tinting state for a first electrochromic device and a second desired tinting state for a second electrochromic device, where the first and second electrochromic devices are controlled together (e.g., both are always at the same tint level). The processing logic may determine a higher tinting level of the first and second desired tinting states and cause the current tinting state to correspond to the higher tinting state.

FIG. 16B is a flow diagram of a method 1600B for providing control of an electrochromic device using an illuminance value, according to certain embodiments.

At block 1632, the processing logic generates a model of a room (e.g., conference room, office, an interior space of a building that receives daylight through an electrochromic device, or the like) and an electrochromic device. The processing logic may receive dimensions of the room and the first electrochromic device and may generate the model based on the dimensions.

In some embodiments, the processing logic runs a simulation using the model to generate a daylight coefficient for the electrochromic device. The daylight coefficient may relate luminance of environment (e.g., the sky, diffuse reflection, light-color surfaces, diffuse surfaces, or the like) relative to the electrochromic device and inter reflection in the room (e.g., reflection of luminance from the environment off of a ceiling or wall of the room) to an illuminance value at a location in the room.

At block 1634, the processing logic identifies a location in the room. The location may correspond to location where high daylight illuminance is not allowed. For example, the location may correspond to a workspace, a seating area, a location where information is to be displayed (e.g., a projector screen, a display device, a board with written instructions, etc.), or the like. In some embodiments, multiple locations may be identified for the room.

At block 1636, the processing logic receives sensor data from one or more exterior sensors. The sensor data may indicate environmental luminance (e.g., a sky luminance pattern). The sensor data may be collected from a light sensor, a combination of light sensors, or a camera. Both light sensor data and camera data may be used in combination. For example, the sensor data may indicate a hemisphere of luminance relative to the electrochromic device (e.g., due to the sun, clouds, diffuse reflection from diffuse surfaces, or the like). The processing device may discretize the environmental luminance into discretized patches of the hemisphere of luminance.

At block 1638, the processing logic determines, based on the model and the sensor data, an illuminance value at the location in the room. The processing logic may use the daylight coefficient and one or more discretized patches of the hemisphere of luminance (e.g., based on the sensor data) to determine the illuminance value at the location of the room.

In some embodiments, the processing logic may receive an obstruction map that indicates an obstructed portion and/or an unobstructed portion of the sky as viewed from the electrochromic device. The processing logic may determine the first illuminance value further based on the obstruction map. For example, the processing logic may only consider discretized patches of the hemisphere of luminance (or portions of the discretized patches) that are not obstructed.

The illuminance value may correspond to a vertical eye illuminance at the location in the room. The illuminance value may correspond to a daylight glare probability via the electrochromic device at the location in the room. For example, certain illuminance values may be considered glare at certain locations of the room (e.g., an illuminance level that interferes with use of that location of the room). The illuminance value may represent diffuse horizontal irradiance and direct normal irradiance via the electrochromic device to the location in the room.

At block 1640, the processing logic determines a desired tinting state of the electrochromic device based on the illuminance value. In some embodiments, the location has an allowed illuminance value. The desired tinting state may be the amount of tinting to decrease the illuminance value to an allowed illuminance value.

In some embodiments, multiple electrochromic devices provide daylight to the same room. The processing logic may determine a corresponding illuminance value at the location in the room for each of the electrochromic devices. The desired tinting state may be based on the combination of the illuminance values (e.g., the sum of the illuminance values) corresponding to the location in the space.

In some embodiments, the processing logic may minimize frequent switching of tint levels. The processing logic may determine there is an allowable amount of illuminance for a threshold amount of time before untinting the electrochromic device (e.g., avoid untinting for a rapidly passing cloud, perform untinting responsive to a longer-lasting cloud cover). The processing logic may untint the electrochromic device responsive to determining that the position of the sun is to correspond to an allowable amount of illuminance for a threshold amount of time (e.g., not untint if the sun is quickly passing through a small obstructed portion of the obstruction map).

In some embodiments, the processing logic receives further instructions for determining a tint level for the electrochromic device. The processing logic may receive instructions from a building management system, a building security system, a tint selector 120, a dashboard mobile app 142, a dashboard web app 140, etc. For example, responsive to the building being in heating mode (e.g., during winter months), the processing logic may receive instructions from the building management system to maximize untinting of electrochromic devices (e.g., responsive to direct sunlight being obstructed, control the electrochromic devices to be at a 0% tint level (highest transmittance)) to improve heat gain from sunlight and reduce the energy required to heat the building. Responsive to the building being in cooling mode (e.g., summer months), the processing logic may receive instructions from the building management system to maximize tinting of electrochromic devices (e.g., responsive to direct sunlight being obstructed, control the electrochromic devices to be at 50% tint level (mid-level transmittance)) to reduce heat gain from sunlight to reduce the energy required to cool the building. In some embodiments, the processing logic receives instructions from the dashboard mobile app 142 or dashboard web app 140 of tint levels (e.g., 0% tint level, 50% tint level, 100% tint level, etc.) to be used when there are certain illuminance values.

At block 1642, the processing logic causes a current tinting state of the electrochromic device to correspond to the desired tinting state. For example, the processing logic may use a first illuminance value at a first point in time to tint an electrochromic device at the time that the sun comes over a neighboring building, and then to untint the electrochromic device when the sun is blocked by an overhang. The processing logic may cause the electrochromic device to be set at a tint level (e.g., tinted, untinted) by transmitting instructions to the gateway to control the driver coupled to the electrochromic device.

In some embodiments, the processing logic generates a desired tinting state for each of two or more locations in the room. The processing logic determines a higher tinting state (e.g., darker tinting state, tinting state corresponding to less transmission of sunlight) based on a greater of the first or second tinting state and causes the current tinting state to correspond to the higher tinting state.

FIG. 16C is a flow diagram of a method 1600C for providing automated control of an electrochromic device, according to certain embodiments. Method 1600C illustrates automated control of an electrochromic device using a reflection map, an obstruction map, and an illuminance value. In some embodiments, method 1600C may provide automated control using two or more of a reflection map, an obstruction map, or an illuminance value. In some embodiments, method 1600C may provide automated control using one or more of a reflection map, an obstruction map, or an illuminance value plus an additional way (e.g., method, process, etc.) of determining a desired tint level.

At block 1662, the processing logic determines a current sun position. Block 1662 may be similar to block 1610.

At block 1664, the processing logic receives a reflection map indicative of reflections from objects in the environment to the electrochromic device for sun positions. The reflection map may be generated based on blocks 1602-1608.

At block 1666, the processing logic determines a first desired tinting state of the electrochromic device based on the reflection map and the current sun position. Block 1666 may be similar to block 1616.

At block 1668, the processing logic receives an obstruction map that indicates an obstructed portion and/or an unobstructed portion of the electrochromic device for sun positions. The obstruction map may be generated by one or more of methods 300B-D.

At block 1670, the processing logic determines a second desired tinting state of the electrochromic device based on the obstruction map and the current sun position. Block 1670 may be similar to block 310.

At block 1672, the processing logic receives an illuminance value for a location in a room based on daylight transmission via the electrochromic device. The illuminance value may be determined based on blocks 1632-1638.

At block 1674, the processing logic determines a third desired tinting state of the electrochromic device based on the illuminance value. Block 1674 may be similar to block 1640.

At block 1676, the processing logic determines a higher tinting state corresponding to greater of the first desired tinting state, the second desired tinting state, and the third desired tinting state. In some embodiments, the processing logic may determine a higher tinting state corresponding to the greater of two of more of the first, second, and third desired tinting states.

At block 1678, the processing logic causes a current tinting state of the electrochromic device to correspond to the higher tinting state. Block 1678 may be similar to one or more of blocks 312, 1618, or 1642.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "generating," "determining," "causing," "casting," "sampling," "resampling," "running," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A non-transitory machine-readable storage medium storing instructions which when executed cause a processing device to perform operations comprising:
    receiving first dimensions of an electrochromic device and second dimensions of one or more obstructions of the electrochromic device;
    generating, based on the first dimensions and the second dimensions, an obstruction map that indicates at least one of an obstructed portion or an unobstructed portion of the electrochromic device;
    determining, based on the obstruction map, a first desired tinting state of the electrochromic device; and
    causing a current tinting state of the electrochromic device to correspond to the first desired tinting state.

2. The non-transitory machine-readable storage medium of claim 1, wherein:
    the electrochromic device is associated with a room and the one or more obstructions are exterior to the room;
    the obstructed portion is obstructed from receiving direct sunlight; and
    the unobstructed portion is unobstructed from receiving the direct sunlight.

3. The non-transitory machine-readable storage medium of claim 1, wherein the operations further comprise one or more of:
    receiving a first image captured from a first viewpoint of the electrochromic device and identifying at least one of a second obstructed portion of the first image or a second unobstructed portion of the first image, wherein the electrochromic device is associated with a room and the first viewpoint faces exterior of the room, wherein the generating of the obstruction map is further based on the at least one of the second obstructed portion of the first image or the second unobstructed portion of the first image; or
    receiving a three-dimensional (3D) model of environment relative to the electrochromic device, wherein the obstruction map is to be further generated based on the 3D model.

4. The non-transitory machine-readable storage medium of claim 1, wherein the operations further comprise:
    receiving propagation information indicating one or more portions of a room corresponding to the electrochromic device where direct sunlight is allowed, wherein the determining of the first desired tinting state of the electrochromic device is further based on the propagation information.

5. The non-transitory machine-readable storage medium of claim 1, wherein the operations further comprise:
    receiving a sun map indicating a position of sun relative to the electrochromic device; and
    receiving sensor data from one or more exterior sensors, wherein the determining of the first desired tinting state of the electrochromic device is further based on comparing the obstruction map to the sun map to determine whether the sun is within the unobstructed portion of the electrochromic device and determining, based on the sensor data, whether there is current direct sunlight.

6. The non-transitory machine-readable storage medium of claim 1, wherein:
    the first dimensions comprise one or more of height, width, or thickness of the electrochromic device; and
    the second dimensions comprise one or more of depth of an overhang, height of the overhang above the electrochromic device, or extension of the overhang.

7. The non-transitory machine-readable storage medium of claim 1, wherein the operations further comprise:
    generating a reflection map based on a plurality of reflections, wherein each of the plurality of reflections is from a corresponding surface of one or more objects to the electrochromic device for a corresponding sun position;
    determining, based on the reflection map and current sun position, a second desired tinting state of the electrochromic device;
    determining a higher tinting state based on greater of the first desired tinting state or the second desired tinting state; and
    causing the current tinting state of the electrochromic device to correspond to the higher tinting state.

8. The non-transitory machine-readable storage medium of claim 1, wherein the operations further comprise:
    receiving an illuminance value for a location in a room based on daylight transmission via the electrochromic device;
    determining, based on the illuminance value, a second desired tinting state of the electrochromic device;
    determining a higher tinting state based on greater of the first desired tinting state or the second desired tinting state; and
    causing the current tinting state of the electrochromic device to correspond to the higher tinting state.

9. A method comprising:
    receiving, by a processing device, first dimensions of an electrochromic device and second dimensions of one or more obstructions of the electrochromic device;
    generating, by the processing device, an obstruction map based on the first dimensions and the second dimensions that indicates at least one of an obstructed portion or an unobstructed portion of the electrochromic device;
    determining, by the processing device, a first desired tinting state of the electrochromic device based on the obstruction map; and
    causing, by the processing device, a current tinting state of the electrochromic device to correspond to the first desired tinting state.

10. The method of claim 9, wherein:
the electrochromic device is associated with a room and the one or more obstructions are exterior to the room;
the obstructed portion is obstructed from receiving direct sunlight; and
the unobstructed portion is unobstructed from receiving the direct sunlight.

11. The method of claim 9 further comprising:
receiving, by the processing device, a first image captured from a first viewpoint of the electrochromic device and identifying at least one of a second obstructed portion of the first image or a second unobstructed portion of the first image, wherein the electrochromic device is associated with a room and the first viewpoint faces exterior of the room, wherein the generating of the obstruction map is further based on the at least one of the second obstructed portion of the first image or the second unobstructed portion of the first image; or
receiving, by the processing device, a three-dimensional (3D) model of environment relative to the electrochromic device, wherein the obstruction map is to be further generated based on the 3D model.

12. The method of claim 9 further comprising:
receiving, by the processing device, propagation information indicating one or more portions of a room corresponding to the electrochromic device where direct sunlight is allowed, wherein the determining of the first desired tinting state of the electrochromic device is further based on the propagation information.

13. The method of claim 9 further comprising:
receiving, by the processing device, a sun map indicating position of sun relative to the electrochromic device; and
receiving, by the processing device, sensor data from one or more exterior sensors, wherein the determining of the first desired tinting state of the electrochromic device is further based on comparing the obstruction map to the sun map to determine whether the sun is within the unobstructed portion of the obstruction map and determining, based on the sensor data, whether there is current direct sunlight.

14. The method of claim 9, wherein:
the first dimensions comprise one or more of height, width, or thickness of the electrochromic device; and
the second dimensions comprise one or more of depth of an overhang, height of the overhang above the electrochromic device, or extension of the overhang.

15. The method of claim 9 further comprising:
generating, by the processing device, a reflection map based on a plurality of reflections, wherein each of the plurality of reflections is from a corresponding surface of one or more objects to the electrochromic device for a corresponding sun position;
determining, by the processing device, a second desired tinting state of the electrochromic device based on the reflection map and current sun position;
determining, by the processing device, a higher tinting state based on greater of the first desired tinting state or the second desired tinting state; and
causing, by the processing device, the current tinting state of the electrochromic device to correspond to the higher tinting state.

16. The method of claim 9 further comprising:
receiving, by the processing device, an illuminance value for a location in a room based on daylight transmission via the electrochromic device;
determining, by the processing device, a second desired tinting state of the electrochromic device based on the illuminance value;
determining, by the processing device, a higher tinting state based on greater of the first desired tinting state or the second desired tinting state; and
causing, by the processing device, the current tinting state of the electrochromic device to correspond to the higher tinting state.

17. A system comprising:
a memory; and
a processing device communicably coupled to the memory, the processing device to:
receive first dimensions of an electrochromic device and second dimensions of one or more obstructions of the electrochromic device;
generate, based on the first dimensions and the second dimensions, an obstruction map that indicates at least one of an obstructed portion or an unobstructed portion of the electrochromic device;
determine, based on the obstruction map, a first desired tinting state of the electrochromic device; and
cause a current tinting state of the electrochromic device to correspond to the first desired tinting state.

18. The system of claim 17, wherein:
the electrochromic device is associated with a room and the one or more obstructions are exterior to the room;
the obstructed portion is obstructed from receiving direct sunlight; and
the unobstructed portion is unobstructed from receiving the direct sunlight.

19. The system of claim 17, wherein:
the first dimensions comprise one or more of height, width, or thickness of the electrochromic device; and
the second dimensions comprise one or more of depth of an overhang, height of the overhang above the electrochromic device, or extension of the overhang.

20. The system of claim 17, the processing device is further to:
receive a first image captured from a first viewpoint of the electrochromic device and identifying at least one of a second obstructed portion of the first image or a second unobstructed portion of the first image, wherein the electrochromic device is associated with a room and the first viewpoint faces exterior of the room, wherein the processing device is to generate the obstruction map further based on the at least one of the second obstructed portion of the first image or the second unobstructed portion of the first image; or
receive a three-dimensional (3D) model of environment relative to the electrochromic device, wherein the obstruction map is to be further generated based on the 3D model.

* * * * *